(12) United States Patent
Fujisaki

(10) Patent No.: US 9,143,723 B1
(45) Date of Patent: *Sep. 22, 2015

(54) COMMUNICATION DEVICE

(71) Applicant: Iwao Fujisaki, Tokyo (JP)

(72) Inventor: Iwao Fujisaki, Tokyo (JP)

( * ) Notice: Subject to any disclaimer, the term of this patent is extended or adjusted under 35 U.S.C. 154(b) by 212 days.

This patent is subject to a terminal disclaimer.

(21) Appl. No.: 13/872,294

(22) Filed: Apr. 29, 2013

Related U.S. Application Data

(63) Continuation of application No. 13/472,382, filed on May 15, 2012, now Pat. No. 8,433,364, which is a continuation of application No. 12/549,417, filed on Aug. 28, 2009, now Pat. No. 8,208,954, which is a continuation of application No. 11/276,957, filed on Mar. 18, 2006, now abandoned.

(60) Provisional application No. 60/594,445, filed on Apr. 8, 2005.

(51) Int. Cl.
| | |
|---|---|
| *H04M 3/42* | (2006.01) |
| *H04N 7/14* | (2006.01) |
| *H04M 1/725* | (2006.01) |
| *H04L 29/08* | (2006.01) |
| *H04W 4/02* | (2009.01) |

(52) U.S. Cl.
CPC .......... *H04N 7/141* (2013.01); *H04L 29/08108* (2013.01); *H04M 1/72519* (2013.01); *H04W 4/02* (2013.01)

(58) Field of Classification Search
CPC .............. H04N 7/141; H04M 1/72519; H04L 29/08108; H04W 4/02
USPC ................. 455/414.1, 414.2, 418, 419, 550.1
See application file for complete search history.

(56) References Cited

U.S. PATENT DOCUMENTS

| | | | |
|---|---|---|---|
| 4,934,773 A | 6/1990 | Becker | |
| 5,272,638 A | 12/1993 | Martin et al. | |
| 5,345,272 A | 9/1994 | Ersoz et al. | |
| 5,353,376 A | 10/1994 | Oh et al. | |
| 5,388,147 A | 2/1995 | Grimes | |
| 5,405,152 A | 4/1995 | Katanics et al. | |
| 5,414,461 A | 5/1995 | Kishi et al. | |
| 5,418,837 A | 5/1995 | Johansson et al. | |
| 5,438,357 A | 8/1995 | McNelley | |
| 5,442,453 A | 8/1995 | Takagi et al. | |
| 5,446,904 A | 8/1995 | Belt et al. | |
| 5,479,476 A | 12/1995 | Finke-Anlauff | |
| 5,530,472 A | 6/1996 | Bregman et al. | |

(Continued)

FOREIGN PATENT DOCUMENTS

| | | |
|---|---|---|
| GB | 2386027 A1 | 9/2003 |
| JP | 2196373 A1 | 8/1990 |

(Continued)

OTHER PUBLICATIONS

Fehily "Windows XP: Visual QuickStart Guide" published by Peachpit Press in 2003.

(Continued)

*Primary Examiner* — Khai M Nguyen

(57) ABSTRACT

The communication device which includes a TV phone pausing visual data selecting implementer, a TV phone implementer, a TV phone pausing visual data transferring implementer, and a moving picture data replaying implementer.

18 Claims, 2 Drawing Sheets

(56) References Cited

U.S. PATENT DOCUMENTS

| | | |
|---|---|---|
| 5,539,810 A | 7/1996 | Kennedy et al. |
| 5,550,754 A | 8/1996 | McNelley et al. |
| 5,559,554 A | 9/1996 | Uekane et al. |
| 5,566,073 A | 10/1996 | Margolin |
| 5,625,675 A | 4/1997 | Katsumaru et al. |
| 5,629,741 A | 5/1997 | Hopper |
| 5,687,331 A | 11/1997 | Volk et al. |
| 5,758,280 A | 5/1998 | Kimura |
| 5,772,586 A | 6/1998 | Heinonen et al. |
| 5,778,304 A | 7/1998 | Grube et al. |
| 5,786,846 A | 7/1998 | Hiroaki |
| 5,796,338 A | 8/1998 | Mardirossian |
| 5,825,408 A | 10/1998 | Yuyama et al. |
| 5,844,824 A | 12/1998 | Newman et al. |
| 5,902,349 A | 5/1999 | Endo et al. |
| 5,903,706 A | 5/1999 | Wakabayashi et al. |
| 5,918,180 A | 6/1999 | Dimino |
| 5,924,040 A | 7/1999 | Trompower |
| 5,940,139 A | 8/1999 | Smoot |
| 5,959,661 A | 9/1999 | Isono |
| 6,009,336 A | 12/1999 | Harris et al. |
| 6,034,715 A | 3/2000 | Ishida et al. |
| 6,069,648 A | 5/2000 | Suso et al. |
| 6,073,034 A | 6/2000 | Jacobsen et al. |
| 6,081,265 A | 6/2000 | Nakayama et al. |
| 6,085,112 A | 7/2000 | Kleinschmidt et al. |
| 6,094,237 A | 7/2000 | Hashimoto |
| 6,115,597 A | 9/2000 | Kroll et al. |
| 6,128,594 A | 10/2000 | Gulli et al. |
| 6,144,848 A | 11/2000 | Walsh et al. |
| 6,148,212 A | 11/2000 | Park et al. |
| 6,161,134 A | 12/2000 | Wang et al. |
| 6,167,283 A | 12/2000 | Korpela et al. |
| 6,192,343 B1 | 2/2001 | Morgan et al. |
| 6,195,089 B1 | 2/2001 | Chaney et al. |
| 6,198,942 B1 | 3/2001 | Hayashi et al. |
| 6,202,060 B1 | 3/2001 | Tran |
| 6,216,013 B1 | 4/2001 | Moore et al. |
| 6,216,158 B1 | 4/2001 | Luo et al. |
| 6,222,482 B1 | 4/2001 | Gueziec |
| 6,225,944 B1 | 5/2001 | Hayes |
| 6,226,500 B1 | 5/2001 | Nonami |
| 6,241,612 B1 | 6/2001 | Heredia |
| 6,243,039 B1 | 6/2001 | Elliot |
| 6,253,075 B1 | 6/2001 | Beghtol et al. |
| 6,265,988 B1 | 7/2001 | LeMense et al. |
| 6,282,435 B1 | 8/2001 | Wagner et al. |
| 6,285,317 B1 | 9/2001 | Ong |
| 6,285,757 B1 | 9/2001 | Carroll et al. |
| 6,292,666 B1 | 9/2001 | Siddiqui et al. |
| 6,311,077 B1 | 10/2001 | Bien |
| 6,366,651 B1 | 4/2002 | Griffith et al. |
| 6,385,465 B1 | 5/2002 | Yoshioka |
| 6,385,654 B1 | 5/2002 | Tanaka |
| 6,405,033 B1 | 6/2002 | Kennedy, III et al. |
| 6,411,198 B1 | 6/2002 | Hirai et al. |
| 6,421,470 B1 | 7/2002 | Nozaki et al. |
| 6,421,602 B1 | 7/2002 | Bullock et al. |
| 6,438,380 B1 | 8/2002 | Bi et al. |
| 6,442,404 B1 | 8/2002 | Sakajiri |
| 6,445,802 B1 | 9/2002 | Dan |
| 6,487,422 B1 | 11/2002 | Lee |
| 6,507,643 B1 | 1/2003 | Groner |
| 6,510,325 B1 | 1/2003 | Mack, II et al. |
| 6,512,919 B2 | 1/2003 | Ogasawara |
| 6,518,956 B1 | 2/2003 | Sato |
| 6,519,566 B1 | 2/2003 | Boyer et al. |
| 6,526,293 B1 | 2/2003 | Matsuo |
| 6,528,533 B2 | 3/2003 | Lauffer |
| 6,529,742 B1 | 3/2003 | Yang |
| 6,542,750 B2 | 4/2003 | Hendrey et al. |
| 6,549,215 B2 | 4/2003 | Jouppi |
| 6,549,756 B1 | 4/2003 | Engstrom |
| 6,553,309 B2 | 4/2003 | Uchida et al. |
| 6,587,547 B1 | 7/2003 | Zirngibl et al. |
| 6,615,186 B1 | 9/2003 | Kolls |
| 6,618,704 B2 | 9/2003 | Kanevsky et al. |
| 6,630,958 B2 | 10/2003 | Tanaka et al. |
| 6,647,251 B1 | 11/2003 | Siegle et al. |
| 6,650,877 B1 | 11/2003 | Tarbouriech et al. |
| 6,650,894 B1 | 11/2003 | Berstis et al. |
| 6,658,272 B1 | 12/2003 | Lenchik et al. |
| 6,658,461 B1 | 12/2003 | Mazo |
| 6,662,023 B1 | 12/2003 | Helle |
| 6,665,711 B1 | 12/2003 | Boyle et al. |
| 6,668,177 B2 | 12/2003 | Salmimaa et al. |
| 6,678,366 B1 | 1/2004 | Burger et al. |
| 6,681,120 B1 | 1/2004 | Kim |
| 6,687,515 B1 | 2/2004 | Kosaka |
| 6,690,932 B1 | 2/2004 | Barnier et al. |
| 6,694,143 B1 | 2/2004 | Beamish et al. |
| 6,701,148 B1 | 3/2004 | Wilson et al. |
| 6,701,162 B1 | 3/2004 | Everett |
| 6,707,942 B1 | 3/2004 | Cortopassi et al. |
| 6,711,399 B1 | 3/2004 | Granier |
| 6,725,022 B1 | 4/2004 | Clayton et al. |
| 6,728,533 B2 | 4/2004 | Ishii |
| 6,763,226 B1 | 7/2004 | McZeal, Jr. |
| 6,772,174 B1 | 8/2004 | Pettersson |
| 6,775,361 B1 | 8/2004 | Arai et al. |
| 6,779,030 B1 | 8/2004 | Dugan et al. |
| 6,782,412 B2 | 8/2004 | Brophy et al. |
| 6,788,332 B1 | 9/2004 | Cook |
| 6,788,928 B2 | 9/2004 | Kohinata et al. |
| 6,795,715 B1 | 9/2004 | Kubo et al. |
| 6,812,954 B1 | 11/2004 | Priestman et al. |
| 6,813,501 B2 | 11/2004 | Kinnunen et al. |
| 6,819,939 B2 | 11/2004 | Masamura |
| 6,820,055 B2 | 11/2004 | Saindon et al. |
| 6,850,209 B2 | 2/2005 | Mankins et al. |
| 6,865,372 B2 | 3/2005 | Mauney et al. |
| 6,870,828 B1 | 3/2005 | Giordano, III |
| 6,876,379 B1 | 4/2005 | Fisher |
| 6,883,000 B1 | 4/2005 | Gropper |
| 6,888,927 B1 | 5/2005 | Cruickshank et al. |
| 6,891,525 B2 | 5/2005 | Ogoro |
| 6,895,084 B1 | 5/2005 | Saylor et al. |
| 6,895,259 B1 | 5/2005 | Blank nee Keller et al. |
| 6,898,321 B1 | 5/2005 | Knee et al. |
| 6,901,383 B1 | 5/2005 | Ricketts et al. |
| 6,905,414 B2 | 6/2005 | Danieli et al. |
| 6,912,544 B1 | 6/2005 | Weiner |
| 6,922,212 B2 | 7/2005 | Nakakubo et al. |
| 6,937,868 B2 | 8/2005 | Himmel et al. |
| 6,947,728 B2 | 9/2005 | Tagawa et al. |
| 6,954,645 B2 | 10/2005 | Tsai et al. |
| 6,958,675 B2 | 10/2005 | Maeda et al. |
| 6,961,559 B1 | 11/2005 | Chow et al. |
| 6,970,178 B2 | 11/2005 | Tanioka et al. |
| 6,970,703 B2 | 11/2005 | Fuchs et al. |
| 6,973,628 B2 | 12/2005 | Asami |
| 6,992,699 B1 | 1/2006 | Vance et al. |
| 6,993,362 B1 | 1/2006 | Aberg |
| 6,999,757 B2 | 2/2006 | Bates et al. |
| 7,003,598 B2 | 2/2006 | Kavanagh |
| 7,007,239 B1 | 2/2006 | Hawkins et al. |
| 7,012,999 B2 | 3/2006 | Ruckart |
| 7,019,770 B1 | 3/2006 | Katz |
| 7,028,077 B2 | 4/2006 | Toshimitsu et al. |
| 7,030,880 B2 | 4/2006 | Tanioka et al. |
| 7,035,666 B2 | 4/2006 | Silberfenig et al. |
| 7,058,356 B2 | 6/2006 | Slotznick |
| 7,076,052 B2 | 7/2006 | Yoshimura |
| 7,081,832 B2 | 7/2006 | Nelson et al. |
| 7,085,578 B2 | 8/2006 | Barclay et al. |
| 7,085,739 B1 | 8/2006 | Winter et al. |
| 7,089,298 B2 | 8/2006 | Nyman et al. |
| 7,106,846 B2 | 9/2006 | Nguyen et al. |
| 7,107,081 B1 | 9/2006 | Fujisaki |
| 7,113,981 B2 | 9/2006 | Slate |
| 7,117,152 B1 | 10/2006 | Mukherji et al. |
| 7,126,951 B2 | 10/2006 | Belcea et al. |
| 7,127,238 B2 | 10/2006 | Vandermeijden et al. |
| 7,127,271 B1 | 10/2006 | Fujisaki |

(56) References Cited

U.S. PATENT DOCUMENTS

| | | | |
|---|---|---|---|
| 7,130,630 B1 | 10/2006 | Moton, Jr. et al. | |
| 7,139,555 B2 | 11/2006 | Apfel | |
| 7,142,810 B2 | 11/2006 | Oesterling | |
| 7,142,890 B2 | 11/2006 | Irimajiri et al. | |
| 7,146,179 B2 | 12/2006 | Parulski et al. | |
| 7,148,911 B1 | 12/2006 | Mitsui et al. | |
| 7,174,171 B2 | 2/2007 | Jones | |
| 7,224,792 B2 | 5/2007 | Fusco | |
| 7,224,851 B2 | 5/2007 | Kinjo | |
| 7,224,987 B1 | 5/2007 | Bhela et al. | |
| 7,231,231 B2 | 6/2007 | Kokko et al. | |
| 7,233,781 B2 | 6/2007 | Hunter et al. | |
| 7,233,795 B1 | 6/2007 | Ryden | |
| 7,240,093 B1 | 7/2007 | Danieli et al. | |
| 7,245,293 B2 | 7/2007 | Hoshino et al. | |
| 7,251,255 B1 | 7/2007 | Young | |
| 7,254,408 B2 | 8/2007 | Kim | |
| 7,260,416 B2 | 8/2007 | Shippee | |
| 7,266,186 B1 | 9/2007 | Henderson | |
| 7,277,711 B2 | 10/2007 | Nyu | |
| 7,321,783 B2 | 1/2008 | Kim | |
| 7,324,823 B1 | 1/2008 | Rosen et al. | |
| 7,346,373 B2 | 3/2008 | Kim | |
| 7,372,447 B1 | 5/2008 | Jacobsen et al. | |
| 7,383,067 B2 | 6/2008 | Phillips et al. | |
| 7,433,845 B1 | 10/2008 | Flitcroft et al. | |
| 7,444,168 B2 | 10/2008 | Nakagawa et al. | |
| 7,450,709 B2 | 11/2008 | Gonzalez et al. | |
| 7,451,084 B2 | 11/2008 | Funakura | |
| 7,532,879 B1 | 5/2009 | Fujisaki | |
| 7,551,899 B1 | 6/2009 | Nicolas et al. | |
| 7,642,929 B1 | 1/2010 | Pinkus et al. | |
| 7,643,037 B1 | 1/2010 | Langmacher et al. | |
| 7,657,252 B2 | 2/2010 | Futami | |
| 7,686,693 B2 | 3/2010 | Danieli et al. | |
| 7,707,592 B2 | 4/2010 | Wesslen et al. | |
| 7,707,602 B2 | 4/2010 | Cragun et al. | |
| 7,725,077 B2 | 5/2010 | Jung et al. | |
| 7,752,188 B2 | 7/2010 | Lagerstedt et al. | |
| 7,769,364 B2 | 8/2010 | Logan et al. | |
| 7,787,857 B2 | 8/2010 | Peterman | |
| 7,787,887 B2 | 8/2010 | Gupta et al. | |
| 7,853,295 B1 | 12/2010 | Fujisaki | |
| 7,853,297 B1 | 12/2010 | Fujisaki | |
| 7,865,567 B1 | 1/2011 | Hendricks et al. | |
| 7,873,349 B1 | 1/2011 | Smith et al. | |
| 7,890,089 B1 | 2/2011 | Fujisaki | |
| 7,899,410 B2 | 3/2011 | Rakshani et al. | |
| 7,922,086 B2 | 4/2011 | Jung et al. | |
| 7,941,141 B2 | 5/2011 | Shoykhet et al. | |
| 7,953,439 B2 | 5/2011 | Rofougaran | |
| 7,970,414 B1 | 6/2011 | Werden et al. | |
| 8,099,108 B2 | 1/2012 | Camp et al. | |
| 8,117,266 B2 | 2/2012 | Moore | |
| 8,126,400 B2 | 2/2012 | Jung et al. | |
| 8,145,040 B2 | 3/2012 | Toyoshima | |
| 8,208,954 B1 * | 6/2012 | Fujisaki | 455/550.1 |
| 8,433,364 B1 * | 4/2013 | Fujisaki | 455/550.1 |
| 8,472,935 B1 | 6/2013 | Fujisaki | |
| 8,755,838 B1 | 6/2014 | Fujisaki | |
| 8,825,026 B1 | 9/2014 | Fujisaki | |
| 8,825,090 B1 | 9/2014 | Fujisaki | |
| 2001/0005826 A1 | 6/2001 | Shibuya | |
| 2001/0011293 A1 | 8/2001 | Murakami et al. | |
| 2001/0028350 A1 | 10/2001 | Matsuoka et al. | |
| 2001/0029425 A1 | 10/2001 | Myr | |
| 2001/0035829 A1 | 11/2001 | Yu et al. | |
| 2001/0048364 A1 | 12/2001 | Kalthoff et al. | |
| 2001/0049470 A1 | 12/2001 | Mault et al. | |
| 2002/0002044 A1 | 1/2002 | Naruse et al. | |
| 2002/0002705 A1 | 1/2002 | Byrnes et al. | |
| 2002/0006804 A1 | 1/2002 | Mukai et al. | |
| 2002/0009978 A1 | 1/2002 | Dukach et al. | |
| 2002/0016724 A1 | 2/2002 | Yang et al. | |
| 2002/0019225 A1 | 2/2002 | Miyashita | |
| 2002/0026348 A1 | 2/2002 | Fowler et al. | |
| 2002/0028690 A1 | 3/2002 | McKenna et al. | |
| 2002/0031120 A1 | 3/2002 | Rakib | |
| 2002/0034292 A1 | 3/2002 | Tuoriniemi et al. | |
| 2002/0036231 A1 | 3/2002 | Monaghan et al. | |
| 2002/0037738 A1 | 3/2002 | Wycherley et al. | |
| 2002/0038219 A1 | 3/2002 | Yanay et al. | |
| 2002/0039914 A1 | 4/2002 | Hama et al. | |
| 2002/0041262 A1 | 4/2002 | Mukai et al. | |
| 2002/0047787 A1 | 4/2002 | Mikkola et al. | |
| 2002/0049630 A1 | 4/2002 | Furuta et al. | |
| 2002/0052754 A1 | 5/2002 | Joyce et al. | |
| 2002/0054068 A1 | 5/2002 | Ellis et al. | |
| 2002/0055872 A1 | 5/2002 | LaBrie et al. | |
| 2002/0061767 A1 | 5/2002 | Sladen et al. | |
| 2002/0065037 A1 | 5/2002 | Messina et al. | |
| 2002/0066115 A1 | 5/2002 | Wendelrup | |
| 2002/0068558 A1 | 6/2002 | Janik | |
| 2002/0068585 A1 | 6/2002 | Chan et al. | |
| 2002/0068599 A1 | 6/2002 | Rodriguez et al. | |
| 2002/0072395 A1 | 6/2002 | Miramontes | |
| 2002/0077808 A1 | 6/2002 | Liu et al. | |
| 2002/0080163 A1 | 6/2002 | Morey | |
| 2002/0085700 A1 | 7/2002 | Metcalf | |
| 2002/0094806 A1 | 7/2002 | Kamimura | |
| 2002/0097984 A1 | 7/2002 | Abecassis | |
| 2002/0098857 A1 | 7/2002 | Ishii | |
| 2002/0102960 A1 | 8/2002 | Lechner | |
| 2002/0103872 A1 | 8/2002 | Watanabe | |
| 2002/0104095 A1 | 8/2002 | Nguyen et al. | |
| 2002/0110246 A1 | 8/2002 | Gosior et al. | |
| 2002/0115469 A1 | 8/2002 | Rekimoto et al. | |
| 2002/0120718 A1 | 8/2002 | Lee | |
| 2002/0123336 A1 | 9/2002 | Kamada | |
| 2002/0127997 A1 | 9/2002 | Karlstedt et al. | |
| 2002/0128000 A1 | 9/2002 | do Nascimento | |
| 2002/0133342 A1 | 9/2002 | McKenna | |
| 2002/0137470 A1 | 9/2002 | Baron et al. | |
| 2002/0137503 A1 | 9/2002 | Roderique | |
| 2002/0137526 A1 | 9/2002 | Shinohara | |
| 2002/0141086 A1 | 10/2002 | Lang et al. | |
| 2002/0142763 A1 | 10/2002 | Kolsky | |
| 2002/0147645 A1 | 10/2002 | Alao et al. | |
| 2002/0151326 A1 | 10/2002 | Awada et al. | |
| 2002/0151327 A1 | 10/2002 | Levitt | |
| 2002/0160724 A1 | 10/2002 | Arai et al. | |
| 2002/0164975 A1 | 11/2002 | Lu | |
| 2002/0164996 A1 | 11/2002 | Dorenbosch | |
| 2002/0165850 A1 | 11/2002 | Roberts et al. | |
| 2002/0173344 A1 | 11/2002 | Cupps et al. | |
| 2002/0177407 A1 | 11/2002 | Mitsumoto | |
| 2002/0178225 A1 | 11/2002 | Madenberg et al. | |
| 2002/0183045 A1 | 12/2002 | Emmerson et al. | |
| 2002/0183098 A1 | 12/2002 | Lee et al. | |
| 2002/0191951 A1 | 12/2002 | Sodeyama et al. | |
| 2002/0198017 A1 | 12/2002 | Babasaki et al. | |
| 2002/0198813 A1 | 12/2002 | Patterson, Jr. et al. | |
| 2002/0198936 A1 | 12/2002 | McIntyre et al. | |
| 2003/0003967 A1 | 1/2003 | Ito | |
| 2003/0005056 A1 | 1/2003 | Yamamoto et al. | |
| 2003/0006879 A1 | 1/2003 | Kang et al. | |
| 2003/0007556 A1 | 1/2003 | Oura et al. | |
| 2003/0013483 A1 | 1/2003 | Ausems et al. | |
| 2003/0014286 A1 | 1/2003 | Cappellini | |
| 2003/0016189 A1 | 1/2003 | Abe et al. | |
| 2003/0017857 A1 | 1/2003 | Kitson et al. | |
| 2003/0018744 A1 | 1/2003 | Johanson et al. | |
| 2003/0025788 A1 | 2/2003 | Beardsley | |
| 2003/0032406 A1 | 2/2003 | Minear et al. | |
| 2003/0037265 A1 | 2/2003 | Sameshima et al. | |
| 2003/0038800 A1 | 2/2003 | Kawahara | |
| 2003/0038893 A1 | 2/2003 | Rajamaki et al. | |
| 2003/0045311 A1 | 3/2003 | Larikka et al. | |
| 2003/0045329 A1 | 3/2003 | Kinoshita | |
| 2003/0052964 A1 | 3/2003 | Priestman et al. | |
| 2003/0055994 A1 | 3/2003 | Herrmann et al. | |
| 2003/0061606 A1 | 3/2003 | Hartwig et al. | |
| 2003/0063580 A1 | 4/2003 | Pond | |
| 2003/0063732 A1 | 4/2003 | Mcknight | |

(56) References Cited

U.S. PATENT DOCUMENTS

| | | |
|---|---|---|
| 2003/0065784 A1 | 4/2003 | Herrod |
| 2003/0065805 A1 | 4/2003 | Barnes, Jr. |
| 2003/0069693 A1 | 4/2003 | Snapp et al. |
| 2003/0070162 A1 | 4/2003 | Oshima et al. |
| 2003/0073432 A1 | 4/2003 | Meade, II |
| 2003/0074398 A1* | 4/2003 | Matsuo ............... 709/203 |
| 2003/0083055 A1 | 5/2003 | Riordan et al. |
| 2003/0084104 A1 | 5/2003 | Salem et al. |
| 2003/0084121 A1 | 5/2003 | De Boor et al. |
| 2003/0093503 A1 | 5/2003 | Yamaki et al. |
| 2003/0093790 A1 | 5/2003 | Logan et al. |
| 2003/0099367 A1 | 5/2003 | Okamura |
| 2003/0107580 A1 | 6/2003 | Egawa et al. |
| 2003/0110450 A1 | 6/2003 | Sakai |
| 2003/0117376 A1 | 6/2003 | Ghulam |
| 2003/0119479 A1 | 6/2003 | Arima et al. |
| 2003/0119485 A1 | 6/2003 | Ogasawara |
| 2003/0119562 A1 | 6/2003 | Kokubo |
| 2003/0120784 A1 | 6/2003 | Johnson et al. |
| 2003/0125008 A1 | 7/2003 | Shimamura |
| 2003/0132928 A1 | 7/2003 | Kori |
| 2003/0135563 A1 | 7/2003 | Bodin et al. |
| 2003/0137970 A1 | 7/2003 | Odman |
| 2003/0144024 A1 | 7/2003 | Luo |
| 2003/0148772 A1 | 8/2003 | Ben-Ari |
| 2003/0149662 A1 | 8/2003 | Shore |
| 2003/0153355 A1 | 8/2003 | Warren |
| 2003/0156208 A1 | 8/2003 | Obradovich |
| 2003/0166399 A1 | 9/2003 | Tokkonen et al. |
| 2003/0169329 A1 | 9/2003 | Parker et al. |
| 2003/0201982 A1 | 10/2003 | Iesaka |
| 2003/0204562 A1 | 10/2003 | Hwang |
| 2003/0208541 A1 | 11/2003 | Musa |
| 2003/0220835 A1 | 11/2003 | Barnes, Jr. |
| 2003/0222762 A1 | 12/2003 | Beigl et al. |
| 2003/0222982 A1 | 12/2003 | Hamdan et al. |
| 2003/0223554 A1 | 12/2003 | Zhang |
| 2003/0224760 A1 | 12/2003 | Day |
| 2003/0227570 A1 | 12/2003 | Kim et al. |
| 2003/0229900 A1 | 12/2003 | Reisman |
| 2003/0236709 A1 | 12/2003 | Hendra et al. |
| 2003/0236866 A1 | 12/2003 | Light |
| 2004/0003307 A1 | 1/2004 | Tsuji |
| 2004/0004616 A1 | 1/2004 | Konya et al. |
| 2004/0027369 A1 | 2/2004 | Kellock et al. |
| 2004/0029640 A1 | 2/2004 | Masuyama et al. |
| 2004/0033795 A1 | 2/2004 | Walsh et al. |
| 2004/0034692 A1 | 2/2004 | Eguchi et al. |
| 2004/0052504 A1 | 3/2004 | Yamada et al. |
| 2004/0060061 A1 | 3/2004 | Parker |
| 2004/0067751 A1 | 4/2004 | Vandermeijden et al. |
| 2004/0068399 A1 | 4/2004 | Ding |
| 2004/0072595 A1 | 4/2004 | Anson et al. |
| 2004/0082321 A1 | 4/2004 | Kontianinen |
| 2004/0087326 A1 | 5/2004 | Dunko et al. |
| 2004/0092255 A1 | 5/2004 | Ji et al. |
| 2004/0103303 A1 | 5/2004 | Yamauchi et al. |
| 2004/0107072 A1 | 6/2004 | Dietrich et al. |
| 2004/0114732 A1 | 6/2004 | Choe et al. |
| 2004/0117108 A1 | 6/2004 | Nemeth |
| 2004/0128359 A1 | 7/2004 | Horvitz et al. |
| 2004/0137893 A1 | 7/2004 | Muthuswamy et al. |
| 2004/0139208 A1 | 7/2004 | Tuli |
| 2004/0142678 A1 | 7/2004 | Krasner |
| 2004/0150725 A1 | 8/2004 | Taguchi |
| 2004/0157664 A1 | 8/2004 | Link |
| 2004/0166832 A1 | 8/2004 | Portman et al. |
| 2004/0166879 A1 | 8/2004 | Meadows et al. |
| 2004/0174863 A1 | 9/2004 | Caspi et al. |
| 2004/0183937 A1 | 9/2004 | Viinikanoja et al. |
| 2004/0185865 A1 | 9/2004 | Maanoja |
| 2004/0189827 A1 | 9/2004 | Kim et al. |
| 2004/0198374 A1 | 10/2004 | Bajikar |
| 2004/0203520 A1 | 10/2004 | Schirtzinger et al. |
| 2004/0203904 A1 | 10/2004 | Gwon et al. |
| 2004/0203909 A1 | 10/2004 | Koster |
| 2004/0204018 A1 | 10/2004 | Kuo |
| 2004/0204035 A1 | 10/2004 | Raghuram et al. |
| 2004/0204126 A1 | 10/2004 | Reyes et al. |
| 2004/0216037 A1 | 10/2004 | Hishida et al. |
| 2004/0218738 A1 | 11/2004 | Arai et al. |
| 2004/0219951 A1 | 11/2004 | Holder |
| 2004/0223049 A1 | 11/2004 | Taniguchi et al. |
| 2004/0235520 A1 | 11/2004 | Cadiz et al. |
| 2004/0242240 A1 | 12/2004 | Lin |
| 2004/0248586 A1 | 12/2004 | Patel et al. |
| 2004/0252197 A1 | 12/2004 | Fraley et al. |
| 2004/0259537 A1 | 12/2004 | Ackley |
| 2004/0264662 A1 | 12/2004 | Silver |
| 2004/0266418 A1 | 12/2004 | Kotzin |
| 2004/0267628 A1 | 12/2004 | Stillman |
| 2005/0004749 A1 | 1/2005 | Park |
| 2005/0032527 A1 | 2/2005 | Sheha et al. |
| 2005/0036509 A1 | 2/2005 | Acharya et al. |
| 2005/0046584 A1 | 3/2005 | Breed |
| 2005/0048987 A1 | 3/2005 | Glass |
| 2005/0070257 A1 | 3/2005 | Saarinen et al. |
| 2005/0075097 A1 | 4/2005 | Lehikoinen et al. |
| 2005/0090768 A1 | 4/2005 | Brattesani et al. |
| 2005/0113080 A1 | 5/2005 | Nishimura |
| 2005/0113113 A1 | 5/2005 | Reed |
| 2005/0120225 A1 | 6/2005 | Kirsch et al. |
| 2005/0136949 A1 | 6/2005 | Barnes, Jr. |
| 2005/0144560 A1 | 6/2005 | Gruen et al. |
| 2005/0151877 A1 | 7/2005 | Fisher |
| 2005/0159189 A1 | 7/2005 | Iyer |
| 2005/0163289 A1 | 7/2005 | Caspi et al. |
| 2005/0164684 A1 | 7/2005 | Chen et al. |
| 2005/0165871 A1 | 7/2005 | Barrs, II et al. |
| 2005/0166242 A1 | 7/2005 | Matsumoto et al. |
| 2005/0186954 A1 | 8/2005 | Kenney |
| 2005/0192030 A1 | 9/2005 | Asthana et al. |
| 2005/0207555 A1 | 9/2005 | Lee et al. |
| 2005/0227731 A1 | 10/2005 | Kall |
| 2005/0235312 A1 | 10/2005 | Karaoguz et al. |
| 2005/0261945 A1 | 11/2005 | Mougin et al. |
| 2005/0272504 A1 | 12/2005 | Eguchi et al. |
| 2005/0282582 A1 | 12/2005 | Slotznick |
| 2006/0003813 A1 | 1/2006 | Seligmann et al. |
| 2006/0031407 A1 | 2/2006 | Dispensa et al. |
| 2006/0033809 A1 | 2/2006 | Farley |
| 2006/0035628 A1 | 2/2006 | Miller et al. |
| 2006/0041923 A1 | 2/2006 | McQuaide, Jr. |
| 2006/0052100 A1 | 3/2006 | Almgren |
| 2006/0059038 A1 | 3/2006 | Iuchi et al. |
| 2006/0084413 A1 | 4/2006 | Myoung |
| 2006/0114100 A1 | 6/2006 | Ghabra et al. |
| 2006/0121986 A1 | 6/2006 | Pelkey et al. |
| 2006/0126284 A1 | 6/2006 | Moscovitch |
| 2006/0133590 A1 | 6/2006 | Jiang |
| 2006/0140173 A1 | 6/2006 | Hoover |
| 2006/0140387 A1 | 6/2006 | Boldt |
| 2006/0143655 A1 | 6/2006 | Ellis et al. |
| 2006/0166650 A1 | 7/2006 | Berger et al. |
| 2006/0167677 A1 | 7/2006 | Bitzer |
| 2006/0206913 A1 | 9/2006 | Jerding et al. |
| 2006/0229114 A2 | 10/2006 | Kim |
| 2006/0234693 A1 | 10/2006 | Isidore et al. |
| 2006/0234758 A1 | 10/2006 | Parupudi et al. |
| 2006/0258396 A1* | 11/2006 | Matsuoka ............... 455/556.1 |
| 2006/0262911 A1 | 11/2006 | Chin et al. |
| 2006/0276172 A1 | 12/2006 | Rydgren et al. |
| 2006/0284732 A1 | 12/2006 | Brock-Fisher |
| 2007/0005809 A1 | 1/2007 | Kobayashi et al. |
| 2007/0015550 A1 | 1/2007 | Kayanuma |
| 2007/0032255 A1 | 2/2007 | Koo et al. |
| 2007/0037605 A1 | 2/2007 | Logan |
| 2007/0050832 A1 | 3/2007 | Wright et al. |
| 2007/0061845 A1 | 3/2007 | Barnes |
| 2007/0097879 A1 | 5/2007 | Bleckert et al. |
| 2007/0099703 A1 | 5/2007 | Terebilo |
| 2007/0109262 A1 | 5/2007 | Oshima et al. |
| 2007/0135145 A1 | 6/2007 | Lee et al. |
| 2007/0135150 A1 | 6/2007 | Ushiki et al. |

(56) References Cited

U.S. PATENT DOCUMENTS

| | | |
|---|---|---|
| 2007/0142047 A1 | 6/2007 | Heeschen et al. |
| 2007/0190944 A1 | 8/2007 | Doan et al. |
| 2007/0191029 A1 | 8/2007 | Zarem et al. |
| 2007/0204014 A1 | 8/2007 | Greer et al. |
| 2007/0216760 A1 | 9/2007 | Kondo et al. |
| 2007/0218891 A1 | 9/2007 | Cox |
| 2007/0262848 A1 | 11/2007 | Berstis et al. |
| 2007/0293240 A1 | 12/2007 | Drennan et al. |
| 2008/0006762 A1 | 1/2008 | Fadell et al. |
| 2008/0014917 A1 | 1/2008 | Rhoads et al. |
| 2008/0016534 A1 | 1/2008 | Ortiz et al. |
| 2008/0039125 A1 | 2/2008 | Fan et al. |
| 2008/0058005 A1 | 3/2008 | Zicker et al. |
| 2008/0070561 A1 | 3/2008 | Keum et al. |
| 2008/0070588 A1 | 3/2008 | Morin |
| 2008/0082930 A1 | 4/2008 | Omernick et al. |
| 2008/0104544 A1 | 5/2008 | Collins et al. |
| 2008/0109840 A1 | 5/2008 | Walter et al. |
| 2008/0140686 A1 | 6/2008 | Hong et al. |
| 2008/0146272 A1 | 6/2008 | Rao et al. |
| 2008/0151696 A1 | 6/2008 | Giroud et al. |
| 2008/0172173 A1 | 7/2008 | Chang et al. |
| 2008/0176545 A1 | 7/2008 | Dicke et al. |
| 2008/0242271 A1 | 10/2008 | Schmidt et al. |
| 2008/0242283 A1 | 10/2008 | Ruckart |
| 2008/0254811 A1 | 10/2008 | Stewart |
| 2008/0299989 A1 | 12/2008 | King et al. |
| 2009/0017812 A1 | 1/2009 | Chan et al. |
| 2009/0047972 A1 | 2/2009 | Neeraj |
| 2009/0111486 A1 | 4/2009 | Burstrom |
| 2009/0124243 A1 | 5/2009 | Routley et al. |
| 2009/0150807 A1 | 6/2009 | George et al. |
| 2009/0153490 A1 | 6/2009 | Nymark et al. |
| 2009/0186628 A1 | 7/2009 | Yonker et al. |
| 2009/0221330 A1 | 9/2009 | Tomimori |
| 2009/0290369 A1 | 11/2009 | Schofield et al. |
| 2009/0319947 A1 | 12/2009 | Wang et al. |
| 2010/0030557 A1 | 2/2010 | Molloy et al. |
| 2010/0062740 A1 | 3/2010 | Ellis et al. |
| 2010/0145700 A1 | 6/2010 | Kennewick et al. |
| 2012/0064874 A1 | 3/2012 | Pierce et al. |
| 2013/0298059 A1 | 11/2013 | Raskin |

FOREIGN PATENT DOCUMENTS

| | | |
|---|---|---|
| JP | H11/195137 A1 | 7/1999 |
| JP | 2002/252691 A1 | 9/2002 |
| JP | 2003/078977 A1 | 3/2003 |
| JP | 2003/228726 A1 | 8/2003 |
| JP | 2003/263656 A1 | 9/2003 |
| JP | 2005/216149 A1 | 8/2005 |
| WO | 03001457 A1 | 1/2003 |
| WO | 03096660 A1 | 11/2003 |

OTHER PUBLICATIONS

Casio, "Pocket PC User's Guide" published on Feb. 3, 2000.
Audiovox, "Pocket PC Phone User Manual" published on Mar. 19, 2004.
Palm, "Using your Treo" published in Feb. 2004.
Palm, "Palm Treo 600 Support Knowledge Library, Solution ID 29492" published in Jan. 2004.
Dataviz, "Documents to Go included on Treo 600 Smartphone from palmOne" published in Nov. 2003.
Palm, "Treo 600 smartphone" published in 2003.
FCC's wireless Enhanced 911 (E911) rules, Phase I and Phase II.
HI Corporation's company history (http://www.hicorp.co.jp/english/corporate/history.html) Copyright notice on the web: (c) 2007-2011 HI Corporation. All Rights Reserved.
HI Corporation to Offer 3D Graphics to Motorola Mobile Phone Platform Customers (http://www.wirelessdevnet.com/news/2003/203/news7.html) Published on the web on: Jul. 21, 2003.
Development of NTT docomo Mova N504i—NEC Gi-Ho (Technology Magazine) vol. 56 No. 5/2003, p. 144 Published in: May 2003.
Winners of Tokyo Venture Technology Grand Prize in 2000-2009 (http://www.sangyo-rodo.metro.tokyo.jp/shoko/sogyo/venture/2000-2009winners.pdf) Published in: 2000-2009.

* cited by examiner

COMMUNICATION DEVICE

CROSS REFERENCE TO RELATED APPLICATIONS

This application is a continuation of U.S. Ser. No. 13/472,382 filed 2012 May 15, which is a continuation of U.S. Ser. No. 12/549,417 filed 2009 Aug. 28, which is a continuation of U.S. Ser. No. 11/276,957 filed 2006 Mar. 18 which claims the benefit of U.S. Provisional Application No. 60/594,445 filed 2005 Apr. 8, which is hereby incorporated herein by reference in its entirety. Further, U.S. Ser. No. 10/711,265 filed 2004 Sep. 7 (hereinafter the "Prior Filed Application") is hereby incorporated herein by reference in its entirety.

BACKGROUND OF INVENTION

The invention relates to communication device and more particularly to the communication device which is capable to communicate with another communication device in a wireless fashion.

U.S. Pat. No. 6,397,054 is introduced as prior art of the present invention of which the summary is the following: "A method is provided for communicating emergency messages using non-voice connections. An emergency short message service is added to digital wireless standards, such as GSM-based standards. This service allows users to place an emergency call with the specific purpose of sending an emergency data message using Short Message Service (SMS). Such data messages might include the caller's geographical position, electronic mail messages, or possibly, diagnostic information. As a result, the emergency data messaging will be given the same access conditions as voice emergency calls in a cellular or satellite communications system." However, the foregoing prior art does not disclose the communication device which includes a TV phone pausing visual data selecting implementer, a TV phone implementer, a TV phone pausing visual data transferring implementer, and a moving picture data replaying implementer.

SUMMARY OF INVENTION

It is an object of the present invention to provide a device capable to implement a plurality of functions. It is another object of the present invention to provide merchandise to merchants attractive to the customers in the U.S. It is another object of the present invention to provide mobility to the users of communication device. It is another object of the present invention to provide more convenience to the customers in the U.S. It is another object of the present invention to provide more convenience to the users of communication device or any tangible thing in which the communication device is fixedly or detachably (i.e., removably) installed. It is another object of the present invention to overcome the shortcomings associated with the foregoing prior arts. It is another object of the present invention to provide a device capable to implement a plurality of functions. The present invention introduces the communication device which includes a TV phone pausing visual data selecting implementer, a TV phone implementer, a TV phone pausing visual data transferring implementer, and a moving picture data replaying implementer.

BRIEF DESCRIPTION OF DRAWINGS

The above and other aspects, features, and advantages of the invention will be better understood by reading the following more particular description of the invention, presented in conjunction with the following drawing(s), wherein.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrates only one function or mode in order to avoid complexity in its explanation, however, such description does not mean that only one function or mode can be implemented at a time. In other words, more than one function or mode can be implemented simultaneously by way of utilizing the same random access memory. In addition, the figure numbers are cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

Figure 1:
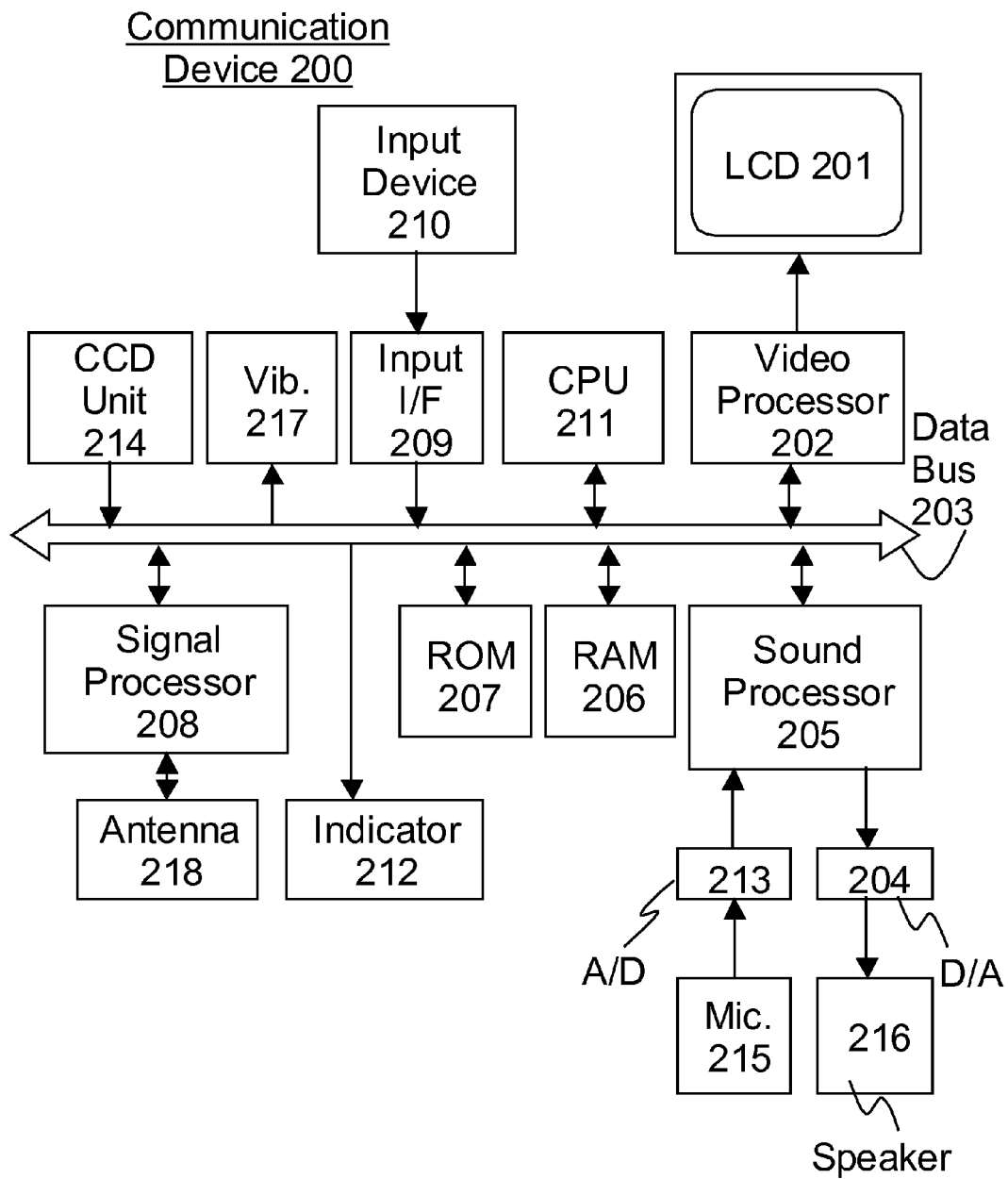
FIG. 1 is a block diagram illustrating an exemplary embodiment of the present invention.

FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

Figure 2:
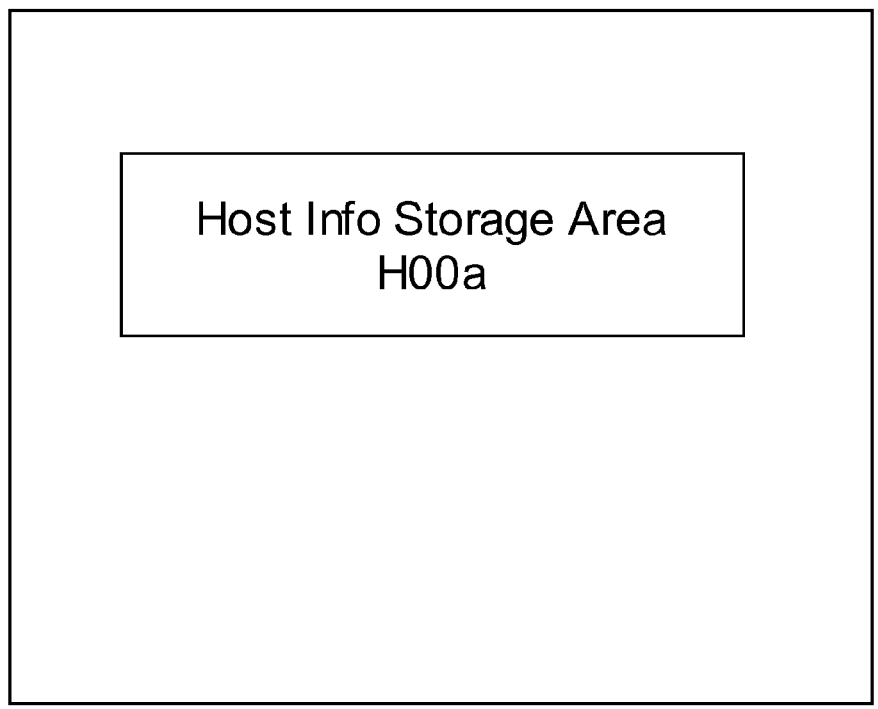
FIG. 2 is a block diagram illustrating an exemplary embodiment of the present invention.

FIG. 2 illustrates the data stored in Host H. As described in FIG. 2, Host H includes Host Information Storage Area H00a which stores various types of data to assist and/or co-operate with Communication Device 200 to implement all modes, functions, and systems described in this specification and the Prior Filed Application. As another embodiment, Host H may be composed of a plurality of computers, i.e., one master computer and a plurality of slave computers, wherein the master computer is connected to the plurality of slave computers. As another embodiment, Host H may also be composed of a plurality of master computers by way of utilizing peer-to-peer connection.

<<Current Location Non-notifying Function>>

Paragraph(s) [0020] through [0037] illustrate the current location non-notifying function wherein the current geographic location of the user of Communication Device 200 is not disclosed to another device when the user is currently located in a private area (e.g., rest room). The present function may be implemented in combination with the functions described in this specification which discloses the current geographic location of the user to another device.

This Paragraph [0020] illustrates the storage area included in Host H (FIG. 2). In the present embodiment, Host H includes Current Location Non-notifying Information Storage Area H160a of which the data and the software programs stored therein are described in Paragraph(s) [0021].

This Paragraph [0021] illustrates the storage areas included in Current Location Non-notifying Information Storage Area H160a (Paragraph [0020]). In the present embodiment, Current Location Non-notifying Information Storage Area H160a includes Current Location Non-notifying Data Storage Area H160b and Current Location Non-notifying Software Storage Area H160c. Current Location Non-notifying Data Storage Area H160b stores the data necessary to implement the present function on the side of Host H (FIG. 2), such as the ones described in Paragraph(s) [0022]. Current Location Non-notifying Software Storage Area H160c stores the software programs necessary to implement the present function on the side of Host H, such as the ones described in Paragraph(s) [0023].

This Paragraph [0022] illustrates the storage areas included in Current Location Non-notifying Data Storage Area H160b (Paragraph [0021]). In the present embodiment, Current Location Non-notifying Data Storage Area H160b includes Private Area Location Data Storage Area H160b1, Private Area Indicating Data Storage Area H160b2, Current Geographic Location Data Storage Area H160b3, Map Data Storage Area H160b4, and Work Area H160b5. Private Area Location Data Storage Area H160b1 stores the private area location data which indicates the geographic location of the private area. Here, the private area is the area where the user does not desire to disclose that he/she is currently located therein (e.g., rest room). Private Area Indicating Data Storage Area H160b2 stores the private area indicating data which is a message indicating that the current location of the user of Communication Device 200 can not be disclosed because he/she is currently in a private area. As another embodiment, the private area indicating data may a message indicating that the current geographic location of Communication Device 200 is not found or unavailable. Current Geographic Location Data Storage Area H160b3 stores the current geographic location data which indicates the current geographic location of Communication Device 200. Map Data Storage Area H160b4 stores the data representing a detailed geographic map. The data also includes the layout (i.e., the locations of each rooms included therein) of the artificial structures (e.g., buildings) included in the foregoing detailed geographic map. Work Area H160b5 is utilized as a work area to perform calculation and temporarily store data.

This Paragraph [0023] illustrates the software programs stored in Current Location Non-notifying Software Storage Area H160c (Paragraph [0021]). In the present embodiment, Current Location Non-notifying Software Storage Area H160c stores Private Area Setting Software H160c1, Current Geographic Location Identifying Software H160c2, and Private Area Indicating Data Displaying Software H160c3. Private Area Setting Software H160c1 is the software program described in Paragraph(s) [0029] and [0030]. Current Geographic Location Identifying Software H160c2 is the software program described in Paragraph(s) [0031]. Private Area Indicating Data Displaying Software H160c3 is the software program described in Paragraph(s) [0032].

This Paragraph [0024] illustrates the storage area included in RAM 206 (FIG. 1) of Communication Device 200. In the present embodiment, RAM 206 includes Current Location Non-notifying Information Storage Area 206160a of which the data and the software programs stored therein are described in Paragraph(s) [0026].

The data and/or the software programs necessary to implement the present function may be downloaded from Host H (FIG. 2) to Communication Device 200.

This Paragraph [0026] illustrates the storage areas included in Current Location Non-notifying Information Storage Area 206160a (Paragraph [0024]). In the present embodiment, Current Location Non-notifying Information Storage Area 206160a includes Current Location Non-notifying Data Storage Area 206160b and Current Location Non-notifying Software Storage Area 206160c. Current Location Non-notifying Data Storage Area 206160b stores the data necessary to implement the present function on the side of Communication Device 200, such as the ones described in Paragraph(s) [0027]. Current Location Non-notifying Software Storage Area 206160c stores the software programs necessary to implement the present function on the side of Communication Device 200, such as the ones described in Paragraph(s) [0028].

This Paragraph [0027] illustrates the storage areas included in Current Location Non-notifying Data Storage Area 206160b (Paragraph [0026]). In the present embodiment, Current Location Non-notifying Data Storage Area 206160*b* includes Private Area Location Data Storage Area 206160*b*1, Private Area Indicating Data Storage Area 206160*b*2, Current Geographic Location Data Storage Area 206160*b*3, Map Data Storage Area 206160*b*4, and Work Area 206160*b*5. Private Area Location Data Storage Area 206160*b*1 stores the private area location data which indicates the geographic location of the private area. Here, the private area is the area where the user does not desire to disclose that he/she is currently located therein (e.g., rest room). Private Area Indicating Data Storage Area 206160*b*2 stores the private area indicating data which is a message indicating that the current location of the user of Communication Device 200 can not be disclosed because he/she is currently in a private area. As another embodiment, the private area indicating data may a message indicating that the current geographic location of Communication Device 200 is not found or unavailable. Current Geographic Location Data Storage Area 206160*b*3 stores the current geographic location data which indicates the current geographic location of Communication Device 200. Map Data Storage Area 206160*b*4 stores the data representing a detailed geographic map. The data also includes the layout (i.e., the locations of each rooms included therein) of the artificial structures (e.g., buildings) included in the foregoing detailed geographic map. Work Area 206160*b*5 is utilized as a work area to perform calculation and temporarily store data.

This Paragraph [0028] illustrates the software programs stored in Current Location Non-notifying Software Storage Area 206160*c* (Paragraph [0026]). In the present embodiment, Current Location Non-notifying Software Storage Area 206160*c* stores Private Area Setting Software 206160*c*1, Current Geographic Location Identifying Software 206160*c*2, and Private Area Indicating Data Displaying Software 206160*c*3. Private Area Setting Software 206160*c*1 is the software program described in Paragraph(s) [0029], [0030], [0034], and [0035]. Current Geographic Location Identifying Software 206160*c*2 is the software program described in Paragraph(s) [0036]. Private Area Indicating Data Displaying Software 206160*c*3 is the software program described in Paragraph(s) [0037].

This Paragraph [0029] illustrate Private Area Setting Software H160*c*1 (Paragraph [0023]) of Host H (FIG. 2) and Private Area Setting Software 206160*c*1 (Paragraph [0028]) of Communication Device 200, which identify the private area from a map displayed on LCD 201 (FIG. 1). In the present embodiment, Host H retrieves the map data from Map Data Storage Area H160*b*4 (Paragraph [0022]) and sends the data to Communication Device 200 (S1). CPU 211 (FIG. 1) receives the map data from Host H in a wireless fashion and stores the data in Work Area 206160*b*5 (Paragraph [0027]) (S2). CPU 211 (FIG. 1) retrieves the map data from Work Area 206160*b*5 (Paragraph [0027]) and displays the data on LCD 201 (FIG. 1) (S3). The user selects by utilizing Input Device 210 (FIG. 1) or via voice recognition system an artificial structure (e.g., building) in the map displayed on LCD 201 (FIG. 1) (S4). CPU 211 (FIG. 1) displays the layout (i.e., the locations of each room) of the artificial structure selected in the previous step (S5). The user selects a room (e.g., rest room) by utilizing Input Device 210 (FIG. 1) or via voice recognition system (S6). CPU 211 (FIG. 1) sends the identification of the room selected in the previous step to Host H in a wireless fashion (S7). Host H receives the identification of the room sent in the previous step and identifies the geographic location thereof (S8). Host H stores the geographic location identified in the previous step as the private area location data in Private Area Location Data Storage Area H160*b*1 (Paragraph [0022]) (S9).

This Paragraph [0030] illustrates Private Area Setting Software H160*c*1 (Paragraph [0023]) of Host H (FIG. 2) and Private Area Setting Software 206160*c*1 (Paragraph [0028]) of Communication Device 200, which set the geographic location at which the user of Communication Device 200 is currently located as the private area. Assuming that the user of Communication Device 200 is currently located in a rest room. In the present embodiment, the user of Communication Device 200 inputs a current location private area signal by utilizing Input Device 210 (FIG. 1) or via voice recognition system (S1). Here, the current location private area signal indicates that the geographic location where the user of Communication Device 200 is currently located is a private area. CPU 211 (FIG. 1) sends the current location private area signal to Host H in a wireless fashion (S2). Host H receives the current location private area signal and identifies the current geographic location of Communication Device 200 (S3). Host H stores the data indicating the current geographic location identified in the previous step as the private area location data in Private Area Location Data Storage Area H160*b*1 (Paragraph [0022]) (S4).

This Paragraph [0031] illustrates Current Geographic Location Identifying Software H160*c*2 (Paragraph [0023]) of Communication Device 200, which identifies the current geographic location of Communication Device 200. In the present embodiment, CPU 211 (FIG. 1) identifies the current geographic location of Communication Device 200 (S1). CPU 211 (FIG. 1) stores the data indicating the current geographic location identified in the previous step as the current geographic location data in Current Geographic Location Data Storage Area H160*b*3 (Paragraph [0022]) (S2). The foregoing sequence is performed periodically.

This Paragraph [0032] illustrates Private Area Indicating Data Displaying Software H160*c*3 (Paragraph [0023]) of Host H (FIG. 2), which displays the private area indicating data when Communication Device 200 is located in a private area (e.g., rest room). In the present embodiment, Host H retrieves the current geographic location data from Current Geographic Location Data Storage Area H160*b*3 (Paragraph [0022]) (S1). Host H retrieves the private area location data from Private Area Location Data Storage Area H160*b*1 (Paragraph [0022]) (S2). If the current geographic location data retrieved in S1 is within the private area location data retrieved in the previous step, Host H proceeds to the next step (S3). Host H retrieves the private area indicating data from Private Area Indicating Data Storage Area H160*b*2 (Paragraph [0022]) (S4). Host H sends the private area indicating data retrieved in the previous step to another device instead of the data indicating the current geographic location of Communication Device 200 (S5). The foregoing sequence is performed periodically.

Paragraph(s) [0034] through [0037] illustrate another embodiment wherein Communication Device 200 plays the major role in implementing the present function.

This Paragraph [0034] illustrate Private Area Setting Software 206160*c*1 (Paragraph [0028]) of Communication Device 200, which identifies the private area from the map displayed on LCD 201 (FIG. 1). In the present embodiment, CPU 211 (FIG. 1) retrieves the map data from Map Data Storage Area 206160*b*4 (Paragraph [0027]) and displays the data on LCD 201 (FIG. 1) (S1). The user selects by utilizing Input Device 210 (FIG. 1) or via voice recognition system an artificial structure (e.g., building) in the map displayed on LCD 201 (FIG. 1) (S2). CPU 211 (FIG. 1) displays the layout (i.e., the locations of each room) of the artificial structure selected in the previous step (S3). The user selects a room (e.g., rest room) by utilizing Input Device 210 (FIG. 1) or via voice recognition system (S4). CPU 211 (FIG. 1) identifies the geographic location of the room selected in the previous step (S5). CPU 211 (FIG. 1) stores the geographic location identified in the previous step as the private area location data in Private Area Location Data Storage Area 206160b1 (Paragraph [0027]) (S6).

This Paragraph [0035] illustrates Private Area Setting Software 206160c1 (Paragraph [0028]) of Communication Device 200, which sets the geographic location at which the user of Communication Device 200 is currently located as the private area. Assuming that the user of Communication Device 200 is currently located in a rest room. In the present embodiment, the user of Communication Device 200 inputs a current location private area signal by utilizing Input Device 210 (FIG. 1) or via voice recognition system (S1). Here, the current location private area signal indicates that the geographic location where the user of Communication Device 200 is currently located is a private area. CPU 211 (FIG. 1) identifies the current geographic location of Communication Device 200 (S2). CPU 211 (FIG. 1) stores the data indicating the current geographic location identified in the previous step as the private area location data in Private Area Location Data Storage Area 206160b1 (Paragraph [0027]) (S3).

This Paragraph [0036] illustrates Current Geographic Location Identifying Software 206160c2 (Paragraph [0028]) of Communication Device 200, which identifies the current geographic location of Communication Device 200. In the present embodiment, CPU 211 (FIG. 1) identifies the current geographic location of Communication Device 200 (S1). CPU 211 (FIG. 1) stores the data indicating the current geographic location identified in the previous step as the current geographic location data in Current Geographic Location Data Storage Area 206160b3 (Paragraph [0027]) (S2). The foregoing sequence is performed periodically.

This Paragraph [0037] illustrates Private Area Indicating Data Displaying Software 206160c3 (Paragraph [0028]) of Communication Device 200, which displays the private area indicating data when Communication Device 200 is located in a private area (e.g., rest room). In the present embodiment, CPU 211 (FIG. 1) retrieves the current geographic location data from Current Geographic Location Data Storage Area 206160b3 (Paragraph [0027]) (S1). CPU 211 (FIG. 1) retrieves the private area location data from Private Area Location Data Storage Area 206160b1 (Paragraph [0027]) (S2). If the current geographic location data retrieved in S1 is within the private area location data retrieved in the previous step, CPU 211 (FIG. 1) proceeds to the next step (S3). CPU 211 (FIG. 1) retrieves the private area indicating data from Private Area Indicating Data Storage Area 206160b2 (Paragraph [0027]) (S4). CPU 211 (FIG. 1) sends the private area indicating data retrieved in the previous step to another device instead of the data indicating the current geographic location of Communication Device 200 in a wireless fashion (S5). The foregoing sequence is performed periodically.

<<TV Program Information Displaying Function>>

Paragraph(s) [0040] through [0057] illustrate the TV program info displaying function, wherein the TV program related data (e.g., TV program title, starting time, ending time, category, summary, and/or channel number) is displayed on LCD 201 (FIG. 1) with the TV program by implementing the present function.

This Paragraph [0040] illustrates the storage area included in Host H (FIG. 2). In the present embodiment, Host H includes TV Program Information Displaying Information Storage Area H179a of which the data and the software programs stored therein are described in Paragraph(s) [0041].

This Paragraph [0041] illustrates the storage areas included in TV Program Information Displaying Information Storage Area H179a (Paragraph [0040]). In the present embodiment, TV Program Information Displaying Information Storage Area H179a includes TV Program Information Displaying Data Storage Area H179b and TV Program Information Displaying Software Storage Area H179c. TV Program Information Displaying Data Storage Area H179b stores the data necessary to implement the present function on the side of Host H (FIG. 2), such as the ones described in Paragraph(s) [0042]. TV Program Information Displaying Software Storage Area H179c stores the software programs necessary to implement the present function on the side of Host H, such as the ones described in Paragraph(s) [0045].

This Paragraph [0042] illustrates the storage areas included in TV Program Information Displaying Data Storage Area H179b (Paragraph [0041]). In the present embodiment, TV Program Information Displaying Data Storage Area H179b includes TV Program Audiovisual Data Storage Area H179b1, TV Program Related Data Storage Area H179b2, and Work Area H179b3. TV Program Audiovisual Data Storage Area H179b1 stores the data described in Paragraph(s) [0043]. TV Program Related Data Storage Area H179b2 stores the data described in Paragraph(s) [0044]. Work Area H179b3 is utilized as a work area to perform calculation and temporarily store data.

This Paragraph [0043] illustrates the data stored in TV Program Audiovisual Data Storage Area H179b1 (Paragraph [0042]). In the present embodiment, TV Program Audiovisual Data Storage Area H179b1 comprises two columns, i.e., 'TV Program Audiovisual ID' and 'TV Program Audiovisual Data'. Column 'TV Program Audiovisual ID' stores the TV program audiovisual IDs, and each TV program audiovisual ID is an identification of the corresponding TV program audiovisual data stored in column 'TV Program Audiovisual Data'. Column 'TV Program Audiovisual Data' stores the TV program audiovisual data, and each TV program audiovisual data is the audiovisual data of a TV program (e.g., cartoon, comedy, drama, news, science fiction, soap opera, and talk show) designed to be distributed to Communication Device 200 and displayed on LCD 201 (FIG. 1) and output from Speaker 216 (FIG. 1). In the present embodiment, TV Program Audiovisual Data Storage Area H179b1 stores the following data: 'TV Program Audiovisual#1' and the corresponding 'TV Program Audiovisual Data#1'; 'TV Program Audiovisual#2' and the corresponding 'TV Program Audiovisual Data#2'; 'TV Program Audiovisual#3' and the corresponding 'TV Program Audiovisual Data#3'; and 'TV Program Audiovisual#4' and the corresponding 'TV Program Audiovisual Data#4'.

This Paragraph [0044] illustrates the data stored in TV Program Related Data Storage Area H179b2 (Paragraph [0042]). In the present embodiment, TV Program Related Data Storage Area H179b2 comprises two columns, i.e., 'TV Program Audiovisual ID' and 'TV Program Related Data'. Column 'TV Program Audiovisual ID' stores the TV program audiovisual IDs, and each TV program audiovisual ID is an identification of the corresponding TV program related data stored in column 'TV Program Related Data'. The TV program audiovisual IDs stored in the present storage area are identical to the ones described in the previous paragraph. Column 'TV Program Related Data' stores the TV program related data, and each TV program related data includes the following data: the TV program title data, the TV program starting time data, the TV program ending time data, the TV program category data, the TV program summary data, the cast data, the producer data, the original airdate data, the TV channel number data, and/or the broadcast station data. The TV program title data indicates the title of the TV program. The TV program starting time data indicates the starting time of the TV program represented by the TV program title data. The TV program ending time data indicates the ending time of the TV program represented by the TV program title data. The TV program category data indicates the category to which the TV program represented by the TV program title data pertains (e.g., cartoon, comedy, drama, news, science fiction, soap opera, and talk show). The TV program summary data indicates the summary (or the outline) of the TV program represented by the TV program title data. The cast data indicates the name of each performer, cast, actor, and/or actress participating in the TV program represented by the TV program title data. The cast data also includes the profile of the foregoing performer, cast, actor, and/or actress. The cast data may include the image data (i.e., photo data) of the foregoing performer, cast, actor, and/or actress. The producer data indicates the name of the producer who produced the TV program represented by the TV program title data. The producer data also includes the profile of the foregoing producer. The producer data may include the image data (i.e., photo data) of the foregoing producer. The original airdate data indicates the date at which the TV program represented by the TV program title data is (was) originally on-aired. The TV channel number data indicates the TV channel number (i.e., channel 1) at which the TV program represented by the TV program title data is on-aired. The broadcast station data indicates the name of the broadcast station (e.g., ABC) represented by the TV channel number data. In the present embodiment, TV Program Related Data Storage Area H179$b$2 stores the following data: 'TV Program Audiovisual#1' and the corresponding 'TV Program Related Data#1'; 'TV Program Audiovisual#2' and the corresponding 'TV Program Related Data#2'; 'TV Program Audiovisual#3' and the corresponding 'TV Program Related Data#3'; and 'TV Program Audiovisual#4' and the corresponding 'TV Program Related Data#4'.

This Paragraph [0045] illustrates the software programs stored in TV Program Information Displaying Software Storage Area H179$c$ (Paragraph [0041]). In the present embodiment, TV Program Information Displaying Software Storage Area H179$c$ stores TV Program Information Displaying Data Storing Software H179$c$1, TV Program Related Data Displaying Software H179$c$2, and TV Program Information Displaying Data Distributing Software H179$c$3. TV Program Information Displaying Data Storing Software H179$c$1 is the software program described in Paragraph(s) [0053]. TV Program Related Data Displaying Software H179$c$2 is the software program described in Paragraph(s) [0054]. TV Program Information Displaying Data Distributing Software H179$c$3 is the software program described in Paragraph(s) [0056].

This Paragraph [0046] illustrates the storage area included in RAM 206 (FIG. 1) of Communication Device 200. In the present embodiment, RAM 206 includes TV Program Information Displaying Information Storage Area 206179$a$ of which the data and the software programs stored therein are described in Paragraph(s) [0048].

The data and/or the software programs necessary to implement the present function may be downloaded from Host H (FIG. 2) to Communication Device 200.

This Paragraph [0048] illustrates the storage areas included in TV Program Information Displaying Information Storage Area 206179$a$ (Paragraph [0046]). In the present embodiment, TV Program Information Displaying Information Storage Area 206179$a$ includes TV Program Information Displaying Data Storage Area 206179$b$ and TV Program Information Displaying Software Storage Area 206179$c$. TV Program Information Displaying Data Storage Area 206179$b$ stores the data necessary to implement the present function on the side of Communication Device 200, such as the ones described in Paragraph(s) [0049]. TV Program Information Displaying Software Storage Area 206179$c$ stores the software programs necessary to implement the present function on the side of Communication Device 200, such as the ones described in Paragraph(s) [0052].

This Paragraph [0049] illustrates the storage areas included in TV Program Information Displaying Data Storage Area 206179$b$ (Paragraph [0048]). In the present embodiment, TV Program Information Displaying Data Storage Area 206179$b$ includes TV Program Audiovisual Data Storage Area 206179$b$1, TV Program Related Data Storage Area 206179$b$2, and Work Area 206179$b$3. TV Program Audiovisual Data Storage Area 206179$b$1 stores the data described in Paragraph(s) [0050]. TV Program Related Data Storage Area 206179$b$2 stores the data described in Paragraph(s) [0051]. Work Area 206179$b$3 is utilized as a work area to perform calculation and temporarily store data.

This Paragraph [0050] illustrates the data stored in TV Program Audiovisual Data Storage Area 206179$b$1 (Paragraph [0049]). In the present embodiment, TV Program Audiovisual Data Storage Area 206179$b$1 comprises two columns, i.e., 'TV Program Audiovisual ID' and 'TV Program Audiovisual Data'. Column 'TV Program Audiovisual ID' stores the TV program audiovisual IDs, and each TV program audiovisual ID is an identification of the corresponding TV program audiovisual data stored in column 'TV Program Audiovisual Data'. Column 'TV Program Audiovisual Data' stores the TV program audiovisual data, and each TV program audiovisual data is the audiovisual data of a TV program (e.g., cartoon, comedy, drama, news, science fiction, soap opera, and talk show) designed to be distributed to Communication Device 200 and displayed on LCD 201 (FIG. 1) and output from Speaker 216 (FIG. 1). In the present embodiment, TV Program Audiovisual Data Storage Area 206179$b$1 stores the following data: 'TV Program Audiovisual#1' and the corresponding 'TV Program Audiovisual Data#1'; 'TV Program Audiovisual#2' and the corresponding 'TV Program Audiovisual Data#2'; 'TV Program Audiovisual#3' and the corresponding 'TV Program Audiovisual Data#3'; and 'TV Program Audiovisual#4' and the corresponding 'TV Program Audiovisual Data#4'.

This Paragraph [0051] illustrates the data stored in TV Program Related Data Storage Area 206179$b$2 (Paragraph [0049]). In the present embodiment, TV Program Related Data Storage Area 206179$b$2 comprises two columns, i.e., 'TV Program Audiovisual ID' and 'TV Program Related Data'. Column 'TV Program Audiovisual ID' stores the TV program audiovisual IDs, and each TV program audiovisual ID is an identification of the corresponding TV program related data stored in column 'TV Program Related Data'. The TV program audiovisual IDs stored in the present storage area are identical to the ones described in the previous paragraph. Column 'TV Program Related Data' stores the TV program related data, and each TV program related data includes the following data: the TV program title data, the TV program starting time data, the TV program ending time data, the TV program category data, the TV program summary data, the cast data, the producer data, the original airdate data, the TV channel number data, and/or the broadcast station data. The TV program title data indicates the title of the TV program. The TV program starting time data indicates the starting time of the TV program represented by the TV program title data. The TV program ending time data indicates the ending time of the TV program represented by the TV program title data. The TV program category data indicates the category to which the TV program represented by the TV program title data pertains (e.g., cartoon, comedy, drama, news, science fiction, soap opera, and talk show). The TV program summary data indicates the summary (or the outline) of the TV program represented by the TV program title data. The cast data indicates the name of each performer, cast, actor, and/or actress participating in the TV program represented by the TV program title data. The cast data also includes the profile of the foregoing performer, cast, actor, and/or actress. The cast data may include the image data (i.e., photo data) of the foregoing performer, cast, actor, and/or actress. The producer data indicates the name of the producer who produced the TV program represented by the TV program title data. The producer data also includes the profile of the foregoing producer. The producer data may include the image data (i.e., photo data) of the foregoing producer. The original airdate data indicates the date at which the TV program represented by the TV program title data is (was) originally on-aired. The TV channel number data indicates the TV channel number (i.e., channel 1) at which the TV program represented by the TV program title data is on-aired. The broadcast station data indicates the name of the broadcast station (e.g., ABC) represented by the TV channel number data. In the present embodiment, TV Program Related Data Storage Area 206179b2 stores the following data: 'TV Program Audiovisual#1' and the corresponding 'TV Program Related Data#1'; 'TV Program Audiovisual#2' and the corresponding 'TV Program Related Data#2'; 'TV Program Audiovisual#3' and the corresponding 'TV Program Related Data#3'; and 'TV Program Audiovisual#4' and the corresponding 'TV Program Related Data#4'.

This Paragraph [0052] illustrates the software programs stored in TV Program Info Displaying Software Storage Area 206179c (Paragraph [0048]). In the present embodiment, TV Program Info Displaying Software Storage Area 206179c stores TV Program Related Data Displaying Software 206179c2 and TV Program Info Displaying Data Distributing Software 206179c3. TV Program Related Data Displaying Software 206179c2 is the software program described in Paragraph(s) [0054] and [0057]. TV Program Info Displaying Data Distributing Software 206179c3 is the software program described in Paragraph(s) [0056].

This Paragraph [0053] illustrate(s) TV Program Info Displaying Data Storing Software H179c1 (Paragraph [0045]) of Host H (FIG. 2), which stores the TV program information displaying data for purposes of distributing the data to Communication Device 200. In the present embodiment, Host H receives the TV program audiovisual data and the TV program related data from a broadcast center (not shown) (S1). Host H stores the TV program audiovisual data in TV Program Audiovisual Data Storage Area H179b1 (Paragraph [0043]) (S2). Host H stores the TV program related data in TV Program Related Data Storage Area H179b2 (Paragraph [0044]) (S3). The foregoing sequence is performed periodically.

This Paragraph [0054] illustrate(s) TV Program Related Data Displaying Software H179c2 (Paragraph [0045]) of Host H (FIG. 2) and TV Program Related Data Displaying Software 206179c2 (Paragraph [0052]) of Communication Device 200, which display the TV program related data with the TV program on LCD 201 (FIG. 1). In the present embodiment, the user selects a channel (e.g., channel 1) (S1). CPU 211 (FIG. 1) sends the selected channel signal to Host H in a wireless fashion (S2). Here, the selected channel signal is a signal indicating the channel number (e.g., channel 1) selected in the previous step. Host H receives the selected channel signal from Communication Device 200 and retrieves all TV program related data from TV Program Related Data Storage Area H179b2 (Paragraph [0044]) (S3). Host H retrieves the TV channel number data from the TV program related data retrieved in the previous step (S4). Host H identifies the TV program related data (e.g., TV Program Related Data#1) corresponding to the selected channel signal (e.g., channel 1) received in S3 (S5). Host H sends the TV program related data (e.g., TV Program Related Data#1) identified in the previous step to Communication Device 200 (S6). CPU 211 (FIG. 1) receives the TV program related data (e.g., TV Program Related Data#1) from Host H in a wireless fashion and displays the data on LCD 201 (FIG. 1) (S7). Host H retrieves the TV program audiovisual data (e.g., TV Program Audiovisual Data#1) from TV Program Audiovisual Data Storage Area H179b1 (Paragraph [0043]) corresponding to the TV program related data (e.g., TV Program Related Data#1) identified in S5 and sends the data to Communication Device 200 (S8). CPU 211 (FIG. 1) receives the TV program audiovisual data (e.g., TV Program Audiovisual Data#1) from Host H in a wireless fashion and displays the visual data thereof on LCD 201 (FIG. 1) and outputs the audio data thereof from Speaker 216 (FIG. 1) (S9). S8 and S9 are repeated thereafter.

Paragraph(s) [0056] and [0057] illustrate another embodiment wherein Communication Device 200 plays the major role in implementing the present function.

This Paragraph [0056] illustrate(s) TV Program Information Displaying Data Distributing Software H179c3 (Paragraph [0045]) of Host H (FIG. 2) and TV Program Information Displaying Data Distributing Software 206179c3 (Paragraph [0052]) of Communication Device 200, which distribute the TV program information displaying data from Host H (FIG. 2) to Communication Device 200. In the present embodiment, Host H retrieves the TV program audiovisual data from TV Program Audiovisual Data Storage Area H179b1 (Paragraph [0043]) (S1). Host H retrieves the TV program related data from TV Program Related Data Storage Area H179b2 (Paragraph [0044]) (S2). Host H sends the data retrieved in S1 and S2 to Communication Device 200 (S3). CPU 211 (FIG. 1) receives the data sent in the previous step from Host H in a wireless fashion (S4). CPU 211 (FIG. 1) stores the TV program audiovisual data in TV Program Audiovisual Data Storage Area 206179b1 (Paragraph [0050]) (S5). CPU 211 (FIG. 1) stores the TV program related data in TV Program Related Data Storage Area 206179b2 (Paragraph [0051]) (S6). The foregoing sequence is performed periodically.

This Paragraph [0057] illustrate(s) TV Program Related Data Displaying Software 206179c2 (Paragraph [0052]) of Communication Device 200, which displays the TV program related data with the TV program on LCD 201 (FIG. 1). In the present embodiment, the user selects a channel (e.g., channel 1) (S1). CPU 211 (FIG. 1) retrieves all TV program related data from TV Program Related Data Storage Area 206179b2 (Paragraph [0051]) (S2). CPU 211 (FIG. 1) retrieves the TV channel number data from the TV program related data retrieved in the previous step (S3). CPU 211 (FIG. 1) identifies the TV program related data (e.g., TV Program Related Data#1) corresponding to the channel (e.g., channel 1) selected in S1 (S4). CPU 211 (FIG. 1) displays the TV program related data (e.g., TV Program Related Data#1) identified in the previous step on LCD 201 (FIG. 1) (S5). CPU 211 (FIG. 1) retrieves the TV program audiovisual data (e.g., TV Program Audiovisual Data#1) from TV Program Audiovisual Data Storage Area 206179b1 (Paragraph [0050]) corresponding to the TV program related data (e.g., TV Program Related Data#1) identified in S4 and displays the visual data thereof on LCD 201 (FIG. 1) and outputs the audio data thereof from Speaker 216 (FIG. 1) (S6). S6 is repeated thereafter (S7).

<<Best Signal Auto Selecting Function>>

Paragraph(s) [0060] through [0107] illustrate the best signal auto selecting function, wherein when Communication Device 200 is in a situation to implement wireless communication by W-LAN signal, mobile phone signal, and cordless signal, Communication Device 200 automatically selects one of them in accordance with the pre-determined order of priority.

This Paragraph [0060] illustrates the connection between Communication Device 200 and the W-LAN access points, i.e., W-LAN Access Point WLAP180a, W-LAN Access Point WLAP180b, W-LAN Access Point WLAP180c, and W-LAN Access Point WLAP180d. Here, W-LAN Access Point WLAP180a implements wireless communication by utilizing the first W-LAN signal. W-LAN Access Point WLAP180b implements wireless communication by utilizing the second W-LAN signal. W-LAN Access Point WLAP180c implements wireless communication by utilizing the third W-LAN signal. W-LAN Access Point WLAP180d implements wireless communication by utilizing the fourth W-LAN signal. Here, each of the first, second, third, and fourth W-LAN signal is the signal type utilized for wireless LAN communication (e.g., IEEE 802.11a, IEEE 802.11g, IEEE 802.11i).

This Paragraph [0061] illustrates the connection between the W-LAN access points, i.e., W-LAN Access Point WLAP180a (Paragraph [0060]), W-LAN Access Point WLAP180b (Paragraph [0060]), W-LAN Access Point WLAP180c (Paragraph [0060]), and W-LAN Access Point WLAP180d (Paragraph [0060]), and a network, such as the Internet In180. In the present embodiment, the W-LAN access points, i.e., W-LAN Access Point WLAP180a (Paragraph [0060]), W-LAN Access Point WLAP180b (Paragraph [0060]), W-LAN Access Point WLAP180c (Paragraph [0060]), and W-LAN Access Point WLAP180d (Paragraph [0060]), are connected to a network, such as the Internet In180.

This Paragraph [0062] illustrates the connection between Communication Device 200 and the base stations for mobile phone, i.e., Mobile Phone Base Station MPBS180a, Mobile Phone Base Station MPBS180b, Mobile Phone Base Station MPBS180c, and Mobile Phone Base Station MPBS180d. Mobile Phone Base Station MPBS180a implements wireless communication by utilizing the first mobile phone signal. Mobile Phone Base Station MPBS180b implements wireless communication by utilizing the second mobile phone signal. Mobile Phone Base Station MPBS180c implements wireless communication by utilizing the third mobile phone signal. Mobile Phone Base Station MPBS180d implements wireless communication by utilizing the fourth mobile phone signal. Here, each of the first, second, third, and fourth mobile phone signal is the signal type utilized for wireless mobile phone communication, such as the 2G wireless signal and the 3G wireless signal. Here, the 3G wireless signal includes cdma2000, W-CDMA, and TDS-CDMA (for the avoidance of doubt, the term 'TDS-CDMA' is equivalent to 'TDD' and 'TD-CDMA' in this specification).

This Paragraph [0063] illustrates the connection between the base station and the network for mobile phone. In the present embodiment, each base station is connected to the corresponding network. Mobile Phone Base Station MPBS180a (Paragraph [0062]) is connected to Mobile Phone Network MPN180a. Mobile Phone Base Station MPBS180b (Paragraph [0062]) is connected to Mobile Phone Network MPN180b. Mobile Phone Base Station MPBS180c (Paragraph [0062]) is connected to Mobile Phone Network MPN180c. Mobile Phone Base Station MPBS180d (Paragraph [0062]) is connected to Mobile Phone Network MPN180d.

This Paragraph [0064] illustrates the connection between the network for mobile phone and the Internet. In the present embodiment, each network for mobile phone, i.e., Mobile Phone Network MPN180a (Paragraph [0063]), Mobile Phone Network MPN180b (Paragraph [0063]), Mobile Phone Network MPN180c (Paragraph [0063]), and Mobile Phone Network MPN180d (Paragraph [0063]), is connected to Internet In180.

This Paragraph [0065] illustrates the connection between Communication Device 200 and the cordless phones. In the present embodiment, Communication Device 200 is connected with the cordless phones, i.e., Cordless Phone CP180a, Cordless Phone CP180b, Cordless Phone CP180c, and Cordless Phone CP180d. Cordless Phone CP180a implements wireless communication by utilizing the first cordless phone signal. Cordless Phone CP180b implements wireless communication by utilizing the second cordless phone signal. Cordless Phone CP180c implements wireless communication by utilizing the third cordless phone signal. Cordless Phone CP180d implements wireless communication by utilizing the fourth cordless phone signal.

This Paragraph [0066] illustrates the connection between the cordless phones and the fixed phone network. In the present embodiment, each cordless phone is connected to the corresponding network. Cordless Phone CP180a (Paragraph [0065]) is connected to Fixed Phone Network FPN180a. Cordless Phone CP180b (Paragraph [0065]) is connected to Fixed Phone Network FPN180b. Cordless Phone CP180c (Paragraph [0065]) is connected to Fixed Phone Network FPN180c. Cordless Phone CP180d (Paragraph [0065]) is connected to Fixed Phone Network FPN180d.

This Paragraph [0067] illustrates the connection between the fixed phone networks and the Internet. In the present embodiment, each fixed phone network, i.e., Fixed Phone Network FPN180a (Paragraph [0066]), Fixed Phone Network FPN180b (Paragraph [0066]), Fixed Phone Network FPN180c (Paragraph [0066]), and Fixed Phone Network FPN180d (Paragraph [0066]), is connected to Internet In180.

This Paragraph [0068] illustrates the storage area included in Host H (FIG. 2). In the present embodiment, Host H includes Best Signal Auto Selecting Information Storage Area H180a of which the data and the software programs stored therein are described in Paragraph(s) [0069].

This Paragraph [0069] illustrates the storage areas included in Best Signal Auto Selecting Information Storage Area H180a (Paragraph [0068]). In the present embodiment, Best Signal Auto Selecting Information Storage Area H180a includes Best Signal Auto Selecting Data Storage Area H180b and Best Signal Auto Selecting Software Storage Area H180c. Best Signal Auto Selecting Data Storage Area H180b stores the data necessary to implement the present function on the side of Host H (FIG. 2), such as the ones described in Paragraph(s) [0070]. Best Signal Auto Selecting Software Storage Area H180c stores the software programs necessary to implement the present function on the side of Host H, such as the ones described in Paragraph(s) [0080].

This Paragraph [0070] illustrates the storage areas included in Best Signal Auto Selecting Data Storage Area H180b (Paragraph [0069]). In the present embodiment, Best Signal Auto Selecting Data Storage Area H180*b* includes Signal Type Data Storage Area H180*b*1, Overall Priority Data Storage Area H180*b*2, and Work Area H180*b*3. Signal Type Data Storage Area H180*b*1 stores the data described in Paragraph(s) [0071]. Overall Priority Data Storage Area H180*b*2 stores the data described in Paragraph(s) [0075]. Work Area H180*b*3 is utilized as a work area to perform calculation and temporarily store data.

This Paragraph [0071] illustrates the storage areas included in Signal Type Data Storage Area H180*b*1 (Paragraph [0070]). In the present embodiment, Signal Type Data Storage Area H180*b*1 includes W-LAN Signal Data Storage Area H180*b*1*a*, Mobile Phone Signal Data Storage Area H180*b*1*b*, Cordless Phone Signal Data Storage Area H180*b*1*c*, and Among Priority Data Storage Area H180*b*1*d*. W-LAN Signal Data Storage Area H180*b*1*a* stores the data described in Paragraph(s) [0072]. Mobile Phone Signal Data Storage Area H180*b*1*b* stores the data described in Paragraph(s) [0073]. Cordless Phone Signal Data Storage Area H180*b*1*c* stores the data described in Paragraph(s) [0074]. Among Priority Data Storage Area H180*b*1*d* stores the data described in Paragraph(s) [0076].

This Paragraph [0072] illustrates the data stored in W-LAN Signal Data Storage Area H180*b*1*a* (Paragraph [0071]). In the present embodiment, W-LAN Signal Data Storage Area H180*b*1*a* comprises two columns, i.e., 'W-LAN Signal ID' and 'W-LAN Signal Data'. Column 'W-LAN Signal ID' stores the W-LAN signal IDs, and each W-LAN signal ID is an identification of the corresponding W-LAN signal data stored in column 'W-LAN Signal Data'. Each W-LAN signal ID may be composed of alphanumeric data and indicate the title or name of the corresponding W-LAN signal data. Column 'W-LAN Signal Data' stores the W-LAN signal data, and each W-LAN signal data indicates the type of wireless signal utilized when communicating with the corresponding W-LAN access point. In the present embodiment, W-LAN Signal Data Storage Area H180*b*1*a* stores the following data: 'W-LAN Signal#1' and the corresponding 'First W-LAN Signal Data'; 'W-LAN Signal#2' and the corresponding 'Second W-LAN Signal Data'; 'W-LAN Signal#3' and the corresponding 'Third W-LAN Signal Data'; and 'W-LAN Signal#4' and the corresponding 'Fourth W-LAN Signal Data'. The first W-LAN signal data is utilized to implement wireless communication with W-LAN Access Point WLAP180*a* (Paragraph [0060]). The second W-LAN signal data is utilized to implement wireless communication with W-LAN Access Point WLAP180*b* (Paragraph [0060]). The third W-LAN signal data is utilized to implement wireless communication with W-LAN Access Point WLAP180*c* (Paragraph [0060]). The fourth W-LAN signal data is utilized to implement wireless communication with W-LAN Access Point WLAP180*d* (Paragraph [0060]).

This Paragraph [0073] illustrates the data stored in Mobile Phone Signal Data Storage Area H180*b*1*b* (Paragraph [0071]). In the present embodiment, Mobile Phone Signal Data Storage Area H180*b*1*b* comprises two columns, i.e., 'Mobile Phone Signal ID' and 'Mobile Phone Signal Data'. Column 'Mobile Phone Signal ID' stores the mobile phone signal IDs, and each mobile phone signal ID is an identification of the corresponding mobile phone signal data stored in column 'Mobile Phone Signal Data'. Each mobile phone signal ID may be composed of alphanumeric data and indicate the title or name of the corresponding mobile phone signal data. Column 'Mobile Phone Signal Data' stores the mobile phone signal data, and each mobile phone signal data indicates the type of wireless signal utilized when communicating with the corresponding base station. In the present embodiment, Mobile Phone Signal Data Storage Area H180*b*1*b* stores the following data: 'Mobile Phone Signal#1' and the corresponding 'First Mobile Phone Signal Data'; 'Mobile Phone Signal#2' and the corresponding 'Second Mobile Phone Signal Data'; 'Mobile Phone Signal#3' and the corresponding 'Third Mobile Phone Signal Data'; and 'Mobile Phone Signal#4' and the corresponding 'Fourth Mobile Phone Signal Data'. The first mobile phone signal data is utilized to implement wireless communication with Mobile Phone Base Station MPBS180*a* (Paragraph [0062]). The second mobile phone signal data is utilized to implement wireless communication with Mobile Phone Base Station MPBS180*b* (Paragraph [0062]). The third mobile phone signal data is utilized to implement wireless communication with Mobile Phone Base Station MPBS180*c* (Paragraph [0062]). The fourth mobile phone signal data is utilized to implement wireless communication with Mobile Phone Base Station MPBS180*d* (Paragraph [0062]).

This Paragraph [0074] illustrates the data stored in Cordless Phone Signal Data Storage Area H180*b*1*c* (Paragraph [0071]). In the present embodiment, Cordless Phone Signal Data Storage Area H180*b*1*c* comprises two columns, i.e., 'Cordless Phone Signal ID' and 'Cordless Phone Signal Data'. Column 'Cordless Phone Signal ID' stores the cordless phone signal IDs, and each cordless phone signal ID is an identification of the corresponding cordless phone signal data stored in column 'Cordless Phone Signal Data'. Each cordless phone signal ID may be composed of alphanumeric data and indicate the title or name of the corresponding cordless phone signal data. Column 'Cordless Phone Signal Data' stores the cordless phone signal data, and each cordless phone signal data indicates the type of wireless signal utilized when communicating with the corresponding cordless phone. In the present embodiment, Cordless Phone Signal Data Storage Area H180*b*1*c* stores the following data: 'Cordless Phone Signal#1' and the corresponding 'First Cordless Phone Signal Data'; 'Cordless Phone Signal#2' and the corresponding 'Second Cordless Phone Signal Data'; 'Cordless Phone Signal#3' and the corresponding 'Third Cordless Phone Signal Data'; and 'Cordless Phone Signal#4' and the corresponding 'Fourth Cordless Phone Signal Data'. The first cordless phone signal data is utilized to implement wireless communication with Cordless Phone CP180*a* (Paragraph [0065]). The second cordless phone signal data is utilized to implement wireless communication with Cordless Phone CP180*b* (Paragraph [0065]). The third cordless phone signal data is utilized to implement wireless communication with Cordless Phone CP180*c* (Paragraph [0065]). The fourth cordless phone signal data is utilized to implement wireless communication with Cordless Phone CP180*d* (Paragraph [0065]).

This Paragraph [0075] illustrates the data stored in Overall Priority Data Storage Area H180*b*2 (Paragraph [0070]). In the present embodiment, Overall Priority Data Storage Area H180*b*2 comprises two columns, i.e., 'Overall Priority ID' and 'Overall Priority Data'. Column 'Overall Priority ID' stores the overall priority IDs, and each overall priority ID is an identification of the corresponding overall priority data stored in column 'Overall Priority Data'. Each overall priority ID may be composed of alphanumeric data and indicate the title or name of the corresponding overall priority data. Column 'Overall Priority Data' stores the overall priority data which indicates the priority among the signal data when more than one signal data are available to implement wireless communication. In the present embodiment, Overall Priority Data Storage Area H180*b*2 stores the following data: 'Overall Priority#1' and the corresponding 'W-LAN Signal Data'; 'Overall Priority#2' and the corresponding 'Mobile Phone Signal Data'; and 'Overall Priority#3' and the corresponding 'Cordless Phone Signal Data'. In the present embodiment, the W-LAN signal data has priority over the mobile phone signal data and the cordless phone signal data; and the mobile phone signal data has priority over the cordless phone signal data.

This Paragraph [0076] illustrates the storage areas included in Among Priority Data Storage Area H180*b*1*d* (Paragraph [0071]). In the present embodiment, Among Priority Data Storage Area H180*b*1*d* includes Among W-LAN Priority Data Storage Area H180*b*1*d*1, Among Mobile Phone Priority Data Storage Area H180*b*1*d*2, and Among Cordless Phone Priority Data Storage Area H180*b*1*d*3. Among W-LAN Priority Data Storage Area H180*b*1*d*1 stores the data described in Paragraph(s) [0077]. Among Mobile Phone Priority Data Storage Area H180*b*1*d*2 stores the data described in Paragraph(s) [0078]. Among Cordless Phone Priority Data Storage Area H180*b*1*d*3 stores the data described in Paragraph(s) [0079].

This Paragraph [0077] illustrates the data stored in Among W-LAN Priority Data Storage Area H180*b*1*d*1 (Paragraph [0076]). In the present embodiment, Among W-LAN Priority Data Storage Area H180*b*1*d*1 comprises two columns, i.e., 'Among W-LAN Priority ID' and 'Among W-LAN Priority Data'. Column 'Among W-LAN Priority ID' stores the among W-LAN priority IDs, and each among W-LAN priority ID is an identification of the corresponding among W-LAN priority data stored in column 'Among W-LAN Priority Data'. Each among W-LAN priority ID may be composed of alphanumeric data and indicate the title or name of the corresponding among W-LAN priority data. Column 'Among W-LAN Priority Data' stores the among W-LAN priority data which indicates the priority among the W-LAN signal data when more than one W-LAN signal data are available to implement wireless communication. In the present embodiment, Among W-LAN Priority Data Storage Area H180*b*1*d*1 stores the following data: 'W-LAN Signal#1' and the corresponding 'First W-LAN Signal Data'; 'W-LAN Signal#2' and the corresponding 'Second W-LAN Signal Data'; 'W-LAN Signal#3' and the corresponding 'Third W-LAN Signal Data'; and 'W-LAN Signal#4' and the corresponding 'Fourth W-LAN Signal Data'. In the present embodiment, the first W-LAN signal data has priority over the second W-LAN signal data, the third W-LAN signal data, and the fourth W-LAN signal data; the second W-LAN signal data has priority over the third W-LAN signal data and the fourth W-LAN signal data; and the third W-LAN signal data has priority over the fourth W-LAN signal data.

This Paragraph [0078] illustrates the data stored in Among Mobile Phone Priority Data Storage Area H180*b*1*d*2 (Paragraph [0076]). In the present embodiment, Among Mobile Phone Priority Data Storage Area H180*b*1*d*2 comprises two columns, i.e., 'Among Mobile Phone Priority ID' and 'Among Mobile Phone Priority Data'. Column 'Among Mobile Phone Priority ID' stores the among mobile phone priority IDs, and each among mobile phone priority ID is an identification of the corresponding among mobile phone priority data stored in column 'Among Mobile Phone Priority Data'. Each among mobile phone priority ID may be composed of alphanumeric data and indicate the title or name of the corresponding among mobile phone priority data. Column 'Among Mobile Phone Priority Data' stores the among mobile phone priority data which indicates the priority among the mobile phone signal data when more than one mobile phone signal data are available to implement wireless communication. In the present embodiment, Among Mobile Phone Priority Data Storage Area H180*b*1*d*2 stores the following data: 'Mobile Phone Signal#1' and the corresponding 'First Mobile Phone Signal Data'; 'Mobile Phone Signal#2' and the corresponding 'Second Mobile Phone Signal Data'; 'Mobile Phone Signal#3' and the corresponding 'Third Mobile Phone Signal Data'; and 'Mobile Phone Signal#4' and the corresponding 'Fourth Mobile Phone Signal Data'. In the present embodiment, the first mobile phone signal data has priority over the second mobile phone signal data, the third mobile phone signal data, and the fourth mobile phone signal data; the second mobile phone signal data has priority over the third mobile phone signal data and the fourth mobile phone signal data; and the third mobile phone signal data has priority over the fourth mobile phone signal data.

This Paragraph [0079] illustrates the data stored in Among Cordless Phone Priority Data Storage Area H180*b*1*d*3 (Paragraph [0076]). In the present embodiment, Among Cordless Phone Priority Data Storage Area H180*b*1*d*3 comprises two columns, i.e., 'Among Cordless Phone Priority ID' and 'Among Cordless Phone Priority Data'. Column 'Among Cordless Phone Priority ID' stores the among cordless phone priority IDs, and each among cordless phone priority ID is an identification of the corresponding among cordless phone priority data stored in column 'Among Cordless Phone Priority Data'. Each among cordless phone priority ID may be composed of alphanumeric data and indicate the title or name of the corresponding among cordless phone priority data. Column 'Among Cordless Phone Priority Data' stores the among cordless phone priority data which indicates the priority among the cordless phone signal data when more than one cordless phone signal data are available to implement wireless communication. In the present embodiment, Among Cordless Phone Priority Data Storage Area H180*b*1*d*3 stores the following data: 'Cordless Phone Signal#1' and the corresponding 'First Cordless Phone Signal Data'; 'Cordless Phone Signal#2' and the corresponding 'Second Cordless Phone Signal Data'; 'Cordless Phone Signal#3' and the corresponding 'Third Cordless Phone Signal Data'; and 'Cordless Phone Signal#4' and the corresponding 'Fourth Cordless Phone Signal Data'. In the present embodiment, the first cordless phone signal data has priority over the second cordless phone signal data, the third cordless phone signal data, and the fourth cordless phone signal data; the second cordless phone signal data has priority over the third cordless phone signal data and the fourth cordless phone signal data; and the third cordless phone signal data has priority over the fourth cordless phone signal data.

This Paragraph [0080] illustrates the software programs stored in Best Signal Auto Selecting Software Storage Area H180*c* (Paragraph [0069]). In the present embodiment, Best Signal Auto Selecting Software Storage Area H180*c* stores Overall Priority Data Setting Software H180*c*1, Among W-LAN Priority Data Setting Software H180*c*2, Among Mobile Phone Priority Data Setting Software H180*c*3, Among Cordless Phone Priority Data Setting Software H180*c*4, Signal Data Auto Selecting Software H180*c*5, and Wireless Communication Implementing Software H180*c*6. Overall Priority Data Setting Software H180*c*1 is the software program described in Paragraph(s) [0095]. Among W-LAN Priority Data Setting Software H180*c*2 is the software program described in Paragraph(s) [0096]. Among Mobile Phone Priority Data Setting Software H180*c*3 is the software program described in Paragraph(s) [0097]. Among Cordless Phone Priority Data Setting Software H180*c*4 is the software program described in Paragraph(s) [0098]. Signal Data Auto Selecting Software H180*c*5 is the software program described in Paragraph(s) [0099]. Wireless Communication Implementing Software H180*c*6 is the software program described in Paragraph(s) [0100].

This Paragraph [0081] illustrates the storage area included in RAM 206 (FIG. 1) of Communication Device 200. In the present embodiment, RAM 206 includes Best Signal Auto Selecting Information Storage Area 206180a of which the data and the software programs stored therein are described in Paragraph(s) [0083].

The data and/or the software programs necessary to implement the present function may be downloaded from Host H (FIG. 2) to Communication Device 200.

This Paragraph [0083] illustrates the storage areas included in Best Signal Auto Selecting Information Storage Area 206180a (Paragraph [0081]). In the present embodiment, Best Signal Auto Selecting Information Storage Area 206180a includes Best Signal Auto Selecting Data Storage Area 206180b and Best Signal Auto Selecting Software Storage Area 206180c. Best Signal Auto Selecting Data Storage Area 206180b stores the data necessary to implement the present function on the side of Communication Device 200, such as the ones described in Paragraph(s) [0084]. Best Signal Auto Selecting Software Storage Area 206180c stores the software programs necessary to implement the present function on the side of Communication Device 200, such as the ones described in Paragraph(s) [0094].

This Paragraph [0084] illustrates the storage areas included in Best Signal Auto Selecting Data Storage Area 206180b (Paragraph [0083]). In the present embodiment, Best Signal Auto Selecting Data Storage Area 206180b includes Signal Type Data Storage Area 206180b1, Overall Priority Data Storage Area 206180b2, and Work Area 206180b3. Signal Type Data Storage Area 206180b1 stores the data described in Paragraph(s) [0085]. Overall Priority Data Storage Area 206180b2 stores the data described in Paragraph(s) [0089]. Work Area 206180b3 is utilized as a work area to perform calculation and temporarily store data.

This Paragraph [0085] illustrates the storage areas included in Signal Type Data Storage Area 206180b1 (Paragraph [0084]). In the present embodiment, Signal Type Data Storage Area 206180b1 includes W-LAN Signal Data Storage Area 206180b1a, Mobile Phone Signal Data Storage Area 206180b1b, Cordless Phone Signal Data Storage Area 206180b1c, and Among Priority Data Storage Area 206180b1d. W-LAN Signal Data Storage Area 206180b1a stores the data described in Paragraph(s) [0086]. Mobile Phone Signal Data Storage Area 206180b1b stores the data described in Paragraph(s) [0087]. Cordless Phone Signal Data Storage Area 206180b1c stores the data described in Paragraph(s) [0088]. Among Priority Data Storage Area 206180b1d stores the data described in Paragraph(s) [0090].

This Paragraph [0086] illustrates the data stored in W-LAN Signal Data Storage Area 206180b1a (Paragraph [0085]). In the present embodiment, W-LAN Signal Data Storage Area 206180b1a comprises two columns, i.e., 'W-LAN Signal ID' and 'W-LAN Signal Data'. Column 'W-LAN Signal ID' stores the W-LAN signal IDs, and each W-LAN signal ID is an identification of the corresponding W-LAN signal data stored in column 'W-LAN Signal Data'. Each W-LAN signal ID may be composed of alphanumeric data and indicate the title or name of the corresponding W-LAN signal data. Column 'W-LAN Signal Data' stores the W-LAN signal data, and each W-LAN signal data indicates the type of wireless signal utilized when communicating with the corresponding W-LAN access point. In the present embodiment, W-LAN Signal Data Storage Area 206180b1a stores the following data: 'W-LAN Signal#1' and the corresponding 'First W-LAN Signal Data'; 'W-LAN Signal#2' and the corresponding 'Second W-LAN Signal Data'; 'W-LAN Signal#3' and the corresponding 'Third W-LAN Signal Data'; and 'W-LAN Signal#4' and the corresponding 'Fourth W-LAN Signal Data'. The first W-LAN signal data is utilized to implement wireless communication with W-LAN Access Point WLAP180a (Paragraph [0060]). The second W-LAN signal data is utilized to implement wireless communication with W-LAN Access Point WLAP180b (Paragraph [0060]). The third W-LAN signal data is utilized to implement wireless communication with W-LAN Access Point WLAP180c (Paragraph [0060]). The fourth W-LAN signal data is utilized to implement wireless communication with W-LAN Access Point WLAP180d (Paragraph [0060]).

This Paragraph [0087] illustrates the data stored in Mobile Phone Signal Data Storage Area 206180b1b (Paragraph [0085]). In the present embodiment, Mobile Phone Signal Data Storage Area 206180b1b comprises two columns, i.e., 'Mobile Phone Signal ID' and 'Mobile Phone Signal Data'. Column 'Mobile Phone Signal ID' stores the mobile phone signal IDs, and each mobile phone signal ID is an identification of the corresponding mobile phone signal data stored in column 'Mobile Phone Signal Data'. Each mobile phone signal ID may be composed of alphanumeric data and indicate the title or name of the corresponding mobile phone signal data. Column 'Mobile Phone Signal Data' stores the mobile phone signal data, and each mobile phone signal data indicates the type of wireless signal utilized when communicating with the corresponding base station. In the present embodiment, Mobile Phone Signal Data Storage Area 206180b1b stores the following data: 'Mobile Phone Signal#1' and the corresponding 'First Mobile Phone Signal Data'; 'Mobile Phone Signal#2' and the corresponding 'Second Mobile Phone Signal Data'; 'Mobile Phone Signal#3' and the corresponding 'Third Mobile Phone Signal Data'; and 'Mobile Phone Signal#4' and the corresponding 'Fourth Mobile Phone Signal Data'. The first mobile phone signal data is utilized to implement wireless communication with Mobile Phone Base Station MPBS180a (Paragraph [0062]). The second mobile phone signal data is utilized to implement wireless communication with Mobile Phone Base Station MPBS180b (Paragraph [0062]). The third mobile phone signal data is utilized to implement wireless communication with Mobile Phone Base Station MPBS180c (Paragraph [0062]). The fourth mobile phone signal data is utilized to implement wireless communication with Mobile Phone Base Station MPBS180d (Paragraph [0062]).

This Paragraph [0088] illustrates the data stored in Cordless Phone Signal Data Storage Area 206180b1c (Paragraph [0085]). In the present embodiment, Cordless Phone Signal Data Storage Area 206180b1c comprises two columns, i.e., 'Cordless Phone Signal ID' and 'Cordless Phone Signal Data'. Column 'Cordless Phone Signal ID' stores the cordless phone signal IDs, and each cordless phone signal ID is an identification of the corresponding cordless phone signal data stored in column 'Cordless Phone Signal Data'. Each cordless phone signal ID may be composed of alphanumeric data and indicate the title or name of the corresponding cordless phone signal data. Column 'Cordless Phone Signal Data' stores the cordless phone signal data, and each cordless phone signal data indicates the type of wireless signal utilized when communicating with the corresponding cordless phone. In the present embodiment, Cordless Phone Signal Data Storage Area 206180b1c stores the following data: 'Cordless Phone Signal#1' and the corresponding 'First Cordless Phone Signal Data'; 'Cordless Phone Signal#2' and the corresponding 'Second Cordless Phone Signal Data'; 'Cordless Phone Signal#3' and the corresponding 'Third Cordless Phone Signal Data'; and 'Cordless Phone Signal#4' and the corresponding 'Fourth Cordless Phone Signal Data'. The first cordless phone signal data is utilized to implement wireless communication with Cordless Phone CP180a (Paragraph [0065]). The second cordless phone signal data is utilized to implement wireless communication with Cordless Phone CP180b (Paragraph [0065]). The third cordless phone signal data is utilized to implement wireless communication with Cordless Phone CP180c (Paragraph [0065]). The fourth cordless phone signal data is utilized to implement wireless communication with Cordless Phone CP180d (Paragraph [0065]).

This Paragraph [0089] illustrates the data stored in Overall Priority Data Storage Area 206180b2 (Paragraph [0084]). In the present embodiment, Overall Priority Data Storage Area 206180b2 comprises two columns, i.e., 'Overall Priority ID' and 'Overall Priority Data'. Column 'Overall Priority ID' stores the overall priority IDs, and each overall priority ID is an identification of the corresponding overall priority data stored in column 'Overall Priority Data'. Each overall priority ID may be composed of alphanumeric data and indicate the title or name of the corresponding overall priority data. Column 'Overall Priority Data' stores the overall priority data which indicates the priority among the signal data when more than one signal data are available to implement wireless communication. In the present embodiment, Overall Priority Data Storage Area 206180b2 stores the following data: 'Overall Priority#1' and the corresponding 'W-LAN Signal Data'; 'Overall Priority#2' and the corresponding 'Mobile Phone Signal Data'; and 'Overall Priority#3' and the corresponding 'Cordless Phone Signal Data'. In the present embodiment, the W-LAN signal data has priority over the mobile phone signal data and the cordless phone signal data; and the mobile phone signal data has priority over the cordless phone signal data.

This Paragraph [0090] illustrates the storage areas included in Among Priority Data Storage Area 206180b1d (Paragraph [0085]). In the present embodiment, Among Priority Data Storage Area 206180b1d includes Among W-LAN Priority Data Storage Area 206180b1d1, Among Mobile Phone Priority Data Storage Area 206180b1d2, and Among Cordless Phone Priority Data Storage Area 206180b1d3. Among W-LAN Priority Data Storage Area 206180b1d1 stores the data described in Paragraph(s) [0091]. Among Mobile Phone Priority Data Storage Area 206180b1d2 stores the data described in Paragraph(s) [0092]. Among Cordless Phone Priority Data Storage Area 206180b1d3 stores the data described in Paragraph(s) [0093].

This Paragraph [0091] illustrates the data stored in Among W-LAN Priority Data Storage Area 206180b1d1 (Paragraph [0090]). In the present embodiment, Among W-LAN Priority Data Storage Area 206180b1d1 comprises two columns, i.e., 'Among W-LAN Priority ID' and 'Among W-LAN Priority Data'. Column 'Among W-LAN Priority ID' stores the among W-LAN priority IDs, and each among W-LAN priority ID is an identification of the corresponding among W-LAN priority data stored in column 'Among W-LAN Priority Data'. Each among W-LAN priority ID may be composed of alphanumeric data and indicate the title or name of the corresponding among W-LAN priority data. Column 'Among W-LAN Priority Data' stores the among W-LAN priority data which indicates the priority among the W-LAN signal data when more than one W-LAN signal data are available to implement wireless communication. In the present embodiment, Among W-LAN Priority Data Storage Area 206180b1d1 stores the following data: 'W-LAN Signal#1' and the corresponding 'First W-LAN Signal Data'; 'W-LAN Signal#2' and the corresponding 'Second W-LAN Signal Data'; 'W-LAN Signal#3' and the corresponding 'Third W-LAN Signal Data'; and 'W-LAN Signal#4' and the corresponding 'Fourth W-LAN Signal Data'. In the present embodiment, the first W-LAN signal data has priority over the second W-LAN signal data, the third W-LAN signal data, and the fourth W-LAN signal data; the second W-LAN signal data has priority over the third W-LAN signal data and the fourth W-LAN signal data; and the third W-LAN signal data has priority over the fourth W-LAN signal data.

This Paragraph [0092] illustrates the data stored in Among Mobile Phone Priority Data Storage Area 206180b1d2 (Paragraph [0090]). In the present embodiment, Among Mobile Phone Priority Data Storage Area 206180b1d2 comprises two columns, i.e., 'Among Mobile Phone Priority ID' and 'Among Mobile Phone Priority Data'. Column 'Among Mobile Phone Priority ID' stores the among mobile phone priority IDs, and each among mobile phone priority ID is an identification of the corresponding among mobile phone priority data stored in column 'Among Mobile Phone Priority Data'. Each among mobile phone priority ID may be composed of alphanumeric data and indicate the title or name of the corresponding among mobile phone priority data. Column 'Among Mobile Phone Priority Data' stores the among mobile phone priority data which indicates the priority among the mobile phone signal data when more than one mobile phone signal data are available to implement wireless communication. In the present embodiment, Among Mobile Phone Priority Data Storage Area 206180b1d2 stores the following data: 'Mobile Phone Signal#1' and the corresponding 'First Mobile Phone Signal Data'; 'Mobile Phone Signal#2' and the corresponding 'Second Mobile Phone Signal Data'; 'Mobile Phone Signal#3' and the corresponding 'Third Mobile Phone Signal Data'; and 'Mobile Phone Signal#4' and the corresponding 'Fourth Mobile Phone Signal Data'. In the present embodiment, the first mobile phone signal data has priority over the second mobile phone signal data, the third mobile phone signal data, and the fourth mobile phone signal data; the second mobile phone signal data has priority over the third mobile phone signal data and the fourth mobile phone signal data; and the third mobile phone signal data has priority over the fourth mobile phone signal data.

This Paragraph [0093] illustrates the data stored in Among Cordless Phone Priority Data Storage Area 206180b1d3 (Paragraph [0090]). In the present embodiment, Among Cordless Phone Priority Data Storage Area 206180b1d3 comprises two columns, i.e., 'Among Cordless Phone Priority ID' and 'Among Cordless Phone Priority Data'. Column 'Among Cordless Phone Priority ID' stores the among cordless phone priority IDs, and each among cordless phone priority ID is an identification of the corresponding among cordless phone priority data stored in column 'Among Cordless Phone Priority Data'. Each among cordless phone priority ID may be composed of alphanumeric data and indicate the title or name of the corresponding among cordless phone priority data. Column 'Among Cordless Phone Priority Data' stores the among cordless phone priority data which indicates the priority among the cordless phone signal data when more than one cordless phone signal data are available to implement wireless communication. In the present embodiment, Among Cordless Phone Priority Data Storage Area 206180b1d3 stores the following data: 'Cordless Phone Signal#1' and the corresponding 'First Cordless Phone Signal Data'; 'Cordless Phone Signal#2' and the corresponding 'Second Cordless Phone Signal Data'; 'Cordless Phone Signal#3' and the corresponding 'Third Cordless Phone Signal Data'; and 'Cordless Phone Signal#4' and the corresponding 'Fourth Cordless Phone Signal Data'. In the present embodiment, the first cordless phone signal data has priority over the second cordless phone signal data, the third cordless phone signal data, and the fourth cordless phone signal data; the second cordless phone signal data has priority over the third cordless phone signal data and the fourth cordless phone signal data; and the third cordless phone signal data has priority over the fourth cordless phone signal data.

This Paragraph [0094] illustrates the software programs stored in Best Signal Auto Selecting Software Storage Area 206180c (Paragraph [0083]). In the present embodiment, Best Signal Auto Selecting Software Storage Area 206180c stores Overall Priority Data Setting Software 206180c1, Among W-LAN Priority Data Setting Software 206180c2, Among Mobile Phone Priority Data Setting Software 206180c3, Among Cordless Phone Priority Data Setting Software 206180c4, Signal Data Auto Selecting Software 206180c5, and Wireless Communication Implementing Software 206180c6. Overall Priority Data Setting Software 206180c1 is the software program described in Paragraph(s) [0095] and [0102]. Among W-LAN Priority Data Setting Software 206180c2 is the software program described in Paragraph(s) [0096] and [0103]. Among Mobile Phone Priority Data Setting Software 206180c3 is the software program described in Paragraph(s) [0097] and [0104]. Among Cordless Phone Priority Data Setting Software 206180c4 is the software program described in Paragraph(s) [0098] and [0105] Signal Data Auto Selecting Software 206180c5 is the software program described in Paragraph(s) [0099] and [0106]. Wireless Communication Implementing Software 206180c6 is the software program described in Paragraph(s) [0100] and [0107].

This Paragraph [0095] illustrate(s) Overall Priority Data Setting Software H180c1 (Paragraph [0080]) of Host H (FIG. 2) and Overall Priority Data Setting Software 206180c1 (Paragraph [0094]) of Communication Device 200, which set the priority among the three signal data. Assuming that the user of Communication Device 200 sets the priority in the following order: the W-LAN signal data, the mobile phone signal data, and the cordless phone signal data. In the present embodiment, CPU 211 (FIG. 1) displays on LCD 201 (FIG. 1) the titles of the W-LAN signal data, the mobile phone signal data, and the cordless phone signal data (S1). The user of Communication Device 200 sets by utilizing Input Device 210 (FIG. 1) or via voice recognition system the priority (e.g., in the following order: the W-LAN signal data, the mobile phone signal data, and the cordless phone signal data) (S2). CPU 211 (FIG. 1) sends the data indicating the priority set in the previous step to Host H in a wireless fashion (S3). Host H receives the data indicating the priority from Communication Device 200 and stores the data in Overall Priority Data Storage Area H180b2 (Paragraph [0075]) (S4).

This Paragraph [0096] illustrate(s) Among W-LAN Priority Data Setting Software H180c2 (Paragraph [0080]) of Host H (FIG. 2) and Among W-LAN Priority Data Setting Software 206180c2 (Paragraph [0094]) of Communication Device 200, which set the priority among the W-LAN signal data. Assuming that the user of Communication Device 200 sets the priority in the following order: the first W-LAN signal data, the second W-LAN signal data, the third W-LAN signal data, and the fourth W-LAN signal data. In the present embodiment, CPU 211 (FIG. 1) displays on LCD 201 (FIG. 1) the titles of the first W-LAN signal data, the second W-LAN signal data, the third W-LAN signal data, and the fourth W-LAN signal data (S1). The user of Communication Device 200 sets by utilizing Input Device 210 (FIG. 1) or via voice recognition system the priority (e.g., in the following order: the first W-LAN signal data, the second W-LAN signal data, the third W-LAN signal data, and the fourth W-LAN signal data) (S2). CPU 211 (FIG. 1) sends the data indicating the priority set in the previous step to Host H in a wireless fashion (S3). Host H receives the data indicating the priority from Communication Device 200 and stores the data in Among W-LAN Priority Data Storage Area H180b1d1 (Paragraph [0077]) (S4).

This Paragraph [0097] illustrate(s) Among Mobile Phone Priority Data Setting Software Hl80c3 (Paragraph [0080]) of Host H (FIG. 2) and Among Mobile Phone Priority Data Setting Software 206180c3 (Paragraph [0094]) of Communication Device 200, which set the priority among the mobile phone signal data. Assuming that the user of Communication Device 200 sets the priority in the following order: the first mobile phone signal data, the second mobile phone signal data, the third mobile phone signal data, and the fourth mobile phone signal data. In the present embodiment, CPU 211 (FIG. 1) displays on LCD 201 (FIG. 1) the titles of the first mobile phone signal data, the second mobile phone signal data, the third mobile phone signal data, and the fourth mobile phone signal data (S1). The user of Communication Device 200 sets by utilizing Input Device 210 (FIG. 1) or via voice recognition system the priority (e.g., in the following order: the first mobile phone signal data, the second mobile phone signal data, the third mobile phone signal data, and the fourth mobile phone signal data) (S2). CPU 211 (FIG. 1) sends the data indicating the priority set in the previous step to Host H in a wireless fashion (S3). Host H receives the data indicating the priority from Communication Device 200 and stores the data in Among Mobile Phone Priority Data Storage Area H180b1d2 (Paragraph [0078]) (S4).

This Paragraph [0098] illustrate(s) Among Cordless Phone Priority Data Setting Software H180c4 (Paragraph [0080]) of Host H (FIG. 2) and Among Cordless Phone Priority Data Setting Software 206180c4 (Paragraph [0094]) of Communication Device 200, which set the priority among the cordless phone signal data. Assuming that the user of Communication Device 200 sets the priority in the following order: the first cordless phone signal data, the second cordless phone signal data, the third cordless phone signal data, and the fourth cordless phone signal data. In the present embodiment, CPU 211 (FIG. 1) displays on LCD 201 (FIG. 1) the titles of the first cordless phone signal data, the second cordless phone signal data, the third cordless phone signal data, and the fourth cordless phone signal data (S1). The user of Communication Device 200 sets by utilizing Input Device 210 (FIG. 1) or via voice recognition system the priority (e.g., in the following order: the first cordless phone signal data, the second cordless phone signal data, the third cordless phone signal data, and the fourth cordless phone signal data) (S2). CPU 211 (FIG. 1) sends the data indicating the priority set in the previous step to Host H in a wireless fashion (S3). Host H receives the data indicating the priority from Communication Device 200 and stores the data in Among Cordless Phone Priority Data Storage Area H180b1d3 (Paragraph [0079]) (S4).

This Paragraph [0099] illustrate(s) Signal Data Auto Selecting Software H180c5 (Paragraph [0080]) of Host H (FIG. 2) and Signal Data Auto Selecting Software 206180c5 (Paragraph [0094]) of Communication Device 200, which automatically select the signal data to implement wireless communication. The present software program is implemented when a wireless communication is initiated either manually by the user or automatically by CPU 211 (FIG. 1). In the present embodiment, Host H retrieves all data stored in Signal Type Data Storage Area H180b1 (Paragraph [0071]) and sends the data to Communication Device 200 (S1). CPU 211 (FIG. 1) receives the data sent in the previous step from Host H in a wireless fashion (S2). CPU 211 (FIG. 1) sends the inquiry signal by utilizing all data received in the previous step in a wireless fashion (S3). Here, the inquiry signal is a signal to inquire whether the signal type (e.g., W-LAN) through which the inquiry signal is sent is capable to be utilized for wireless communication. If the response signal is received, CPU 211 (FIG. 1) proceeds to the next step (S4). Here, the response signal is a signal indicating that the signal type (e.g., W-LAN) utilized for sending the inquiry signal is capable to be utilized for wireless communication. CPU 211 (FIG. 1) stores the signal type data capable to be utilized for wireless communication in Work Area 206180$b$3 (Paragraph [0084]) and sends the data to Host H in a wireless fashion (S5). Assuming that all signal type are capable to be utilized for wireless communication, i.e., the first W-LAN signal data, the second W-LAN signal data, the third W-LAN signal data, the fourth W-LAN signal data, the first mobile phone signal data, the second mobile phone signal data, the third mobile phone signal data, the fourth mobile phone signal data, the first cordless phone signal data, the second cordless phone signal data, the third cordless phone signal data, and the fourth cordless phone signal data. Host H receives the signal type data capable to be utilized for wireless communication from Communication Device 200 and stores the data in Work Area H180$b$3 (Paragraph [0070]) (S6).

This Paragraph [0100] illustrate(s) Wireless Communication Implementing Software H180$c$6 (Paragraph [0080]) of Host H (FIG. 2) and Wireless Communication Implementing Software 206180$c$6 (Paragraph [0094]) of Communication Device 200, which implement wireless communication by utilizing the signal type selected in accordance with the priority set by the user of Communication Device 200 hereinbefore. In the present embodiment, Host H retrieves the signal type data capable to be utilized for wireless communication from Work Area H180$b$3 (Paragraph [0070]) (S1). Host H selects the signal type in accordance with the priority identified in Overall Priority Data Storage Area H180$b$2 (Paragraph [0075]), Among W-LAN Priority Data Storage Area H180$b$1$d$1 (Paragraph [0077]), Among Mobile Phone Priority Data Storage Area H180$b$1$d$2 (Paragraph [0078]), and Among Cordless Phone Priority Data Storage Area H180$b$1$d$3 (Paragraph [0079]) (S2). In the present example, the signal type is selected in the following order of priority: the first W-LAN signal data, the second W-LAN signal data, the third W-LAN signal data, the fourth W-LAN signal data, the first mobile phone signal data, the second mobile phone signal data, the third mobile phone signal data, the fourth mobile phone signal data, the first cordless phone signal data, the second cordless phone signal data, the third cordless phone signal data, and the fourth cordless phone signal data. Host H sends the signal type selected in the previous step to Communication Device 200 (S3). CPU 211 (FIG. 1) receives the signal type from Host H in a wireless fashion (S4). CPU 211 (FIG. 1) initiates wireless communication by utilizing the signal type received in the previous step (S5).

This Paragraph [0102] through [0107] illustrate another embodiment wherein Communication Device 200 plays the major role in implementing the present function.

This Paragraph [0102] illustrate(s) Overall Priority Data Setting Software 206180$c$1 (Paragraph [0094]) of Communication Device 200, which sets the priority among the three signal data. Assuming that the user of Communication Device 200 sets the priority in the following order: the W-LAN signal data, the mobile phone signal data, and the cordless phone signal data. In the present embodiment, CPU 211 (FIG. 1) displays on LCD 201 (FIG. 1) the titles of the W-LAN signal data, the mobile phone signal data, and the cordless phone signal data (S1). The user of Communication Device 200 sets by utilizing Input Device 210 (FIG. 1) or via voice recognition system the priority (e.g., in the following order: the W-LAN signal data, the mobile phone signal data, and the cordless phone signal data) (S2). CPU 211 (FIG. 1) stores the data indicating the priority set in the previous step in Overall Priority Data Storage Area 206180$b$2 (Paragraph [0089]) (S3).

This Paragraph [0103] illustrate(s) Among W-LAN Priority Data Setting Software 206180$c$2 (Paragraph [0094]) of Communication Device 200, which sets the priority among the W-LAN signal data. Assuming that the user of Communication Device 200 sets the priority in the following order: the first W-LAN signal data, the second W-LAN signal data, the third W-LAN signal data, and the fourth W-LAN signal data. In the present embodiment, CPU 211 (FIG. 1) displays on LCD 201 (FIG. 1) the titles of the first W-LAN signal data, the second W-LAN signal data, the third W-LAN signal data, and the fourth W-LAN signal data (S1). The user of Communication Device 200 sets by utilizing Input Device 210 (FIG. 1) or via voice recognition system the priority (e.g., in the following order: the first W-LAN signal data, the second W-LAN signal data, the third W-LAN signal data, and the fourth W-LAN signal data) (S2). CPU 211 (FIG. 1) stores the data indicating the priority set in the previous step in Among W-LAN Priority Data Storage Area 206180$b$1$d$1 (Paragraph [0091]) (S3).

This Paragraph [0104] illustrate(s) Among Mobile Phone Priority Data Setting Software 206180$c$3 (Paragraph [0094]) of Communication Device 200, which sets the priority among the mobile phone signal data. Assuming that the user of Communication Device 200 sets the priority in the following order: the first mobile phone signal data, the second mobile phone signal data, the third mobile phone signal data, and the fourth mobile phone signal data. In the present embodiment, CPU 211 (FIG. 1) displays on LCD 201 (FIG. 1) the titles of the first mobile phone signal data, the second mobile phone signal data, the third mobile phone signal data, and the fourth mobile phone signal data (S1). The user of Communication Device 200 sets by utilizing Input Device 210 (FIG. 1) or via voice recognition system the priority (e.g., in the following order: the first mobile phone signal data, the second mobile phone signal data, the third mobile phone signal data, and the fourth mobile phone signal data) (S2). CPU 211 (FIG. 1) stores the data indicating the priority set in the previous step in Among Mobile Phone Priority Data Storage Area 206180$b$1$d$2 (Paragraph [0092]) (S3).

This Paragraph [0105] illustrate(s) Among Cordless Phone Priority Data Setting Software 206180$c$4 (Paragraph [0094]) of Communication Device 200, which sets the priority among the cordless phone signal data. Assuming that the user of Communication Device 200 sets the priority in the following order: the first cordless phone signal data, the second cordless phone signal data, the third cordless phone signal data, and the fourth cordless phone signal data. In the present embodiment, CPU 211 (FIG. 1) displays on LCD 201 (FIG. 1) the titles of the first cordless phone signal data, the second cordless phone signal data, the third cordless phone signal data, and the fourth cordless phone signal data (S1). The user of Communication Device 200 sets by utilizing Input Device 210 (FIG. 1) or via voice recognition system the priority (e.g., in the following order: the first cordless phone signal data, the second cordless phone signal data, the third cordless phone signal data, and the fourth cordless phone signal data) (S2). CPU 211 (FIG. 1) stores the data indicating the priority set in the previous step in Among Cordless Phone Priority Data Storage Area 206180$b$1$d$3 (Paragraph [0093]) (S3).

This Paragraph [0106] illustrate(s) Signal Data Auto Selecting Software 206180$c$5 (Paragraph [0094]) of Communication Device 200, which automatically selects the signal data to implement wireless communication. The present software program is implemented when a wireless communication is initiated either manually by the user or automatically by CPU 211 (FIG. 1). In the present embodiment, CPU 211 (FIG. 1) retrieves all data stored in Signal Type Data Storage Area 206180*b*1 (Paragraph [0085]) (S1). CPU 211 (FIG. 1) sends the inquiry signal by utilizing the data retrieved in the previous step in a wireless fashion (S2). Here, the inquiry signal is a signal to inquire whether the signal type (e.g., W-LAN) through which the inquiry signal is sent is capable to be utilized for wireless communication. If the response signal is received, CPU 211 (FIG. 1) proceeds to the next step (S3). Here, the response signal is a signal indicating that the signal type (e.g., W-LAN) utilized for sending the inquiry signal is capable to be utilized for wireless communication. CPU 211 (FIG. 1) stores the signal type data capable to be utilized for wireless communication in Work Area 206180*b*3 (Paragraph [0084]) (S4). Assuming that all signal type are capable to be utilized for wireless communication, i.e., the first W-LAN signal data, the second W-LAN signal data, the third W-LAN signal data, the fourth W-LAN signal data, the first mobile phone signal data, the second mobile phone signal data, the third mobile phone signal data, the fourth mobile phone signal data, the first cordless phone signal data, the second cordless phone signal data, the third cordless phone signal data, and the fourth cordless phone signal data.

This Paragraph [0107] illustrate(s) Wireless Communication Implementing Software 206180*c*6 (Paragraph [0094]) of Communication Device 200, which implements wireless communication by utilizing the signal type selected in accordance with the priority set by the user of Communication Device 200 hereinbefore. In the present embodiment, CPU 211 (FIG. 1) retrieves the signal type data capable to be utilized for wireless communication from Work Area 206180*b*3 (Paragraph [0084]) (S1). CPU 211 (FIG. 1) selects the signal type in accordance with the priority identified in Overall Priority Data Storage Area 206180*b*2 (Paragraph [0089]), Among W-LAN Priority Data Storage Area 206180*b*1*d*1 (Paragraph [0091]), Among Mobile Phone Priority Data Storage Area 206180*b*1*d*2 (Paragraph [0092]), and Among Cordless Phone Priority Data Storage Area 206180*b*1*d*3 (Paragraph [0093]) (S2). In the present example, the signal type is selected in the following order of priority: the first W-LAN signal data, the second W-LAN signal data, the third W-LAN signal data, the fourth W-LAN signal data, the first mobile phone signal data, the second mobile phone signal data, the third mobile phone signal data, the fourth mobile phone signal data, the first cordless phone signal data, the second cordless phone signal data, the third cordless phone signal data, and the fourth cordless phone signal data. CPU 211 (FIG. 1) initiates wireless communication by utilizing the signal type selected in the previous step (S3).

<<Cordless Phone Connecting Function>>

Paragraph(s) [0110] through [0140] illustrate the cordless phone connection function, wherein when a main phone receives a phone call, Communication Device 200 is utilized as a cordless handset of the main phone.

This Paragraph [0110] illustrates the connection between Communication Device 200 and the cordless phones. Here, the cordless phones are the main phones. In the present embodiment, Communication Device 200 is connected with the cordless phones, i.e., Cordless Phone CP188*a*, Cordless Phone CP188*b*, Cordless Phone CP188*c*, and Cordless Phone CP188*d*. Cordless Phone CP188*a* implements wireless communication with a cordless handset or Communication Device 200 by utilizing Cordless Phone Signal Data#1. Cordless Phone CP188*b* implements wireless communication with a cordless handset or Communication Device 200 by utilizing Cordless Phone Signal Data#2. Cordless Phone CP188*c* implements wireless communication with a cordless handset or Communication Device 200 by utilizing Cordless Phone Signal Data#3. Cordless Phone CP188*4* implements wireless communication with a cordless handset or Communication Device 200 by utilizing Cordless Phone Signal Data#4.

This Paragraph [0111] illustrates the cordless phones and the fixed phone network. In the present embodiment, each cordless phone is connected to the corresponding fixed network. Cordless Phone CP188*a* (Paragraph [0110]) is connected to Fixed Phone Network FPN188*a*. Cordless Phone CP188*b* (Paragraph [0110]) is connected to Fixed Phone Network FPN188*b*. Cordless Phone CP188*c* (Paragraph [0110]) is connected to Fixed Phone Network FPN188*c*. Cordless Phone CP188*d* (Paragraph [0110]) is connected to Fixed Phone Network FPN188*d*.

This Paragraph [0112] illustrates the connection between the fixed phone networks and the Internet. In the present embodiment, each fixed phone network, i.e., Fixed Phone Network FPN188*a* (Paragraph [0111]), Fixed Phone Network FPN188*b* (Paragraph [0111]), Fixed Phone Network FPN188*c* (Paragraph [0111]), and Fixed Phone Network FPN188*d* (Paragraph [0111]), is connected to Internet In188.

This Paragraph [0113] illustrates the storage area included in Host H (FIG. 2). In the present embodiment, Host H includes Cordless Phone Connecting Information Storage Area H188*a* of which the data and the software programs stored therein are described in Paragraph(s) [0114].

This Paragraph [0114] illustrates the storage areas included in Cordless Phone Connecting Information Storage Area H188*a* (Paragraph [0113]). In the present embodiment, Cordless Phone Connecting Information Storage Area H188*a* includes Cordless Phone Connecting Data Storage Area H188*b* and Cordless Phone Connecting Software Storage Area H188*c*. Cordless Phone Connecting Data Storage Area H188*b* stores the data necessary to implement the present function on the side of Host H (FIG. 2), such as the ones described in Paragraph(s) [0115]. Cordless Phone Connecting Software Storage Area H188*c* stores the software programs necessary to implement the present function on the side of Host H, such as the ones described in Paragraph(s) [0120].

This Paragraph [0115] illustrates the storage areas included in Cordless Phone Connecting Data Storage Area H188*b* (Paragraph [0114]). In the present embodiment, Cordless Phone Connecting Data Storage Area H188*b* includes Cordless Phone Connection Flag Data Storage Area H188*b*1, Cordless Phone Signal Data Storage Area H188*b*2, Phone Ring Data Storage Area H188*b*3, Vibrating Pattern Data Storage Area H188*b*4, LED Pattern Data Storage Area H188*b*5, and Work Area H188*b*6. Cordless Phone Connection Flag Data Storage Area H188*b*1 stores the cordless phone connection flag data which is either the cordless phone connection active data or the cordless phone connection inactive data. Communication Device 200 is connected to one of the cordless phones described in Paragraph(s) [0110] in a wireless fashion and thereby enables the user of Communication Device 200 to implement voice or data communication by utilizing the corresponding fixed phone network when the cordless phone connection active data is stored in the present storage area. On the other hand, Communication Device 200 is not connected to any of the cordless phones described in Paragraph(s) [0110] and thereby the user of Communication Device 200 is not able to implement voice or data communication by utilizing any fixed phone network when the cordless phone connection inactive data is stored in the present storage area. Cordless Phone Signal Data Storage Area H188$b$2 stores the data described in Paragraph(s) [0116]. Phone Ring Data Storage Area H188$b$3 stores the data described in Paragraph(s) [0117]. Vibrating Pattern Data Storage Area H188$b$4 stores the data described in Paragraph(s) [0118]. LED Pattern Data Storage Area H188$b$5 stores the data described in Paragraph(s) [0119]. Work Area H188$b$6 is utilized as a work area to perform calculation and temporarily store data.

This Paragraph [0116] illustrates the data stored in Cordless Phone Signal Data Storage Area H188$b$2 (Paragraph [0115]). In the present embodiment, Cordless Phone Signal Data Storage Area H188$b$2 comprises two columns, i.e., 'Cordless Phone Signal ID' and 'Cordless Phone Signal Data'. Column 'Cordless Phone Signal ID' stores the cordless phone signal IDs, and each cordless phone signal ID is an identification of the corresponding cordless phone signal data stored in column 'Cordless Phone Signal Data'. Column 'Cordless Phone Signal Data' stores the cordless phone signal data, and each cordless phone signal data is unique to each cordless phone described in Paragraph(s) [0110]. In the present embodiment, Cordless Phone Signal Data Storage Area H188$b$2 stores the following data: 'Cordless Phone Signal#1' and the corresponding 'Cordless Phone Signal Data#1'; 'Cordless Phone Signal#2' and the corresponding 'Cordless Phone Signal Data#2'; 'Cordless Phone Signal#3' and the corresponding 'Cordless Phone Signal Data#3'; and 'Cordless Phone Signal#4' and the corresponding 'Cordless Phone Signal Data#4'. Cordless Phone Signal Data#1 is utilized by Cordless Phone CP188$a$ (Paragraph [0110]) for wireless communication. Cordless Phone Signal Data#2 is utilized by Cordless Phone CP188$b$ (Paragraph [0110]) for wireless communication. Cordless Phone Signal Data#3 is utilized by Cordless Phone CP188$c$ (Paragraph [0110]) for wireless communication. Cordless Phone Signal Data#4 is utilized by Cordless Phone CP188$d$ (Paragraph [0110]) for wireless communication.

This Paragraph [0117] illustrates the data stored in Phone Ring Data Storage Area H188$b$3 (Paragraph [0115]). In the present embodiment, Phone Ring Data Storage Area H188$b$3 comprises two columns, i.e., 'Phone Ring ID' and 'Phone Ring Data'. Column 'Phone Ring ID' stores the phone ring IDs, and each phone ring ID is an identification of the corresponding phone ring data stored in column 'Phone Ring Data'. Column 'Phone Ring Data' stores the phone ring data, and each phone ring data is the wave data designed to be output via Speaker 216 (FIG. 1) when Communication Device 200 receives a phone call. In the present embodiment, Phone Ring Data Storage Area H188$b$3 stores the following data: 'Phone Ring#1' and the corresponding 'Phone Ring Data#1'; 'Phone Ring#2' and the corresponding 'Phone Ring Data#2'; 'Phone Ring#3' and the corresponding 'Phone Ring Data#3'; and 'Phone Ring#4' and the corresponding 'Phone Ring Data#4'. Phone Ring Data#1 is utilized when Cordless Phone CP188$a$ (Paragraph [0110]) receives a phone call. Phone Ring Data#2 is utilized when Cordless Phone CP188$b$ (Paragraph [0110]) receives a phone call. Phone Ring Data#3 is utilized when Cordless Phone CP188$c$ (Paragraph [0110]) receives a phone call. Phone Ring Data#4 is utilized when Cordless Phone CP188$d$ (Paragraph [0110]) receives a phone call.

This Paragraph [0118] illustrates the data stored in Vibrating Pattern Data Storage Area H188$b$4 (Paragraph [0115]). In the present embodiment, Vibrating Pattern Data Storage Area H188$b$4 comprises two columns, i.e., 'Vibrating Pattern ID' and 'Vibrating Pattern Data'. Column 'Vibrating Pattern ID' stores the vibrating pattern IDs, and each vibrating pattern ID is an identification of the corresponding vibrating pattern data stored in column 'Vibrating Pattern Data'. Column 'Vibrating Pattern Data' stores the vibrating pattern data, and each vibrating pattern data indicates the vibrating pattern of Vibrator 217 (FIG. 1). In the present embodiment, Vibrating Pattern Data Storage Area H188$b$4 stores the following data: 'Vibrating Pattern#1' and the corresponding 'Vibrating Pattern Data#1'; 'Vibrating Pattern#2' and the corresponding 'Vibrating Pattern Data#2'; 'Vibrating Pattern#3' and the corresponding 'Vibrating Pattern Data#3'; and 'Vibrating Pattern#4' and the corresponding 'Vibrating Pattern Data#4'. Vibrating Pattern Data#1 is utilized when Cordless Phone CP188$a$ (Paragraph [0110]) receives a phone call. Vibrating Pattern Data#2 is utilized when Cordless Phone CP188$b$ (Paragraph [0110]) receives a phone call. Vibrating Pattern Data#3 is utilized when Cordless Phone CP188$c$ (Paragraph [0110]) receives a phone call. Vibrating Pattern Data#4 is utilized when Cordless Phone CP188$d$ (Paragraph [0110]) receives a phone call.

This Paragraph [0119] illustrates the data stored in LED Pattern Data Storage Area H188$b$5 (Paragraph [0115]). In the present embodiment, LED Pattern Data Storage Area H188$b$5 comprises two columns, i.e., 'LED Pattern ID' and 'LED Pattern Data'. Column 'LED Pattern ID' stores the LED pattern IDs, and each LED pattern ID is an identification of the corresponding LED pattern data stored in column 'LED Pattern Data'. Column 'LED Pattern Data' stores the LED pattern data, and each LED pattern data indicates the light emitting pattern of LED 219 (FIG. 380 of the Prior File Application). In the present embodiment, LED Pattern Data Storage Area H188$b$5 stores the following data: 'LED Pattern#1' and the corresponding 'LED Pattern Data#1'; 'LED Pattern#2' and the corresponding 'LED Pattern Data#2'; 'LED Pattern#3' and the corresponding 'LED Pattern Data#3'; and 'LED Pattern#4' and the corresponding 'LED Pattern Data#4'. LED Pattern Data#1 is utilized when Cordless Phone CP188$a$ (Paragraph [0110]) receives a phone call. LED Pattern Data#2 is utilized when Cordless Phone CP188$b$ (Paragraph [0110]) receives a phone call. LED Pattern Data#3 is utilized when Cordless Phone CP188$c$ (Paragraph [0110]) receives a phone call. LED Pattern Data#4 is utilized when Cordless Phone CP188$d$ (Paragraph [0110]) receives a phone call.

This Paragraph [0120] illustrates the software programs stored in Cordless Phone Connecting Software Storage Area H188$c$ (Paragraph [0114]). In the present embodiment, Cordless Phone Connecting Software Storage Area H188$c$ stores Cordless Phone Connecting Function Activating Software H188$c$1, Phone Call For Cordless Phone CP188$a$ Notifying Software H188$c$2, Phone Call For Cordless Phone CP188$b$ Notifying Software H188$c$3, Phone Call For Cordless Phone CP188$c$ Notifying Software H188$c$4, and Phone Call For Cordless Phone CP188$d$ Notifying Software H188$c$5. Cordless Phone Connecting Function Activating Software H188$c$1 is the software program described in Paragraph(s) [0130]. Phone Call For Cordless Phone CP188$a$ Notifying Software H188$c$2 is the software program described in Paragraph(s) [0131]. Phone Call For Cordless Phone CP188$b$ Notifying Software H188$c$3 is the software program described in Paragraph(s) [0132]. Phone Call For Cordless Phone CP188$c$ Notifying Software H188$c$4 is the software program described in Paragraph(s) [0133]. Phone Call For Cordless Phone CP188$d$ Notifying Software H188$c$5 is the software program described in Paragraph(s) [0134].

This Paragraph [0121] illustrates the storage area included in RAM 206 (FIG. 1) of Communication Device 200. In the present embodiment, RAM 206 includes Cordless Phone Connecting Information Storage Area 206188a of which the data and the software programs stored therein are described in Paragraph(s) [0123].

The data and/or the software programs necessary to implement the present function may be downloaded from Host H (FIG. 2) to Communication Device 200.

This Paragraph [0123] illustrates the storage areas included in Cordless Phone Connecting Information Storage Area 206188a (Paragraph [0121]). In the present embodiment, Cordless Phone Connecting Information Storage Area 206188a includes Cordless Phone Connecting Data Storage Area 206188b and Cordless Phone Connecting Software Storage Area 206188c. Cordless Phone Connecting Data Storage Area 206188b stores the data necessary to implement the present function on the side of Communication Device 200, such as the ones described in Paragraph(s) [0124]. Cordless Phone Connecting Software Storage Area 206188c stores the software programs necessary to implement the present function on the side of Communication Device 200, such as the ones described in Paragraph(s) [0129].

This Paragraph [0124] illustrates the storage areas included in Cordless Phone Connecting Data Storage Area 206188b (Paragraph [0123]). In the present embodiment, Cordless Phone Connecting Data Storage Area 206188b includes Cordless Phone Connection Flag Data Storage Area 206188b1, Cordless Phone Signal Data Storage Area 206188b2, Phone Ring Data Storage Area 206188b3, Vibrating Pattern Data Storage Area 206188b4, LED Pattern Data Storage Area 206188b5, and Work Area 206188b6. Cordless Phone Connection Flag Data Storage Area 206188b1 stores the cordless phone connection flag data which is either the cordless phone connection active data or the cordless phone connection inactive data. Communication Device 200 is connected to one of the cordless phones described in Paragraph(s) [0110] in a wireless fashion and thereby enables the user of Communication Device 200 to implement voice or data communication by utilizing the corresponding fixed phone network when the cordless phone connection active data is stored in the present storage area. On the other hand, Communication Device 200 is not connected to any of the cordless phones described in Paragraph(s) [0110] and thereby the user of Communication Device 200 is not able to implement voice or data communication by utilizing any fixed phone network when the cordless phone connection inactive data is stored in the present storage area. Cordless Phone Signal Data Storage Area 206188b2 stores the data described in Paragraph(s) [0125]. Phone Ring Data Storage Area 206188b3 stores the data described in Paragraph(s) [0126]. Vibrating Pattern Data Storage Area 206188b4 stores the data described in Paragraph(s) [0127]. LED Pattern Data Storage Area 206188b5 stores the data described in Paragraph(s) [0128]. Work Area 206188b6 is utilized as a work area to perform calculation and temporarily store data.

This Paragraph [0125] illustrates the data stored in Cordless Phone Signal Data Storage Area 206188b2 (Paragraph [0124]). In the present embodiment, Cordless Phone Signal Data Storage Area 206188b2 comprises two columns, i.e., 'Cordless Phone Signal ID' and 'Cordless Phone Signal Data'. Column 'Cordless Phone Signal ID' stores the cordless phone signal IDs, and each cordless phone signal ID is an identification of the corresponding cordless phone signal data stored in column 'Cordless Phone Signal Data'. Column 'Cordless Phone Signal Data' stores the cordless phone signal data, and each cordless phone signal data is unique to each cordless phone described in Paragraph(s) [0110]. In the present embodiment, Cordless Phone Signal Data Storage Area 206188b2 stores the following data: 'Cordless Phone Signal#1' and the corresponding 'Cordless Phone Signal Data#1'; 'Cordless Phone Signal#2' and the corresponding 'Cordless Phone Signal Data#2'; 'Cordless Phone Signal#3' and the corresponding 'Cordless Phone Signal Data#3'; and 'Cordless Phone Signal#4' and the corresponding 'Cordless Phone Signal Data#4'. Cordless Phone Signal Data#1 is utilized by Cordless Phone CP188a (Paragraph [0110]) for wireless communication. Cordless Phone Signal Data#2 is utilized by Cordless Phone CP188b (Paragraph [0110]) for wireless communication. Cordless Phone Signal Data#3 is utilized by Cordless Phone CP188c (Paragraph [0110]) for wireless communication. Cordless Phone Signal Data#4 is utilized by Cordless Phone CP188d (Paragraph [0110]) for wireless communication.

This Paragraph [0126] illustrates the data stored in Phone Ring Data Storage Area 206188b3 (Paragraph [0124]). In the present embodiment, Phone Ring Data Storage Area 206188b3 comprises two columns, i.e., 'Phone Ring ID' and 'Phone Ring Data'. Column 'Phone Ring ID' stores the phone ring IDs, and each phone ring ID is an identification of the corresponding phone ring data stored in column 'Phone Ring Data'. Column 'Phone Ring Data' stores the phone ring data, and each phone ring data is the wave data designed to be output via Speaker 216 (FIG. 1) when Communication Device 200 receives a phone call. In the present embodiment, Phone Ring Data Storage Area 206188b3 stores the following data: 'Phone Ring#1' and the corresponding 'Phone Ring Data#1'; 'Phone Ring#2' and the corresponding 'Phone Ring Data#2'; 'Phone Ring#3' and the corresponding 'Phone Ring Data#3'; and 'Phone Ring#4' and the corresponding 'Phone Ring Data#4'. Phone Ring Data#1 is utilized when Cordless Phone CP188a (Paragraph [0110]) receives a phone call. Phone Ring Data#2 is utilized when Cordless Phone CP188b (Paragraph [0110]) receives a phone call. Phone Ring Data#3 is utilized when Cordless Phone CP188c (Paragraph [0110]) receives a phone call. Phone Ring Data#4 is utilized when Cordless Phone CP188d (Paragraph [0110]) receives a phone call.

This Paragraph [0127] illustrates the data stored in Vibrating Pattern Data Storage Area 206188b4 (Paragraph [0124]). In the present embodiment, Vibrating Pattern Data Storage Area 206188b4 comprises two columns, i.e., 'Vibrating Pattern ID' and 'Vibrating Pattern Data'. Column 'Vibrating Pattern ID' stores the vibrating pattern IDs, and each vibrating pattern ID is an identification of the corresponding vibrating pattern data stored in column 'Vibrating Pattern Data'. Column 'Vibrating Pattern Data' stores the vibrating pattern data, and each vibrating pattern data indicates the vibrating pattern of Vibrator 217 (FIG. 1). In the present embodiment, Vibrating Pattern Data Storage Area 206188b4 stores the following data: 'Vibrating Pattern#1' and the corresponding 'Vibrating Pattern Data#1'; 'Vibrating Pattern#2' and the corresponding 'Vibrating Pattern Data#2'; 'Vibrating Pattern#3' and the corresponding 'Vibrating Pattern Data#3'; and 'Vibrating Pattern#4' and the corresponding 'Vibrating Pattern Data#4'. Vibrating Pattern Data#1 is utilized when Cordless Phone CP188a (Paragraph [0110]) receives a phone call. Vibrating Pattern Data#2 is utilized when Cordless Phone CP188b (Paragraph [0110]) receives a phone call. Vibrating Pattern Data#3 is utilized when Cordless Phone CP188c (Paragraph [0110]) receives a phone call. Vibrating Pattern Data#4 is utilized when Cordless Phone CP188d (Paragraph [0110]) receives a phone call.

This Paragraph [0128] illustrates the data stored in LED Pattern Data Storage Area 206188b5 (Paragraph [0124]). In the present embodiment, LED Pattern Data Storage Area 206188*b*5 comprises two columns, i.e., 'LED Pattern ID' and 'LED Pattern Data'. Column 'LED Pattern ID' stores the LED pattern IDs, and each LED pattern ID is an identification of the corresponding LED pattern data stored in column 'LED Pattern Data'. Column 'LED Pattern Data' stores the LED pattern data, and each LED pattern data indicates the light emitting pattern of LED 219 (FIG. 380 of the Prior File Application). In the present embodiment, LED Pattern Data Storage Area 206188*b*5 stores the following data: 'LED Pattern#1' and the corresponding 'LED Pattern Data#1'; 'LED Pattern#2' and the corresponding 'LED Pattern Data#2'; 'LED Pattern#3' and the corresponding 'LED Pattern Data#3'; and 'LED Pattern#4' and the corresponding 'LED Pattern Data#4'. LED Pattern Data#1 is utilized when Cordless Phone CP188*a* (Paragraph [0110]) receives a phone call. LED Pattern Data#2 is utilized when Cordless Phone CP188*b* (Paragraph [0110]) receives a phone call. LED Pattern Data#3 is utilized when Cordless Phone CP188*c* (Paragraph [0110]) receives a phone call. LED Pattern Data#4 is utilized when Cordless Phone CP188*d* (Paragraph [0110]) receives a phone call.

This Paragraph [0129] illustrates the software programs stored in Cordless Phone Connecting Software Storage Area 206188*c* (Paragraph [0123]). In the present embodiment, Cordless Phone Connecting Software Storage Area 206188*c* stores Cordless Phone Connecting Function Activating Software 206188*c*1, Phone Call For Cordless Phone CP188*a* Notifying Software 206188*c*2, Phone Call For Cordless Phone CP188*b* Notifying Software 206188*c*3, Phone Call For Cordless Phone CP188*c* Notifying Software 206188*c*4, and Phone Call For Cordless Phone CP188*d* Notifying Software 206188*c*5. Cordless Phone Connecting Function Activating Software 206188*c*1 is the software program described in Paragraph(s) [0130] and [0138] Phone Call For Cordless Phone CP188*a* Notifying Software 206188*c*2 is the software program described in Paragraph(s) [0131] and [0137]. Phone Call For Cordless Phone CP188*b* Notifying Software 206188*c*3 is the software program described in Paragraph(s) [0132] and Phone Call For Cordless Phone CP188*c* Notifying Software 206188*c*4 is the software program described in Paragraph(s) [0133] and [0139]. Phone Call For Cordless Phone CP188*d* Notifying Software 206188*c*5 is the software program described in Paragraph(s) [0134] and [0140].

This Paragraph [0130] illustrate(s) Cordless Phone Connecting Function Activating Software H188*c*1 (Paragraph [0120]) of Host H (FIG. 2) and Cordless Phone Connecting Function Activating Software 206188*c*1 (Paragraph [0129]) of Communication Device 200, which activate the present function. In the present embodiment, CPU 211 (FIG. 1) displays the cordless phone connecting function screen (S1). Here, the cordless phone connecting function screen is utilized to activate the present function. The following two options are displayed on the screen: 'Active' and 'Inactive'. If the user of Communication Device 200 selects 'Active', the present function is activated and implemented, whereas if the user of Communication Device 200 selects 'Inactive', the present function is not activated and implemented. The user selects by utilizing Input Device 210 (FIG. 1) or via voice recognition system one of the foregoing two options displayed on cordless phone connecting function screen (S2). CPU 211 (FIG. 1) sends the option selected in the previous step to Host H (FIG. 2) in a wireless fashion (S3). Host H (FIG. 2) receives the option sent in the previous step from Communication Device 200 (S4). If the option received in the previous step is 'Active', Host H (FIG. 2) stores the cordless phone connection active data in Cordless Phone Connection Flag Data Storage Area H188*b*1 (Paragraph [0115]); if the option selected in the previous step is 'Inactive', Host H (FIG. 2) stores the cordless phone connection inactive data therein (S5).

This Paragraph [0131] illustrate(s) Phone Call For Cordless Phone CP188*a* Notifying Software H188*c*2 (Paragraph [0120]) of Host H (FIG. 2) and Phone Call For Cordless Phone CP188*a* Notifying Software 206188*c*2 (Paragraph [0129]) of Communication Device 200, which output notification when Cordless Phone CP188*a* (Paragraph [0110]) receives a phone call. In the present embodiment, CPU 211 (FIG. 1) checks the incoming signal (S1). CPU 211 (FIG. 1) scans Cordless Phone Signal Data Storage Area 206188*b*2 (Paragraph [0125]) (S2). If Cordless Phone Signal Data#1 is detected in the incoming signal received in S1, CPU 211 (FIG. 1) proceeds to the next step (S3). CPU 211 (FIG. 1) sends the cordless phone signal data#1 acknowledgment and flag data inquiry to Host H in a wireless fashion (S4). Here, the cordless phone signal data#1 acknowledgment and flag data inquiry indicates that Cordless Phone Signal Data#1 is detected and inquires the data stored in Cordless Phone Connection Flag Data Storage Area H188*b*1 (Paragraph [0115]) of Host H (FIG. 2). Host H (FIG. 2) receives the cordless phone signal data#1 acknowledgment and flag data inquiry from Communication Device 200 and checks the data stored in Cordless Phone Connection Flag Data Storage Area H188*b*1 (Paragraph [0115]) (S5). If the cordless phone connection active data is stored in Cordless Phone Connection Flag Data Storage Area H188*b*1 (Paragraph [0115]), Host H (FIG. 2) proceeds to the next step (S6). Host H (FIG. 2) retrieves Phone Ring Data#1 from Phone Ring Data Storage Area H188*b*3 (Paragraph [0117]) and sends the data to Communication Device 200 (S7). CPU 211 (FIG. 1) receives Phone Ring Data#1 from Host H in a wireless fashion and outputs the data from Speaker 216 (FIG. 1) (S8). Host H (FIG. 2) retrieves Vibrating Pattern Data#1 from Vibrating Pattern Data Storage Area H188*b*4 (Paragraph [0118]) and sends the data to Communication Device 200 (S9). CPU 211 (FIG. 1) receives Vibrating Pattern Data#1 from Host H in a wireless fashion and activates Vibrator 217 (FIG. 1) in accordance with Vibrating Pattern Data#1 (S10). Host H (FIG. 2) retrieves LED Pattern Data#1 from LED Pattern Data Storage Area H188*b*5 (Paragraph [0119]) and sends the data to Communication Device 200 (S11). CPU 211 (FIG. 1) receives LED Pattern Data#1 from Host H in a wireless fashion and activates LED 219 (FIG. 380 of the Prior File Application) in accordance with LED Pattern Data#1 (S12). If the user answers the phone call, CPU 211 (FIG. 1) proceeds to the next step (S13). CPU 211 (FIG. 1) initiates voice and/or data communication thereafter via Cordless Phone CP188*a* (Paragraph [0110]) (S14). The foregoing sequence is repeated periodically.

This Paragraph [0132] illustrate(s) Phone Call For Cordless Phone CP188*b* Notifying Software H188*c*3 (Paragraph [0120]) of Host H (FIG. 2) and Phone Call For Cordless Phone CP188*b* Notifying Software 206188*c*3 (Paragraph [0129]) of Communication Device 200, which output notification when Cordless Phone CP188*b* (Paragraph [0110]) receives a phone call. In the present embodiment, CPU 211 (FIG. 1) checks the incoming signal (S1). CPU 211 (FIG. 1) scans Cordless Phone Signal Data Storage Area 206188*b*2 (Paragraph [0125]) (S2). If Cordless Phone Signal Data#2 is detected in the incoming signal received in S1, CPU 211 (FIG. 1) proceeds to the next step (S3). CPU 211 (FIG. 1) sends the cordless phone signal data#2 acknowledgment and flag data inquiry to Host H in a wireless fashion (S4). Here, the cordless phone signal data#2 acknowledgment and flag data inquiry indicates that Cordless Phone Signal Data#2 is detected and inquires the data stored in Cordless Phone Connection Flag Data Storage Area H188b1 (Paragraph [0115]) of Host H (FIG. 2). Host H (FIG. 2) receives the cordless phone signal data#2 acknowledgment and flag data inquiry from Communication Device 200 and checks the data stored in Cordless Phone Connection Flag Data Storage Area H188b1 (Paragraph [0115]) (S5). If the cordless phone connection active data is stored in Cordless Phone Connection Flag Data Storage Area H188b1 (Paragraph [0115]), Host H (FIG. 2) proceeds to the next step (S6). Host H (FIG. 2) retrieves Phone Ring Data#2 from Phone Ring Data Storage Area H188b3 (Paragraph [0117]) and sends the data to Communication Device 200 (S7). CPU 211 (FIG. 1) receives Phone Ring Data#2 from Host H in a wireless fashion and outputs the data from Speaker 216 (FIG. 1) (S8). Host H (FIG. 2) retrieves Vibrating Pattern Data#2 from Vibrating Pattern Data Storage Area H188b4 (Paragraph [0118]) and sends the data to Communication Device 200 (S9). CPU 211 (FIG. 1) receives Vibrating Pattern Data#2 from Host H in a wireless fashion and activates Vibrator 217 (FIG. 1) in accordance with Vibrating Pattern Data#2 (S10). Host H (FIG. 2) retrieves LED Pattern Data#2 from LED Pattern Data Storage Area H188b5 (Paragraph [0119]) and sends the data to Communication Device 200 (S11). CPU 211 (FIG. 1) receives LED Pattern Data#2 from Host H in a wireless fashion and activates LED 219 (FIG. 380 of the Prior File Application) in accordance with LED Pattern Data#2 (S12). If the user answers the phone call, CPU 211 (FIG. 1) proceeds to the next step (S13). CPU 211 (FIG. 1) initiates voice and/or data communication thereafter via Cordless Phone CP188b (Paragraph [0110]) (S14). The foregoing sequence is repeated periodically.

This Paragraph [0133] illustrate(s) Phone Call For Cordless Phone CP188c Notifying Software H188c4 (Paragraph [0120]) of Host H (FIG. 2) and Phone Call For Cordless Phone CP188c Notifying Software 206188c4 (Paragraph [0129]) of Communication Device 200, which output notification when Cordless Phone CP188c (Paragraph [0110]) receives a phone call. In the present embodiment, CPU 211 (FIG. 1) checks the incoming signal (S1). CPU 211 (FIG. 1) scans Cordless Phone Signal Data Storage Area 206188b2 (Paragraph [0125]) (S2). If Cordless Phone Signal Data#3 is detected in the incoming signal received in S1, CPU 211 (FIG. 1) proceeds to the next step (S3). CPU 211 (FIG. 1) sends the cordless phone signal data#3 acknowledgment and flag data inquiry to Host H in a wireless fashion (S4). Here, the cordless phone signal data#3 acknowledgment and flag data inquiry indicates that Cordless Phone Signal Data#3 is detected and inquires the data stored in Cordless Phone Connection Flag Data Storage Area H188b1 (Paragraph [0115]) of Host H (FIG. 2). Host H (FIG. 2) receives the cordless phone signal data#3 acknowledgment and flag data inquiry from Communication Device 200 and checks the data stored in Cordless Phone Connection Flag Data Storage Area H188b1 (Paragraph [0115]) (S5). If the cordless phone connection active data is stored in Cordless Phone Connection Flag Data Storage Area H188b1 (Paragraph [0115]), Host H (FIG. 2) proceeds to the next step (S6). Host H (FIG. 2) retrieves Phone Ring Data#3 from Phone Ring Data Storage Area H188b3 (Paragraph [0117]) and sends the data to Communication Device 200 (S7). CPU 211 (FIG. 1) receives Phone Ring Data#3 from Host H in a wireless fashion and outputs the data from Speaker 216 (FIG. 1) (S8). Host H (FIG. 2) retrieves Vibrating Pattern Data#3 from Vibrating Pattern Data Storage Area H188b4 (Paragraph [0118]) and sends the data to Communication Device 200 (S9). CPU 211 (FIG. 1) receives Vibrating Pattern Data#3 from Host H in a wireless fashion and activates Vibrator 217 (FIG. 1) in accordance with Vibrating Pattern Data#3 (S10). Host H (FIG. 2) retrieves LED Pattern Data#3 from LED Pattern Data Storage Area H188b5 (Paragraph [0119]) and sends the data to Communication Device 200 (S11). CPU 211 (FIG. 1) receives LED Pattern Data#3 from Host H in a wireless fashion and activates LED 219 (FIG. 380 of the Prior File Application) in accordance with LED Pattern Data#3 (S12). If the user answers the phone call, CPU 211 (FIG. 1) proceeds to the next step (S13). CPU 211 (FIG. 1) initiates voice and/or data communication thereafter via Cordless Phone CP188c (Paragraph [0110]) (S14). The foregoing sequence is repeated periodically.

This Paragraph [0134] illustrate(s) Phone Call For Cordless Phone CP188d Notifying Software H188c5 (Paragraph [0120]) of Host H (FIG. 2) and Phone Call For Cordless Phone CP188d Notifying Software 206188c5 (Paragraph [0129]) of Communication Device 200, which output notification when Cordless Phone CP188d (Paragraph [0110]) receives a phone call. In the present embodiment, CPU 211 (FIG. 1) checks the incoming signal (S1). CPU 211 (FIG. 1) scans Cordless Phone Signal Data Storage Area 206188b2 (Paragraph [0125]) (S2). If Cordless Phone Signal Data#4 is detected in the incoming signal received in S1, CPU 211 (FIG. 1) proceeds to the next step (S3). CPU 211 (FIG. 1) sends the cordless phone signal data#4 acknowledgment and flag data inquiry to Host H in a wireless fashion (S4). Here, the cordless phone signal data#4 acknowledgment and flag data inquiry indicates that Cordless Phone Signal Data#4 is detected and inquires the data stored in Cordless Phone Connection Flag Data Storage Area H188b1 (Paragraph [0115]) of Host H (FIG. 2). Host H (FIG. 2) receives the cordless phone signal data#4 acknowledgment and flag data inquiry from Communication Device 200 and checks the data stored in Cordless Phone Connection Flag Data Storage Area H188b1 (Paragraph [0115]) (S5). If the cordless phone connection active data is stored in Cordless Phone Connection Flag Data Storage Area H188b1 (Paragraph [0115]), Host H (FIG. 2) proceeds to the next step (S6). Host H (FIG. 2) retrieves Phone Ring Data#4 from Phone Ring Data Storage Area H188b3 (Paragraph [0117]) and sends the data to Communication Device 200 (S7). CPU 211 (FIG. 1) receives Phone Ring Data#4 from Host H in a wireless fashion and outputs the data from Speaker 216 (FIG. 1) (S8). Host H (FIG. 2) retrieves Vibrating Pattern Data#4 from Vibrating Pattern Data Storage Area H188b4 (Paragraph [0118]) and sends the data to Communication Device 200 (S9). CPU 211 (FIG. 1) receives Vibrating Pattern Data#4 from Host H in a wireless fashion and activates Vibrator 217 (FIG. 1) in accordance with Vibrating Pattern Data#4 (S10). Host H (FIG. 2) retrieves LED Pattern Data#4 from LED Pattern Data Storage Area H188b5 (Paragraph [0119]) and sends the data to Communication Device 200 (S11). CPU 211 (FIG. 1) receives LED Pattern Data#4 from Host H in a wireless fashion and activates LED 219 (FIG. 380 of the Prior File Application) in accordance with LED Pattern Data#4 (S12). If the user answers the phone call, CPU 211 (FIG. 1) proceeds to the next step (S13). CPU 211 (FIG. 1) initiates voice and/or data communication thereafter via Cordless Phone CP188d (Paragraph [0110]) (S14). The foregoing sequence is repeated periodically.

This Paragraph [0136] through [0140] illustrate another embodiment wherein Communication Device 200 plays the major role in implementing the present function.

This Paragraph [0136] illustrate(s) Cordless Phone Connecting Function Activating Software 206188c1 (Paragraph

[0129]) of Communication Device 200, which activates the present function. In the present embodiment, CPU 211 (FIG. 1) displays the cordless phone connecting function screen (S1). Here, the cordless phone connecting function screen is utilized to activate the present function. The following two options are displayed on the screen: 'Active' and 'Inactive'. If the user of Communication Device 200 selects 'Active', the present function is activated and implemented, whereas if the user of Communication Device 200 selects 'Inactive', the present function is not activated and implemented. The user selects by utilizing Input Device 210 (FIG. 1) or via voice recognition system one of the foregoing two options displayed on cordless phone connecting function screen (S2). If the option selected in the previous step is 'Active', CPU 211 (FIG. 1) stores the cordless phone connection active data in Cordless Phone Connection Flag Data Storage Area 206188$b$1 (Paragraph [0124]); if the option selected in the previous step is 'Inactive', CPU 211 (FIG. 1) stores the cordless phone connection inactive data therein (S3).

This Paragraph [0137] illustrate(s) Phone Call For Cordless Phone CP188$a$ Notifying Software 206188$c$2 (Paragraph [0129]) of Communication Device 200, which outputs notification when Cordless Phone CP188$a$ (Paragraph [0110]) receives a phone call. In the present embodiment, CPU 211 (FIG. 1) checks the incoming signal (S1). CPU 211 (FIG. 1) scans Cordless Phone Signal Data Storage Area 206188$b$2 (Paragraph [0125]) (S2). If Cordless Phone Signal Data#1 is detected in the incoming signal received in S1, CPU 211 (FIG. 1) proceeds to the next step (S3). CPU 211 (FIG. 1) checks the data stored in Cordless Phone Connection Flag Data Storage Area 206188$b$1 (Paragraph [0124]) (S4). If the cordless phone connection active data is stored in Cordless Phone Connection Flag Data Storage Area 206188$b$1 (Paragraph [0124]), CPU 211 (FIG. 1) proceeds to the next step (S5). CPU 211 (FIG. 1) retrieves Phone Ring Data#1 from Phone Ring Data Storage Area 206188$b$3 (Paragraph [0126]) and outputs the data from Speaker 216 (FIG. 1) (S6). CPU 211 (FIG. 1) retrieves Vibrating Pattern Data#1 from Vibrating Pattern Data Storage Area 206188$b$4 (Paragraph [0127]) and activates Vibrator 217 (FIG. 1) in accordance with Vibrating Pattern Data#1 (S7). CPU 211 (FIG. 1) retrieves LED Pattern Data#1 from LED Pattern Data Storage Area 206188$b$5 (Paragraph [0128]) and activates LED 219 (FIG. 380 of the Prior File Application) in accordance with LED Pattern Data#1 (S8). If the user answers the phone call, CPU 211 (FIG. 1) proceeds to the next step (S9). CPU 211 (FIG. 1) initiates voice and/or data communication thereafter via Cordless Phone CP188$a$ (Paragraph [0110]) (S10). The foregoing sequence is repeated periodically.

This Paragraph [0138] illustrate(s) Phone Call For Cordless Phone CP188$b$ Notifying Software 206188$c$3 (Paragraph [0129]) of Communication Device 200, which outputs notification when Cordless Phone CP188$b$ (Paragraph [0110]) receives a phone call. In the present embodiment, CPU 211 (FIG. 1) checks the incoming signal (S1). CPU 211 (FIG. 1) scans Cordless Phone Signal Data Storage Area 206188$b$2 (Paragraph [0125]) (S2). If Cordless Phone Signal Data#2 is detected in the incoming signal received in S1, CPU 211 (FIG. 1) proceeds to the next step (S3). CPU 211 (FIG. 1) checks the data stored in Cordless Phone Connection Flag Data Storage Area 206188$b$1 (Paragraph [0124]) (S4). If the cordless phone connection active data is stored in Cordless Phone Connection Flag Data Storage Area 206188$b$1 (Paragraph [0124]), CPU 211 (FIG. 1) proceeds to the next step (S5). CPU 211 (FIG. 1) retrieves Phone Ring Data#2 from Phone Ring Data Storage Area 206188$b$3 (Paragraph [0126]) and outputs the data from Speaker 216 (FIG. 1) (S6). CPU 211 (FIG. 1) retrieves Vibrating Pattern Data#2 from Vibrating Pattern Data Storage Area 206188$b$4 (Paragraph [0127]) and activates Vibrator 217 (FIG. 1) in accordance with Vibrating Pattern Data#2 (S7). CPU 211 (FIG. 1) retrieves LED Pattern Data#2 from LED Pattern Data Storage Area 206188$b$5 (Paragraph [0128]) and activates LED 219 (FIG. 380 of the Prior File Application) in accordance with LED Pattern Data#2 (S8). If the user answers the phone call, CPU 211 (FIG. 1) proceeds to the next step (S9). CPU 211 (FIG. 1) initiates voice and/or data communication thereafter via Cordless Phone CP188$b$ (Paragraph [0110]) (S10). The foregoing sequence is repeated periodically.

This Paragraph [0139] illustrate(s) Phone Call For Cordless Phone CP188$c$ Notifying Software 206188$c$4 (Paragraph [0129]) of Communication Device 200, which outputs notification when Cordless Phone CP188$c$ (Paragraph [0110]) receives a phone call. In the present embodiment, CPU 211 (FIG. 1) checks the incoming signal (S1). CPU 211 (FIG. 1) scans Cordless Phone Signal Data Storage Area 206188$b$2 (Paragraph [0125]) (S2). If Cordless Phone Signal Data#3 is detected in the incoming signal received in S1, CPU 211 (FIG. 1) proceeds to the next step (S3). CPU 211 (FIG. 1) checks the data stored in Cordless Phone Connection Flag Data Storage Area 206188$b$1 (Paragraph [0124]) (S4). If the cordless phone connection active data is stored in Cordless Phone Connection Flag Data Storage Area 206188$b$1 (Paragraph [0124]), CPU 211 (FIG. 1) proceeds to the next step (S5). CPU 211 (FIG. 1) retrieves Phone Ring Data#3 from Phone Ring Data Storage Area 206188$b$3 (Paragraph [0126]) and outputs the data from Speaker 216 (FIG. 1) (S6). CPU 211 (FIG. 1) retrieves Vibrating Pattern Data#3 from Vibrating Pattern Data Storage Area 206188$b$4 (Paragraph [0127]) and activates Vibrator 217 (FIG. 1) in accordance with Vibrating Pattern Data#3 (S7). CPU 211 (FIG. 1) retrieves LED Pattern Data#3 from LED Pattern Data Storage Area 206188$b$5 (Paragraph [0128]) and activates LED 219 (FIG. 380 of the Prior File Application) in accordance with LED Pattern Data#3 (S8). If the user answers the phone call, CPU 211 (FIG. 1) proceeds to the next step (S9). CPU 211 (FIG. 1) initiates voice and/or data communication thereafter via Cordless Phone CP188$c$ (Paragraph [0110]) (S10). The foregoing sequence is repeated periodically.

This Paragraph [0140] illustrate(s) Phone Call For Cordless Phone CP188$d$ Notifying Software 206188$c$5 (Paragraph [0129]) of Communication Device 200, which outputs notification when Cordless Phone CP188$d$ (Paragraph [0110]) receives a phone call. In the present embodiment, CPU 211 (FIG. 1) checks the incoming signal (S1). CPU 211 (FIG. 1) scans Cordless Phone Signal Data Storage Area 206188$b$2 (Paragraph [0125]) (S2). If Cordless Phone Signal Data#4 is detected in the incoming signal received in S1, CPU 211 (FIG. 1) proceeds to the next step (S3). CPU 211 (FIG. 1) checks the data stored in Cordless Phone Connection Flag Data Storage Area 206188$b$1 (Paragraph [0124]) (S4). If the cordless phone connection active data is stored in Cordless Phone Connection Flag Data Storage Area 206188$b$1 (Paragraph [0124]), CPU 211 (FIG. 1) proceeds to the next step (S5). CPU 211 (FIG. 1) retrieves Phone Ring Data#4 from Phone Ring Data Storage Area 206188$b$3 (Paragraph [0126]) and outputs the data from Speaker 216 (FIG. 1) (S6). CPU 211 (FIG. 1) retrieves Vibrating Pattern Data#4 from Vibrating Pattern Data Storage Area 206188$b$4 (Paragraph [0127]) and activates Vibrator 217 (FIG. 1) in accordance with Vibrating Pattern Data#4 (S7). CPU 211 (FIG. 1) retrieves LED Pattern Data#4 from LED Pattern Data Storage Area 206188$b$5 (Paragraph [0128]) and activates LED 219 (FIG. 380 of the Prior File Application) in accordance with LED Pattern Data#4 (S8). If the user answers the phone call, CPU 211 (FIG. 1) proceeds to the next step (S9). CPU 211 (FIG. 1) initiates voice and/or data communication thereafter via Cordless Phone CP188*d* (Paragraph [0110]) (S10). The foregoing sequence is repeated periodically.

<<Emoney Transferring Function>>

Paragraph(s) [0143] through [0161] illustrate the emoney transferring function, wherein the emoney data which is stored in Device A, a Communication Device 200, is retrieved and sent to Device B, another Communication Device 200, in a wireless fashion. Here, the emoney data is the data stored in an electronic form which represents a certain value of money. The foregoing emoney data may be stored in Host H (FIG. 2).

This Paragraph [0143] illustrates the storage area included in Host H (FIG. 2). In the present embodiment, Host H includes Emoney Transferring Information Storage Area H192*a* of which the data and the software programs stored therein are described in Paragraph(s) [0144].

This Paragraph [0144] illustrates the storage areas included in Emoney Transferring Information Storage Area H192*a* (Paragraph [0143]). In the present embodiment, Emoney Transferring Information Storage Area H192*a* includes Emoney Transferring Data Storage Area H192*b* and Emoney Transferring Software Storage Area H192*c*. Emoney Transferring Data Storage Area H192*b* stores the data necessary to implement the present function on the side of Host H (FIG. 2), such as the ones described in Paragraph(s) [0145]. Emoney Transferring Software Storage Area H192*c* stores the software programs necessary to implement the present function on the side of Host H (FIG. 2), such as the ones described in Paragraph(s) [0146].

This Paragraph [0145] illustrates the storage areas included in Emoney Transferring Data Storage Area H192*b* (Paragraph [0144]). In the present embodiment, Emoney Transferring Data Storage Area H192*b* includes Total Emoney Data Storage Area H192*b*1, Processing Emoney Data Storage Area H192*b*2, Log Data Storage Area H192*b*3, and Work Area H192*b*4. Total Emoney Data Storage Area H192*b*1 stores the total emoney data which represents the total amount (or balance) of emoney data owned by Device A. Here, the emoney data is the data stored in an electronic form which represents a certain value of money in U.S. dollars. Processing Emoney Data Storage Area H192*b*2 stores the processing emoney data which represents the amount of emoney data processed by implementing the present function, i.e., sent to device or received from another device. Log Data Storage Area H192*b*3 stores the log data which indicates the log of disposing the emoney owned by Device A (e.g., depositing to bank, transferring to another Communication Device 200, purchasing goods, paying for services, buying tickets, etc.). Work Area H192*b*4 is utilized as a work area to perform calculation and temporarily store data.

This Paragraph [0146] illustrates the software programs stored in Emoney Transferring Software Storage Area H192*c* (Paragraph [0144]). In the present embodiment, Emoney Transferring Software Storage Area H192*c* stores Transferring Emoney Data Identifying Software H192*c*1 and Emoney Data Sending/Receiving Software H192*c*2. Transferring Emoney Data Identifying Software H192*c*1 is the software program described in Paragraph(s) [0157]. Emoney Data Sending/Receiving Software H192*c*2 is the software program described in Paragraph(s) [0158].

This Paragraph [0147] illustrates the storage area included in RAM 206 (FIG. 1) of Device A. In the present embodiment, RAM 206 includes Emoney Transferring Information Storage Area 206A192*a* of which the data and the software programs stored therein are described in Paragraph(s) [0149].

The data and/or the software programs necessary to implement the present function may be downloaded from Host H (FIG. 2) to Device A.

This Paragraph [0149] illustrates the storage areas included in Emoney Transferring Information Storage Area 206A192*a* (Paragraph [0147]). In the present embodiment, Emoney Transferring Information Storage Area 206A192*a* includes Emoney Transferring Data Storage Area 206A192*b* and Emoney Transferring Software Storage Area 206A192*c*. Emoney Transferring Data Storage Area 206A192*b* stores the data necessary to implement the present function on the side of Device A, such as the ones described in Paragraph(s) [0150]. Emoney Transferring Software Storage Area 206A192*c* stores the software programs necessary to implement the present function on the side of Device A, such as the ones described in Paragraph(s) [0151].

This Paragraph [0150] illustrates the storage areas included in Emoney Transferring Data Storage Area 206A192*b* (Paragraph [0149]). In the present embodiment, Emoney Transferring Data Storage Area 206A192*b* includes Total Emoney Data Storage Area 206A192*b*1, Processing Emoney Data Storage Area 206A192*b*2, Log Data Storage Area 206A192*b*3, and Work Area 206A192*b*4. Total Emoney Data Storage Area 206A192*b*1 stores the total emoney data which represents the total amount (or balance) of emoney data stored in Device A. Here, the emoney data is the data stored in an electronic form which represents a certain value of money in U.S. dollars. Processing Emoney Data Storage Area 206A192*b*2 stores the processing emoney data which represents the amount of emoney data processed by implementing the present function, i.e., sent to device or received from another device. Log Data Storage Area 206A192*b*3 stores the log data which indicates the log of disposing the emoney stored in Device A (e.g., depositing to bank, transferring to another Communication Device 200, purchasing goods, paying for services, buying tickets, etc.). Work Area 206A192*b*4 is utilized as a work area to perform calculation and temporarily store data.

This Paragraph [0151] illustrates the software programs stored in Emoney Transferring Software Storage Area 206A192*c* (Paragraph [0149]). In the present embodiment, Emoney Transferring Software Storage Area 206A192*c* stores Transferring Emoney Data Identifying Software 206A192*c*1 and Emoney Data Sending/Receiving Software 206A192*c*2. Transferring Emoney Data Identifying Software 206A192*c*1 is the software program described in Paragraph(s) [0157] and [0160]. Emoney Data Sending/Receiving Software 206A192*c*2 is the software program described in Paragraph(s) [0158] and [0161].

This Paragraph [0152] illustrates the storage area included in RAM 206 (FIG. 1) of Device B. In the present embodiment, RAM 206 includes Emoney Transferring Information Storage Area 206B192*a* of which the data and the software programs stored therein are described in Paragraph(s) [0154].

The data and/or the software programs necessary to implement the present function may be downloaded from Host H (FIG. 2) to Device B.

This Paragraph [0154] illustrates the storage areas included in Emoney Transferring Information Storage Area 206B192*a* (Paragraph [0152]). In the present embodiment, Emoney Transferring Information Storage Area 206B192*a* includes Emoney Transferring Data Storage Area 206B192*b* and Emoney Transferring Software Storage Area 206B192*c*. Emoney Transferring Data Storage Area 206B192*b* stores the data necessary to implement the present function on the side of Device B, such as the ones described in Paragraph(s) [0155]. Emoney Transferring Software Storage Area 206B192*c* stores the software programs necessary to implement the present function on the side of Device B, such as the ones described in Paragraph(s) [0156].

This Paragraph [0155] illustrates the storage areas included in Emoney Transferring Data Storage Area 206B192*b* (Paragraph [0154]). In the present embodiment, Emoney Transferring Data Storage Area 206B192*b* includes Total Emoney Data Storage Area 206B192*b*1, Processing Emoney Data Storage Area 206B192*b*2, Log Data Storage Area 206B192*b*3, and Work Area 206B192*b*4. Total Emoney Data Storage Area 206B192*b*1 stores the total emoney data which represents the total amount (or balance) of emoney data stored in Device B. Here, the emoney data is the data stored in an electronic form which represents a certain value of money in U.S. dollars. Processing Emoney Data Storage Area 206B192*b*2 stores the processing emoney data which represents the amount of emoney data processed by implementing the present function, i.e., sent to device or received from another device. Log Data Storage Area 206B192*b*3 stores the log data which indicates the log of disposing the emoney stored in Device B (e.g., depositing to bank, transferring to another Communication Device 200, purchasing goods, paying for services, buying tickets, etc.). Work Area 206B192*b*4 is utilized as a work area to perform calculation and temporarily store data.

This Paragraph [0156] illustrates the software programs stored in Emoney Transferring Software Storage Area 206B192*c* (Paragraph [0154]). In the present embodiment, Emoney Transferring Software Storage Area 206B192*c* stores Emoney Data Sending/Receiving Software 206B192*c*2. Emoney Data Sending/Receiving Software 206B192*c*2 is the software program described in Paragraph(s) [0158] and [0161].

This Paragraph [0157] illustrate(s) Transferring Emoney Data Identifying Software H192*c*1 (Paragraph [0146]) of Host H (FIG. 2) and Transferring Emoney Data Identifying Software 206A192*c*1 (Paragraph [0151]) of Device A, which identify the amount of emoney to be transferred to Device B. In the present embodiment, CPU 211 (FIG. 1) of Device A displays the transferring emoney data identifying screen on LCD 201 (FIG. 1) of Device A (S1). Here, the transferring emoney data identifying screen is utilized to input the amount of emoney to be transferred from Device A to Device B. The user of Device A inputs by utilizing Input Device 210 (FIG. 1) or via voice recognition system the amount of emoney to be transferred to Device B (S2). CPU 211 (FIG. 1) of Device A sends the amount of emoney to be transferred to Device B to Host H (FIG. 2) in a wireless fashion (S3). Host H (FIG. 2) receives the amount of emoney to be transferred to Device B from Device A and stores the data as the processing emoney data in Processing Emoney Data Storage Area H192*b*2 (Paragraph [0145]) (S4).

This Paragraph [0158] illustrate(s) Emoney Data Sending/Receiving Software H192*c*2 (Paragraph [0146]) of Host H (FIG. 2), Emoney Data Sending/Receiving Software 206A192*c*2 (Paragraph [0151]) of Device A, and Emoney Data Sending/Receiving Software 206B192*c*2 (Paragraph [0156]) of Device B, which transfer the amount of emoney identified in the previous paragraph from Host H (FIG. 2) to Device B via Device A. In the present embodiment, Host H (FIG. 2) retrieves the processing emoney data from Processing Emoney Data Storage Area H192*b*2 (Paragraph [0145]) and sends the data to Device A in a wireless fashion (S1). CPU 211 (FIG. 1) of Device A receives the processing emoney data from Host H (FIG. 2) in a wireless fashion and sends the data to Device B in a wireless fashion (S2). CPU 211 (FIG. 1) of Device B receives the processing emoney data from Device A in a wireless fashion and stores the data in Processing Emoney Data Storage Area 206B192*b*2 (Paragraph [0155]) (S3). CPU 211 (FIG. 1) of Device B sends the processing emoney data receipt to Device A in a wireless fashion (S4). Here, the processing emoney data receipt indicates that Device B has duly received the processing emoney data from Device A. CPU 211 (FIG. 1) of Device A receives the processing emoney data receipt from Device B in a wireless fashion and sends the data to Host H (FIG. 2) in a wireless fashion (S5). Host H (FIG. 2) receives the processing emoney data receipt from Device A and updates the total emoney data stored in Total Emoney Data Storage Area H192*b*1 (Paragraph [0145]) by deleting the processing emoney data stored in Processing Emoney Data Storage Area H192*b*2 (Paragraph [0145]) therefrom (S6). Host H (FIG. 2) updates the log data stored in Log Data Storage Area H192*b*3 (Paragraph [0145]) (S7). Host H (FIG. 2) retrieves the total emoney data from Total Emoney Data Storage Area H192*b*1 (Paragraph [0145]) (S8). Host H (FIG. 2) retrieves the log data from Log Data Storage Area H192*b*3 (Paragraph [0145]) (S9). Host H (FIG. 2) sends the total emoney data and the log data retrieved in the previous two steps to Device A (S10). CPU 211 (FIG. 1) of Device A receives the total emoney data and the log data sent in the previous step from Host H (FIG. 2) in a wireless fashion and displays the data on LCD 201 (FIG. 1) of Device A (S11). CPU 211 (FIG. 1) of Device B updates the total emoney data stored in Total Emoney Data Storage Area 206B192*b*1 (Paragraph [0155]) by adding the processing emoney data stored in Processing Emoney Data Storage Area 206B192*b*2 (Paragraph [0155]) thereto (S12). CPU 211 (FIG. 1) of Device B updates the log data stored in Log Data Storage Area 206B192*b*3 (Paragraph [0155]) (S13). CPU 211 (FIG. 1) of Device B retrieves the total emoney data from Total Emoney Data Storage Area 206B192*b*1 (Paragraph [0155]) and displays the data on LCD 201 (FIG. 1) of Device B (S14). CPU 211 (FIG. 1) of Device B retrieves the log data from Log Data Storage Area 206B192*b*3 (Paragraph [0155]) and displays the data on LCD 201 (FIG. 1) of Device B (S15).

This Paragraph [0160] through [0161] illustrate another embodiment wherein Device A plays the major role in implementing the present function.

This Paragraph [0160] illustrate(s) Transferring Emoney Data Identifying Software 206A192*c*1 (Paragraph [0151]) of Device A, which identifies the amount of emoney to be transferred to Device B. In the present embodiment, CPU 211 (FIG. 1) of Device A displays the transferring emoney data identifying screen on LCD 201 (FIG. 1) of Device A (S1). Here, the transferring emoney data identifying screen is utilized to input the amount of emoney to be transferred from Device A to Device B. The user of Device A inputs by utilizing Input Device 210 (FIG. 1) or via voice recognition system the amount of emoney to be transferred to Device B (S2). CPU 211 (FIG. 1) of Device A stores the amount of emoney to be transferred to Device B as the processing emoney data in Processing Emoney Data Storage Area 206A192*b*2 (Paragraph [0150]) (S3).

This Paragraph [0161] illustrate(s) Emoney Data Sending/Receiving Software 206A192*c*2 (Paragraph [0151]) of Device A and Emoney Data Sending/Receiving Software 206B192*c*2 (Paragraph [0156]) of Device B, which transfer the amount of emoney identified in the previous paragraph from Device A to Device B. In the present embodiment, CPU 211 (FIG. 1) of Device A retrieves the processing emoney data from Processing Emoney Data Storage Area 206A192*b*2 (Paragraph [0150]) and sends the data to Device B in a wireless fashion (S1). CPU 211 (FIG. 1) of Device B receives the processing emoney data from Device A in a wireless fashion and stores the data in Processing Emoney Data Storage Area 206B192*b*2 (Paragraph [0155]) (S2). CPU 211 (FIG. 1) of Device B sends the processing emoney data receipt to Device A in a wireless fashion (S3). Here, the processing emoney data receipt indicates that Device B has duly received the processing emoney data from Device A. CPU 211 (FIG. 1) of Device A receives the processing emoney data receipt from Device B in a wireless fashion (S4). CPU 211 (FIG. 1) of Device A updates the total emoney data stored in Total Emoney Data Storage Area 206A192*b*1 (Paragraph [0150]) by deleting the processing emoney data stored in Processing Emoney Data Storage Area 206A192*b*2 (Paragraph [0150]) therefrom (S5). CPU 211 (FIG. 1) of Device A updates the log data stored in Log Data Storage Area 206A192*b*3 (Paragraph [0150]) (S6). CPU 211 (FIG. 1) of Device A retrieves the total emoney data from Total Emoney Data Storage Area 206A192*b*1 (Paragraph [0150]) and displays the data on LCD 201 (FIG. 1) of Device A (S7). CPU 211 (FIG. 1) of Device A retrieves the log data from Log Data Storage Area 206A192*b*3 (Paragraph [0150]) and displays the data on LCD 201 (FIG. 1) of Device A (S8). CPU 211 (FIG. 1) of Device B updates the total emoney data stored in Total Emoney Data Storage Area 206B192*b*1 (Paragraph [0155]) by adding the processing emoney data stored in Processing Emoney Data Storage Area 206B192*b*2 (Paragraph [0155]) thereto (S9). CPU 211 (FIG. 1) of Device B updates the log data stored in Log Data Storage Area 206B192*b*3 (Paragraph [0155]) (S10). CPU 211 (FIG. 1) of Device B retrieves the total emoney data from Total Emoney Data Storage Area 206B192*b*1 (Paragraph [0155]) and displays the data on LCD 201 (FIG. 1) of Device B (S11). CPU 211 (FIG. 1) of Device B retrieves the log data from Log Data Storage Area 206B192*b*3 (Paragraph [0155]) and displays the data on LCD 201 (FIG. 1) of Device B (S12).

<<Enhanced Caller ID Displaying Function>>

Paragraph(s) [0164] through [0189] illustrate the enhanced caller ID displaying function which displays the phone number data and the personal data of the caller upon receiving a phone call. The personal data may be retrieved from Communication Device 200 or Host H (FIG. 2). If the personal data of the caller is not found in Communication Device 200, the public data (disclosed in Yellow Pages and/or White Pages) stored in Host H (FIG. 2) may be displayed instead.

This Paragraph [0164] illustrates the storage area included in Host H (FIG. 2). In the present embodiment, Host H (FIG. 2) includes Enhanced Caller ID Displaying Information Storage Area H210*a* of which the data and the software program(s) stored therein are described in Paragraph(s) [0165].

This Paragraph [0165] illustrates the storage area(s) included in Enhanced Caller ID Displaying Information Storage Area H210*a* (Paragraph [0164]). In the present embodiment, Enhanced Caller ID Displaying Information Storage Area H210*a* includes Enhanced Caller ID Displaying Data Storage Area H210*b* and Enhanced Caller ID Displaying Software Storage Area H210*c*. Enhanced Caller ID Displaying Data Storage Area H210*b* stores the data necessary to implement the present function on the side of Host H (FIG. 2), such as the one(s) described in Paragraph(s) [0166]. Enhanced Caller ID Displaying Software Storage Area H210*c* stores the software program(s) necessary to implement the present function on the side of Host H (FIG. 2), such as the one(s) described in Paragraph(s) [0171].

This Paragraph [0166] illustrates the storage area(s) included in Enhanced Caller ID Displaying Data Storage Area H210*b* (Paragraph [0165]). In the present embodiment, Enhanced Caller ID Displaying Data Storage Area H210*b* includes Private Individual Phone Number Data Storage Area H210*b*1, Private Individual Personal Data Storage Area H210*b*2, Public Individual Phone Number Data Storage Area H210*b*3, Public Individual Personal Data Storage Area H210*b*4, and Work Area H210*b*5. Private Individual Phone Number Data Storage Area H210*b*1 stores the data described in Paragraph(s) [0167]. Private Individual Personal Data Storage Area H210*b*2 stores the data described in Paragraph(s) [0168]. Public Individual Phone Number Data Storage Area H210*b*3 stores the data described in Paragraph(s) [0169]. Public Individual Personal Data Storage Area H210*b*4 stores the data described in Paragraph(s) [0170]. Work Area H210*b*5 is utilized as a work area to perform calculation and temporarily store data.

This Paragraph [0167] illustrates the data stored in Private Individual Phone Number Data Storage Area H210*b*1 (Paragraph [0166]). In the present embodiment, Private Individual Phone Number Data Storage Area H210*b*1 comprises two columns, i.e., 'Private Individual Phone Number ID' and 'Phone Number Data'. Column 'Private Individual Phone Number ID' stores the private individual phone number IDs, and each private individual phone number ID is an identification of the corresponding phone number data stored in column 'Phone Number Data'. Column 'Phone Number Data' stores the phone number data, and each phone number data indicates the phone number of an individual. Each of the phone number data is the data authored and/or registered by the user of Communication Device 200. In the present embodiment, Private Individual Phone Number Data Storage Area H210*b*1 stores the following data: 'Private Individual Phone Number#1' and the corresponding 'Phone Number Data#1'; 'Private Individual Phone Number#2' and the corresponding 'Phone Number Data#2'; 'Private Individual Phone Number#3' and the corresponding 'Phone Number Data#3'; and 'Private Individual Phone Number#4' and the corresponding 'Phone Number Data#4'.

This Paragraph [0168] illustrates the data stored in Private Individual Personal Data Storage Area H210*b*2 (Paragraph [0166]). In the present embodiment, Private Individual Personal Data Storage Area H210*b*2 comprises two columns, i.e., 'Private Individual Phone Number ID' and 'Personal Data'. Column 'Private Individual Phone Number ID' stores the private individual phone number IDs, and each private individual phone number ID is an identification of the corresponding personal data stored in column 'Personal Data'. The private individual phone number IDs stored in the present storage area are identical to the ones described in the previous paragraph. Column 'Personal Data' stores the personal data, and each personal data includes the following data of an individual: the personal name data, the title data, the company name data, the office phone number data, the office fax number data, the email address data, the office street address data, the home address data, and/or the home phone number data. The personal name data indicates the personal name of the individual of the corresponding phone number data. The title data indicates the title at work of the individual of the corresponding phone number data. The company name data indicates the name of the company for which the individual of the corresponding phone number data works. The office phone number data indicates the office phone number of the individual of the corresponding phone number data. The office fax number data indicates the office fax number of the individual of the corresponding phone number data. The email address data indicates the email address of the individual of the corresponding phone number data. The office street address data indicates the office street address of the individual of the corresponding phone number data. The home address data indicates the home address of the individual of the corresponding phone number data. The home phone number data indicates the home phone number of the individual of the corresponding phone number data. In the present embodiment, Private Individual Personal Data Storage Area H210b2 stores the following data: 'Private Individual Phone Number#1' and the corresponding 'Personal Data#1'; 'Private Individual Phone Number#2' and the corresponding 'Personal Data#2'; 'Private Individual Phone Number#3' and the corresponding 'Personal Data#3'; and 'Private Individual Phone Number#4' and the corresponding 'Personal Data#4'. Each of the personal data is the data authored and/or registered by the user of Communication Device 200.

This Paragraph [0169] illustrates the data stored in Public Individual Phone Number Data Storage Area H210b3 (Paragraph [0166]). In the present embodiment, Public Individual Phone Number Data Storage Area H210b3 comprises two columns, i.e., 'Public Individual Phone Number ID' and 'Phone Number Data'. Column 'Public Individual Phone Number ID' stores the public individual phone number IDs, and each public individual phone number ID is an identification of the corresponding phone number data stored in column 'Phone Number Data'. Column 'Phone Number Data' stores the phone number data, and each phone number data indicates the phone number of an individual. Each of the phone number data is the data disclosed to the public by, for example, Yellow Pages and/or White Pages. In the present embodiment, Public Individual Phone Number Data Storage Area H210b3 stores the following data: 'Public Individual Phone Number#1' and the corresponding 'Phone Number Data#1'; 'Public Individual Phone Number#2' and the corresponding 'Phone Number Data#2'; 'Public Individual Phone Number#3' and the corresponding 'Phone Number Data#3'; 'Public Individual Phone Number#4' and the corresponding 'Phone Number Data#4'; 'Public Individual Phone Number#5' and the corresponding 'Phone Number Data#5'; 'Public Individual Phone Number#6' and the corresponding 'Phone Number Data#6'; 'Public Individual Phone Number#7' and the corresponding 'Phone Number Data#7'; 'Public Individual Phone Number#8' and the corresponding 'Phone Number Data#8'; 'Public Individual Phone Number#9' and the corresponding 'Phone Number Data#9'; and 'Public Individual Phone Number#10' and the corresponding 'Phone Number Data#10'.

This Paragraph [0170] illustrates the data stored in Public Individual Personal Data Storage Area H210b4 (Paragraph [0166]). In the present embodiment, Public Individual Personal Data Storage Area H210b4 comprises two columns, i.e., 'Public Individual Phone Number ID' and 'Personal Data'. Column 'Public Individual Phone Number ID' stores the public individual phone number IDs, and each public individual phone number ID is an identification of the corresponding personal data stored in column 'Personal Data'. The public individual phone number IDs stored in the present storage area are identical to the ones described in the previous paragraph. Column 'Personal Data' stores the personal data, and each personal data includes the following data of an individual: the personal name data, the home address data, and/or the home phone number data. The personal name data indicates the personal name of the individual of the corresponding phone number data. The home address data indicates the home address of the individual of the corresponding phone number data. The home phone number data indicates the home phone number of the individual of the corresponding phone number data. In the present embodiment, Public Individual Personal Data Storage Area H210b4 stores the following data: 'Public Individual Phone Number#1' and the corresponding 'Personal Data#1'; 'Public Individual Phone Number#2' and the corresponding 'Personal Data#2'; 'Public Individual Phone Number#3' and the corresponding 'Personal Data#3'; 'Public Individual Phone Number#4' and the corresponding 'Personal Data#4'; 'Public Individual Phone Number#5' and the corresponding 'Personal Data#5'; 'Public Individual Phone Number#6' and the corresponding 'Personal Data#6'; 'Public Individual Phone Number#7' and the corresponding 'Personal Data#7'; 'Public Individual Phone Number#8' and the corresponding 'Personal Data#8'; 'Public Individual Phone Number#9' and the corresponding 'Personal Data#9'; and 'Public Individual Phone Number#10' and the corresponding 'Personal Data#10'. Each of the personal data is the data disclosed to the public by, for example, Yellow Pages and/or White Pages.

This Paragraph [0171] illustrates the software program(s) stored in Enhanced Caller ID Displaying Software Storage Area H210c (Paragraph [0165]). In the present embodiment, Enhanced Caller ID Displaying Software Storage Area H210c stores Caller ID Displaying Software H210c1, Upgraded Caller ID Displaying Software H210c2, and Super Caller ID Displaying Software H210c3. Caller ID Displaying Software H210c1 is the software program described in Paragraph(s) [0181] and [0188]. Upgraded Caller ID Displaying Software H210c2 is the software program described in Paragraph(s) [0182], [0185], and [0189]. Super Caller ID Displaying Software H210c3 is the software program described in Paragraph(s) [0186].

This Paragraph [0172] illustrates the storage area included in RAM 206 (FIG. 1) of Communication Device 200. In the present embodiment, RAM 206 includes Enhanced Caller ID Displaying Information Storage Area 206210a of which the data and the software program(s) stored therein are described in Paragraph(s) [0174].

The data and/or the software program(s) necessary to implement the present function may be downloaded from Host H (FIG. 2) to Communication Device 200.

This Paragraph [0174] illustrates the storage area(s) included in Enhanced Caller ID Displaying Information Storage Area 206210a (Paragraph [0172]). In the present embodiment, Enhanced Caller ID Displaying Information Storage Area 206210a includes Enhanced Caller ID Displaying Data Storage Area 206210b and Enhanced Caller ID Displaying Software Storage Area 206210c. Enhanced Caller ID Displaying Data Storage Area 206210b stores the data necessary to implement the present function on the side of Communication Device 200, such as the one(s) described in Paragraph(s) [0175]. Enhanced Caller ID Displaying Software Storage Area 206210c stores the software program(s) necessary to implement the present function on the side of Communication Device 200, such as the one(s) described in Paragraph(s) [0180].

This Paragraph [0175] illustrates the storage area(s) included in Enhanced Caller ID Displaying Data Storage Area 206210b (Paragraph [0174]). In the present embodiment, Enhanced Caller ID Displaying Data Storage Area 206210b includes Private Individual Phone Number Data Storage Area 206210b1, Private Individual Personal Data Storage Area 206210b2, Public Individual Phone Number Data Storage Area 206210b3, Public Individual Personal Data Storage Area 206210b4, and Work Area 206210b5. Private Individual Phone Number Data Storage Area 206210b1 stores the data described in Paragraph(s) [0176]. Private Individual Personal Data Storage Area 206210b2 stores the data described in Paragraph(s) [0177]. Public Individual Phone Number Data Storage Area 206210b3 stores the data described in Paragraph(s) [0178] Public Individual Personal Data Storage Area 206210*b*4 stores the data described in Paragraph(s) [0179]. Work Area 206210*b*5 is utilized as a work area to perform calculation and temporarily store data.

This Paragraph [0176] illustrates the data stored in Private Individual Phone Number Data Storage Area 206210*b*1 (Paragraph [0175]). In the present embodiment, Private Individual Phone Number Data Storage Area 206210*b*1 comprises two columns, i.e., 'Private Individual Phone Number ID' and 'Phone Number Data'. Column 'Private Individual Phone Number ID' stores the private individual phone number IDs, and each private individual phone number ID is an identification of the corresponding phone number data stored in column 'Phone Number Data'. Column 'Phone Number Data' stores the phone number data, and each phone number data indicates the phone number of an individual. Each of the phone number data is the data authored and/or registered by the user of Communication Device 200. In the present embodiment, Private Individual Phone Number Data Storage Area 206210*b*1 stores the following data: 'Private Individual Phone Number#1' and the corresponding 'Phone Number Data#1'; 'Private Individual Phone Number#2' and the corresponding 'Phone Number Data#2'; 'Private Individual Phone Number#3' and the corresponding 'Phone Number Data#3'; and 'Private Individual Phone Number#4' and the corresponding 'Phone Number Data#4'.

This Paragraph [0177] illustrates the data stored in Private Individual Personal Data Storage Area 206210*b*2 (Paragraph [0175]). In the present embodiment, Private Individual Personal Data Storage Area 206210*b*2 comprises two columns, i.e., 'Private Individual Phone Number ID' and 'Personal Data'. Column 'Private Individual Phone Number ID' stores the private individual phone number IDs, and each private individual phone number ID is an identification of the corresponding personal data stored in column 'Personal Data'. The private individual phone number IDs stored in the present storage area are identical to the ones described in the previous paragraph. Column 'Personal Data' stores the personal data, and each personal data includes the following data of an individual: the personal name data, the title data, the company name data, the office phone number data, the office fax number data, the email address data, the office street address data, the home address data, and/or the home phone number data. The personal name data indicates the personal name of the individual of the corresponding phone number data. The title data indicates the title at work of the individual of the corresponding phone number data. The company name data indicates the name of the company for which the individual of the corresponding phone number data works. The office phone number data indicates the office phone number of the individual of the corresponding phone number data. The office fax number data indicates the office fax number of the individual of the corresponding phone number data. The email address data indicates the email address of the individual of the corresponding phone number data. The office street address data indicates the office street address of the individual of the corresponding phone number data. The home address data indicates the home address of the individual of the corresponding phone number data. The home phone number data indicates the home phone number of the individual of the corresponding phone number data. In the present embodiment, Private Individual Personal Data Storage Area 206210*b*2 stores the following data: 'Private Individual Phone Number#1' and the corresponding 'Personal Data#1'; 'Private Individual Phone Number#2' and the corresponding 'Personal Data#2'; 'Private Individual Phone Number#3' and the corresponding 'Personal Data#3'; and 'Private Individual Phone Number#4' and the corresponding 'Personal Data#4'.

Each of the personal data is the data authored and/or registered by the user of Communication Device 200.

This Paragraph [0178] illustrates the data stored in Public Individual Phone Number Data Storage Area 206210*b*3 (Paragraph [0175]). In the present embodiment, Public Individual Phone Number Data Storage Area 206210*b*3 comprises two columns, i.e., 'Public Individual Phone Number ID' and 'Phone Number Data'. Column 'Public Individual Phone Number ID' stores the public individual phone number IDs, and each public individual phone number ID is an identification of the corresponding phone number data stored in column 'Phone Number Data'. Column 'Phone Number Data' stores the phone number data, and each phone number data indicates the phone number of an individual. Each of the phone number data is the data disclosed to the public by, for example, Yellow Pages and/or White Pages. In the present embodiment, Public Individual Phone Number Data Storage Area 206210*b*3 stores the following data: 'Public Individual Phone Number#1' and the corresponding 'Phone Number Data#1'; 'Public Individual Phone Number#2' and the corresponding 'Phone Number Data#2'; 'Public Individual Phone Number#3' and the corresponding 'Phone Number Data#3'; 'Public Individual Phone Number#4' and the corresponding 'Phone Number Data#4'; 'Public Individual Phone Number#5' and the corresponding 'Phone Number Data#5'; 'Public Individual Phone Number#6' and the corresponding 'Phone Number Data#6'; 'Public Individual Phone Number#7' and the corresponding 'Phone Number Data#7'; 'Public Individual Phone Number#8' and the corresponding 'Phone Number Data#8'; 'Public Individual Phone Number#9' and the corresponding 'Phone Number Data#9'; and 'Public Individual Phone Number#10' and the corresponding 'Phone Number Data#10'.

This Paragraph [0179] illustrates the data stored in Public Individual Personal Data Storage Area 206210*b*4 (Paragraph [0175]). In the present embodiment, Public Individual Personal Data Storage Area 206210*b*4 comprises two columns, i.e., 'Public Individual Phone Number ID' and 'Personal Data'. Column 'Public Individual Phone Number ID' stores the public individual phone number IDs, and each public individual phone number ID is an identification of the corresponding personal data stored in column 'Personal Data'. The public individual phone number IDs stored in the present storage area are identical to the ones described in the previous paragraph. Column 'Personal Data' stores the personal data, and each personal data includes the following data of an individual: the personal name data, the home address data, and/or the home phone number data. The personal name data indicates the personal name of the individual of the corresponding phone number data. The home address data indicates the home address of the individual of the corresponding phone number data. The home phone number data indicates the home phone number of the individual of the corresponding phone number data. In the present embodiment, Public Individual Personal Data Storage Area 206210*b*4 stores the following data: 'Public Individual Phone Number#1' and the corresponding 'Personal Data#1'; 'Public Individual Phone Number#2' and the corresponding 'Personal Data#2'; 'Public Individual Phone Number#3' and the corresponding 'Personal Data#3'; 'Public Individual Phone Number#4' and the corresponding 'Personal Data#4'; 'Public Individual Phone Number#5' and the corresponding 'Personal Data#5'; 'Public Individual Phone Number#6' and the corresponding 'Personal Data#6'; 'Public Individual Phone Number#7' and the corresponding 'Personal Data#7'; 'Public Individual Phone Number#8' and the corresponding 'Personal Data#8'; 'Public Individual Phone Number#9' and the corresponding 'Personal Data#9'; and 'Public Individual Phone Number#10' and the corresponding 'Personal Data#10'. Each of the personal data is the data disclosed to the public by, for example, Yellow Pages and/or White Pages.

This Paragraph [0180] illustrates the software program(s) stored in Enhanced Caller ID Displaying Software Storage Area 206210c (Paragraph [0174]). In the present embodiment, Enhanced Caller ID Displaying Software Storage Area 206210c stores Caller ID Displaying Software 206210c1, Upgraded Caller ID Displaying Software 206210c2, and Super Caller ID Displaying Software 206210c3. Caller ID Displaying Software 206210c1 is the software program described in Paragraph(s) [0181], [0184], and [0188]. Upgraded Caller ID Displaying Software 206210c2 is the software program described in Paragraph(s) [0182], [0185], and [0189]. Super Caller ID Displaying Software 206210c3 is the software program described in Paragraph(s) [0186].

This Paragraph [0181] illustrate(s) Caller ID Displaying Software H210c1 (Paragraph [0171]) of Host H (FIG. 2) and Caller ID Displaying Software 206210c1 (Paragraph [0180]) of Communication Device 200, which display the personal data of the caller by retrieving the foregoing data from Host H (FIG. 2) which is authored and/or registered by the user of Communication Device 200. In the present embodiment, CPU 211 (FIG. 1) periodically checks the incoming signal (S1). If the incoming signal detected in the previous step is a phone call, CPU 211 (FIG. 1) proceeds to the next step (S2). CPU 211 (FIG. 1) identifies the phone number data (e.g., Phone Number Data#1) of the phone call detected in the previous step (S3). CPU 211 (FIG. 1) sends the phone number data (e.g., Phone Number Data#1) identified in the previous step to Host H (FIG. 2) in a wireless fashion (S4). Host H (FIG. 2) receives the phone number data (e.g., Phone Number Data#1) from Communication Device 200 (S5). If the phone number data (e.g., Phone Number Data#1) received in the previous step is found in Private Individual Phone Number Data Storage Area H210b1 (Paragraph [0167]), Host H (FIG. 2) proceeds to the next step (S6). Host H (FIG. 2) retrieves the personal data (e.g., Personal Data#1) corresponding to the phone number data (e.g., Phone Number Data#1) found in the previous step from Private Individual Personal Data Storage Area H210b2 (Paragraph [0168]) (S7). Host H (FIG. 2) sends the personal data (e.g., Personal Data#1) retrieved in the previous step to Communication Device 200 (S8). CPU 211 (FIG. 1) receives the personal data (e.g., Personal Data#1) from Host H (FIG. 2) in a wireless fashion (S9). CPU 211 (FIG. 1) displays the phone number data (e.g., Phone Number Data#1) identified in S3 and the personal data (e.g., Personal Data#1) retrieved in the previous step on LCD 201 (FIG. 1) (S10).

This Paragraph [0182] illustrate(s) Upgraded Caller ID Displaying Software H210c2 (Paragraph [0171]) of Host H (FIG. 2) and Upgraded Caller ID Displaying Software 206210c2 (Paragraph [0180]) of Communication Device 200, which display the personal data of the caller by retrieving the foregoing data from Host H (FIG. 2) which is authored and/or registered by the user of Communication Device 200. If the corresponding personal data is not found, the public data of the caller stored in Host H (FIG. 2) is displayed on LCD 201 (FIG. 1). In the present embodiment, CPU 211 (FIG. 1) periodically checks the incoming signal (S1). If the incoming signal detected in the previous step is a phone call, CPU 211 (FIG. 1) proceeds to the next step (S2). CPU 211 (FIG. 1) identifies the phone number data (e.g., Phone Number Data#1) of the phone call detected in the previous step (S3). CPU 211 (FIG. 1) sends the phone number data (e.g., Phone Number Data#1) identified in the previous step to Host H (FIG. 2) in a wireless fashion (S4). Host H (FIG. 2) receives the phone number data (e.g., Phone Number Data#1) from Communication Device 200 (S5). If the phone number data (e.g., Phone Number Data#1) received in the previous step is found in Private Individual Phone Number Data Storage Area H210b1 (Paragraph [0167]), Host H (FIG. 2) proceeds to the next step (S6). Host H (FIG. 2) retrieves the personal data (e.g., Personal Data#1) corresponding to the phone number data (e.g., Phone Number Data#1) found in the previous step from Private Individual Personal Data Storage Area H210b2 (Paragraph [0168]) (S7). Host H (FIG. 2) sends the personal data (e.g., Personal Data#1) retrieved in the previous step to Communication Device 200 (S8). CPU 211 (FIG. 1) receives the personal data (e.g., Personal Data#1) from Host H (FIG. 2) in a wireless fashion (S9). CPU 211 (FIG. 1) displays the phone number data (e.g., Phone Number Data#1) identified in S3 and the personal data (e.g., Personal Data#1) retrieved in the previous step on LCD 201 (FIG. 1) (S10). If the phone number data (e.g., Phone Number Data#5) received in S5 is not found in Private Individual Phone Number Data Storage Area H210b1 (Paragraph [0167]), Host H (FIG. 2) proceeds to the next step (S11). If the phone number data (e.g., Phone Number Data#5) not found in the previous step is found in Public Individual Phone Number Data Storage Area H210b3 (Paragraph [0169]), Host H (FIG. 2) proceeds to the next step (S12). Host H (FIG. 2) retrieves the personal data (e.g., Personal Data#5) corresponding to the phone number data (e.g., Phone Number Data#5) received in S5 from Public Individual Personal Data Storage Area H210b4 (Paragraph [0170]) (S13). Host H (FIG. 2) sends the personal data (e.g., Personal Data#5) retrieved in the previous step to Communication Device 200 (S14). CPU 211 (FIG. 1) receives the personal data (e.g., Personal Data#5) from Host H (FIG. 2) in a wireless fashion (S15). CPU 211 (FIG. 1) displays the phone number data (e.g., Phone Number Data#5) identified in S3 and the personal data (e.g., Personal Data#5) received in the previous step on LCD 201 (FIG. 1) (S16).

Paragraph(s) [0184] through [0189] illustrate another embodiment wherein Communication Device 200 plays the major role in implementing the present function.

This Paragraph [0184] illustrate(s) Caller ID Displaying Software 206210c1 (Paragraph [0180]) of Communication Device 200, which displays the personal data of the caller by retrieving the foregoing data from Communication Device 200 which is authored and/or registered by the user of Communication Device 200. In the present embodiment, CPU 211 (FIG. 1) periodically checks the incoming signal (S1). If the incoming signal detected in the previous step is a phone call, CPU 211 (FIG. 1) proceeds to the next step (S2). CPU 211 (FIG. 1) identifies the phone number data (e.g., Phone Number Data#1) of the phone call detected in the previous step (S3). If the phone number data (e.g., Phone Number Data#1) identified in the previous step is found in Private Individual Phone Number Data Storage Area 206210b1 (Paragraph [0176]), CPU 211 (FIG. 1) proceeds to the next step (S4). CPU 211 (FIG. 1) retrieves the personal data (e.g., Personal Data#1) corresponding to the phone number data (e.g., Phone Number Data#1) identified in S3 from Private Individual Personal Data Storage Area 206210b2 (Paragraph [0177]) (S5). CPU 211 (FIG. 1) displays the phone number data (e.g., Phone Number Data#1) identified in S3 and the personal data (e.g., Personal Data#1) retrieved in the previous step on LCD 201 (FIG. 1) (S6).

This Paragraph [0185] illustrate(s) Upgraded Caller ID Displaying Software H210c2 (Paragraph [0171]) of Host H (FIG. 2) and Upgraded Caller ID Displaying Software 206210c2 (Paragraph [0180]) of Communication Device

200, which display the personal data of the caller by retrieving the foregoing data from Communication Device 200 which is authored and/or registered by the user of Communication Device 200. If the corresponding personal data is not found, the public data of the caller stored in Host H (FIG. 2) is displayed on LCD 201 (FIG. 1). In the present embodiment, CPU 211 (FIG. 1) periodically checks the incoming signal (S1). If the incoming signal detected in the previous step is a phone call, CPU 211 (FIG. 1) proceeds to the next step (S2). CPU 211 (FIG. 1) identifies the phone number data (e.g., Phone Number Data#5) of the phone call detected in the previous step (S3). If the phone number data (e.g., Phone Number Data#5) identified in the previous step is found in Private Individual Phone Number Data Storage Area 206210*b*1 (Paragraph [0176]), CPU 211 (FIG. 1) proceeds to the next step (S4). CPU 211 (FIG. 1) retrieves the personal data (e.g., Personal Data#5) corresponding to the phone number data (e.g., Phone Number Data#5) identified in S3 from Private Individual Personal Data Storage Area 206210*b*2 (Paragraph [0177]) (S5). CPU 211 (FIG. 1) displays the phone number data (e.g., Phone Number Data#1) identified in S3 and the personal data (e.g., Personal Data#5) retrieved in the previous step on LCD 201 (FIG. 1) (S6). If the phone number data (e.g., Phone Number Data#5) identified in S3 is not found in Private Individual Phone Number Data Storage Area 206210*b*1 (Paragraph [0176]), CPU 211 (FIG. 1) proceeds to the next step (S7). CPU 211 (FIG. 1) sends the phone number data inquiry to Host H (FIG. 2) in a wireless fashion (S8). Here, the phone number data inquiry is the inquiry whether the phone number data identified in S3 is stored in Host H (FIG. 2). Host H (FIG. 2) receives the phone number data inquiry from Communication Device 200 (S9). If the phone number data (e.g., Phone Number Data#5) received in the previous step is found in Public Individual Phone Number Data Storage Area H210*b*3 (Paragraph [0169]), Host H (FIG. 2) proceeds to the next step (S10). Host H (FIG. 2) retrieves the personal data (e.g., Personal Data#5) corresponding to the phone number data (e.g., Phone Number Data#5) identified in S3 from Public Individual Personal Data Storage Area H210*b*4 (Paragraph [0170]) (S11). Host H (FIG. 2) sends the personal data (e.g., Personal Data#5) retrieved in the previous step to Communication Device 200 (S12). CPU 211 (FIG. 1) receives the personal data (e.g., Personal Data#5) from Host H (FIG. 2) in a wireless fashion (S13). CPU 211 (FIG. 1) displays the phone number data (e.g., Phone Number Data#5) identified in S3 and the personal data (e.g., Personal Data#5) received in the previous step on LCD 201 (FIG. 1) (S14).

This Paragraph [0186] illustrate(s) Super Caller ID Displaying Software H210*c*3 (Paragraph [0171]) of Host H (FIG. 2) and Super Caller ID Displaying Software 206210*c*3 (Paragraph [0180]) of Communication Device 200, which display the personal data of the caller by retrieving the foregoing data from Communication Device 200. If the corresponding personal data is not found in Communication Device 200, the database stored in Communication Device 200 is enhanced by retrieving the database from Host H (FIG. 2). In the present embodiment, CPU 211 (FIG. 1) periodically checks the incoming signal (S1). If the incoming signal detected in the previous step is a phone call, CPU 211 (FIG. 1) proceeds to the next step (S2). CPU 211 (FIG. 1) identifies the phone number data (e.g., Phone Number Data#5) of the phone call detected in the previous step (S3). If the phone number data (e.g., Phone Number Data#5) identified in the previous step is found in Private Individual Phone Number Data Storage Area 206210*b*1 (Paragraph [0176]), CPU 211 (FIG. 1) proceeds to the next step (S4). CPU 211 (FIG. 1) retrieves the personal data (e.g., Personal Data#5) corresponding to the phone number data (e.g., Phone Number Data#5) identified in S3 from Private Individual Personal Data Storage Area 206210*b*2 (Paragraph [0177]) (S5). CPU 211 (FIG. 1) displays the phone number data (e.g., Phone Number Data#1) identified in S3 and the personal data (e.g., Personal Data#5) retrieved in the previous step on LCD 201 (FIG. 1) (S6). If the phone number data (e.g., Phone Number Data#5) identified in S3 is not found in Private Individual Phone Number Data Storage Area 206210*b*1 (Paragraph [0176]), CPU 211 (FIG. 1) proceeds to the next step (S7). CPU 211 (FIG. 1) sends the public data sending request to Host H (FIG. 2) in a wireless fashion (S8). Here, the public data sending request is the request to send all phone number data and personal data stored in Host H (FIG. 2) to Communication Device 200. Host H (FIG. 2) receives the public data sending request from Communication Device 200 (S9). Host H (FIG. 2) retrieves all phone number data (e.g., Phone Number Data#1 through #10) from Public Individual Phone Number Data Storage Area H210*b*3 (Paragraph [0169]) (S10). Host H (FIG. 2) retrieves all personal data (e.g., Personal Data#1 through #10) from Public Individual Personal Data Storage Area H210*b*4 (Paragraph [0170]) (S11). Host H (FIG. 2) sends the data retrieved in the previous two steps to Communication Device 200 (S12). CPU 211 (FIG. 1) receives the data sent in the previous step from Host H (FIG. 2) in a wireless fashion (S13). CPU 211 (FIG. 1) stores the phone number data (e.g., Phone Number Data#1 through #10) in Public Individual Phone Number Data Storage Area 206210*b*3 (Paragraph [0178]) (S14). CPU 211 (FIG. 1) stores the personal data (e.g., Personal Data#1 through #10) in Public Individual Personal Data Storage Area 206210*b*4 (Paragraph [0179]) (S15). If the phone number data (e.g., Phone Number Data#5) not found in S7 is found in Public Individual Phone Number Data Storage Area 206210*b*3 (Paragraph [0178]), CPU 211 (FIG. 1) proceeds to the next step (S16). CPU 211 (FIG. 1) retrieves the personal data (e.g., Personal Data#5) corresponding to the phone number data (e.g., Phone Number Data#5) identified in S3 from Public Individual Personal Data Storage Area 206210*b*4 (Paragraph [0179]) (S17). CPU 211 (FIG. 1) displays the phone number data (e.g., Phone Number Data#5) identified in S3 and the personal data (e.g., Personal Data#5) retrieved in the previous step on LCD 201 (FIG. 1) (S18).

Paragraph(s) [0188] and [0189] illustrate another embodiment wherein Host H (FIG. 2) detects the phone call.

This Paragraph [0188] illustrate(s) Caller ID Displaying Software H210*c*1 (Paragraph [0171]) of Host H (FIG. 2) and Caller ID Displaying Software 206210*c*1 (Paragraph [0180]) of Communication Device 200, which display the personal data of the caller by retrieving the foregoing data from Host H (FIG. 2) which is authored and/or registered by the user of Communication Device 200. In the present embodiment, Host H (FIG. 2) periodically checks the incoming signal (S1). If the incoming signal detected in the previous step is a phone call, Host H (FIG. 2) proceeds to the next step (S2). Host H (FIG. 2) identifies the phone number data (e.g., Phone Number Data#1) of the phone call detected in the previous step (S3). If the phone number data (e.g., Phone Number Data#1) identified in the previous step is found in Private Individual Phone Number Data Storage Area H210*b*1 (Paragraph [0167]), Host H (FIG. 2) proceeds to the next step (S4). Host H (FIG. 2) retrieves the personal data (e.g., Personal Data#1) corresponding to the phone number data (e.g., Phone Number Data#1) found in the previous step from Private Individual Personal Data Storage Area H210*b*2 (Paragraph [0168]) (S5). Host H (FIG. 2) sends the phone number data (e.g., Phone Number Data#1) identified in S3 and the personal data (e.g., Personal Data#1) retrieved in the previous step to Communication Device 200 (S6). CPU 211 (FIG. 1) receives the phone number data (e.g., Phone Number Data#1) and the personal data (e.g., Personal Data#1) from Host H (FIG. 2) in a wireless fashion (S7). CPU 211 (FIG. 1) displays the phone number data (e.g., Phone Number Data#1) and the personal data (e.g., Personal Data#1) received in the previous step on LCD 201 (FIG. 1) (S8).

This Paragraph [0189] illustrate(s) Upgraded Caller ID Displaying Software H210c2 (Paragraph [0171]) of Host H (FIG. 2) and Upgraded Caller ID Displaying Software 206210c2 (Paragraph [0180]) of Communication Device 200, which display the personal data of the caller by retrieving the foregoing data from Host H (FIG. 2) which is authored and/or registered by the user of Communication Device 200. If the corresponding personal data is not found, the public data of the caller stored in Host H (FIG. 2) is displayed on LCD 201 (FIG. 1). In the present embodiment, Host H (FIG. 2) periodically checks the incoming signal (S1). If the incoming signal detected in the previous step is a phone call, Host H (FIG. 2) proceeds to the next step (S2). Host H (FIG. 2) identifies the phone number data (e.g., Phone Number Data#1) of the phone call detected in the previous step (S3). If the phone number data (e.g., Phone Number Data#1) identified in the previous step is found in Private Individual Phone Number Data Storage Area H210b1 (Paragraph [0167]), Host H (FIG. 2) proceeds to the next step (S4). Host H (FIG. 2) retrieves the personal data (e.g., Personal Data#1) corresponding to the phone number data (e.g., Phone Number Data#1) found in the previous step from Private Individual Personal Data Storage Area H210b2 (Paragraph [0168]) (S5). Host H (FIG. 2) sends the phone number data (e.g., Phone Number Data#1) identified in S3 and the personal data (e.g., Personal Data#1) retrieved in the previous step to Communication Device 200 (S6). CPU 211 (FIG. 1) receives the phone number data (e.g., Phone Number Data#1) and the personal data (e.g., Personal Data#1) from Host H (FIG. 2) in a wireless fashion (S7). CPU 211 (FIG. 1) displays the phone number data (e.g., Phone Number Data#1) and the personal data (e.g., Personal Data#1) received in the previous step on LCD 201 (FIG. 1) (S8). If the phone number data (e.g., Phone Number Data#5) identified in S3 is not found in Private Individual Phone Number Data Storage Area H210b1 (Paragraph [0167]), Host H (FIG. 2) proceeds to the next step (S9). If the phone number data (e.g., Phone Number Data#5) not found in the previous step is found in Public Individual Phone Number Data Storage Area H210b3 (Paragraph [0169]), Host H (FIG. 2) proceeds to the next step (S10). Host H (FIG. 2) retrieves the personal data (e.g., Personal Data#5) corresponding to the phone number data (e.g., Phone Number Data#5) identified in S3 from Public Individual Personal Data Storage Area H210b4 (Paragraph [0170]) (S11). Host H (FIG. 2) sends the phone number data (e.g., Phone Number Data#5) identified in S3 and the personal data (e.g., Personal Data#5) retrieved in the previous step to Communication Device 200 (S12). CPU 211 (FIG. 1) receives the phone number data (e.g., Phone Number Data#5) and the personal data (e.g., Personal Data#5) from Host H (FIG. 2) in a wireless fashion (S13). CPU 211 (FIG. 1) displays the phone number data (e.g., Phone Number Data#5) and the personal data (e.g., Personal Data#5) received in the previous step on LCD 201 (FIG. 1) (S14).

<<TV Phone Pausing Function>>

Paragraph(s) [0192] through [0210] illustrate the TV phone pausing function. The present function is capable to be implemented while the TV phone function is implemented. Assuming that the user of Device A, a Communication Device 200, is conversing with the user of Device B, another Communication Device 200. When the user of Device A inputs the TV phone pausing command, the pausing audiovisual data selected by the user of Device A is output from Device B until the user of Device A cancels the TV phone pausing command.

This Paragraph [0192] illustrates the storage area included in RAM 206 (FIG. 1) of Device A. In the present embodiment, RAM 206 includes TV Phone Pausing Information Storage Area 206A242a of which the data and the software program(s) stored therein are described in Paragraph(s) [0194].

The data and/or the software program(s) necessary to implement the present function may be downloaded from Host H (FIG. 2) to Device A.

This Paragraph [0194] illustrates the storage area(s) included in TV Phone Pausing Information Storage Area 206A242a (Paragraph [0195]). In the present embodiment, TV Phone Pausing Information Storage Area 206A242a includes TV Phone Pausing Data Storage Area 206A242b and TV Phone Pausing Software Storage Area 206A242c. TV Phone Pausing Data Storage Area 206A242b stores the data necessary to implement the present function on the side of Device A, such as the one(s) described in Paragraph(s) [0195]. TV Phone Pausing Software Storage Area 206A242c stores the software program(s) necessary to implement the present function on the side of Device A, such as the one(s) described in Paragraph(s) [0197].

This Paragraph [0195] illustrates the storage area(s) included in TV Phone Pausing Data Storage Area 206A242b (Paragraph [0194]). In the present embodiment, TV Phone Pausing Data Storage Area 206A242b includes Device A's TV Phone Data Storage Area 206A242b1, Device B's TV Phone Data Storage Area 206A242b2, Pausing Audiovisual Data Storage Area 206A242b3, Pausing Audiovisual Selected Data Storage Area 206A242b4, and Work Area 206A242b5. Device A's TV Phone Data Storage Area 206A242b1 stores the Device A's TV phone data which is the audiovisual data of the user of Device A. Device B's TV Phone Data Storage Area 206A242b2 stores the Device B's TV phone data which is the audiovisual data of the user of Device B. Pausing Audiovisual Data Storage Area 206A242b3 stores the data described in Paragraph(s) [0196]. Pausing Audiovisual Selected Data Storage Area 206A242b4 stores the pausing audiovisual selected data which is one of the pausing audiovisual data selected by the user of Device A. The pausing audiovisual selected data is the pausing audiovisual data output from Device B when the TV phone function is paused. Work Area 206A242b5 is utilized as a work area to perform calculation and temporarily store data.

This Paragraph [0196] illustrates the data stored in Pausing Audiovisual Data Storage Area 206A242b3 (Paragraph [0195]). In the present embodiment, Pausing Audiovisual Data Storage Area 206A242b3 comprises two columns, i.e., 'Pausing Audiovisual ID' and 'Pausing Audiovisual Data'. Column 'Pausing Audiovisual ID' stores the pausing audiovisual IDs, and each pausing audiovisual ID is an identification of the corresponding pausing audiovisual data stored in column 'Pausing Audiovisual Data'. Column 'Pausing Audiovisual Data' stores the pausing audiovisual data, and each pausing audiovisual data is the audiovisual data output when the TV phone is paused. Each pausing audiovisual data may be a motion picture with audio data attached thereto or a still image. In the present embodiment, Pausing Audiovisual Data Storage Area 206A242b3 stores the following data: 'Pausing Audiovisual#1' and the corresponding 'Pausing Audiovisual Data#1'; 'Pausing Audiovisual#2' and the corresponding 'Pausing Audiovisual Data#2'; 'Pausing Audiovisual#3' and the corresponding 'Pausing Audiovisual Data#3'; and 'Pausing Audiovisual#4' and the corresponding 'Pausing Audiovisual Data#4'.

This Paragraph [0197] illustrates the software program(s) stored in TV Phone Pausing Software Storage Area 206A242c (Paragraph [0194]). In the present embodiment, TV Phone Pausing Software Storage Area 206A242c stores Pausing Audiovisual Data Producing Software 206A242c1, Pausing Audiovisual Data Selecting Software 206A242c2, TV Phone Implementing Software 206A242c3, and TV Phone Pausing Software 206A242c4. Pausing Audiovisual Data Producing Software 206A242c1 is the software program described in Paragraph(s) [0204]. Pausing Audiovisual Data Selecting Software 206A242c2 is the software program described in Paragraph(s) [0206]. TV Phone Implementing Software 206A242c3 is the software program described in Paragraph(s) [0208]. TV Phone Pausing Software 206A242c4 is the software program described in Paragraph(s) [0209] and [0210].

This Paragraph [0198] illustrates the storage area included in RAM 206 (FIG. 1) of Device B. In the present embodiment, RAM 206 includes TV Phone Pausing Information Storage Area 206B242a of which the data and the software program(s) stored therein are described in Paragraph(s) [0200].

The data and/or the software program(s) necessary to implement the present function may be downloaded from Host H (FIG. 2) to Device B.

This Paragraph [0200] illustrates the storage area(s) included in TV Phone Pausing Information Storage Area 206B242a (Paragraph [0198]). In the present embodiment, TV Phone Pausing Information Storage Area 206B242a includes TV Phone Pausing Data Storage Area 206B242b and TV Phone Pausing Software Storage Area 206B242c. TV Phone Pausing Data Storage Area 206B242b stores the data necessary to implement the present function on the side of Device B, such as the one(s) described in Paragraph(s) [0201]. TV Phone Pausing Software Storage Area 206B242c stores the software program(s) necessary to implement the present function on the side of Device B, such as the one(s) described in Paragraph(s) [0203].

This Paragraph [0201] illustrates the storage area(s) included in TV Phone Pausing Data Storage Area 206B242b (Paragraph [0200]). In the present embodiment, TV Phone Pausing Data Storage Area 206B242b includes Device A's TV Phone Data Storage Area 206B242b1, Device B's TV Phone Data Storage Area 206B242b2, Pausing Audiovisual Data Storage Area 206B242b3, Pausing Audiovisual Selected Data Storage Area 206B242b4, and Work Area 206B242b5. Device A's TV Phone Data Storage Area 206B242b1 stores the Device A's TV phone data which is the audiovisual data of the user of Device A. Device B's TV Phone Data Storage Area 206B242b2 stores the Device B's TV phone data which is the audiovisual data of the user of Device B. Pausing Audiovisual Data Storage Area 206B242b3 stores the data described in Paragraph(s) [0202]. Pausing Audiovisual Selected Data Storage Area 206B242b4 stores the pausing audiovisual selected data which is one of the pausing audiovisual data selected by the user of Device B. The pausing audiovisual selected data is the pausing audiovisual data output from Device A when the TV phone function is paused. Work Area 206B242b5 is utilized as a work area to perform calculation and temporarily store data.

This Paragraph [0202] illustrates the data stored in Pausing Audiovisual Data Storage Area 206B242b3 (Paragraph [0201]). In the present embodiment, Pausing Audiovisual Data Storage Area 206B242b3 comprises two columns, i.e., 'Pausing Audiovisual ID' and 'Pausing Audiovisual Data'. Column 'Pausing Audiovisual ID' stores the pausing audiovisual IDs, and each pausing audiovisual ID is an identification of the corresponding pausing audiovisual data stored in column 'Pausing Audiovisual Data'. Column 'Pausing Audiovisual Data' stores the pausing audiovisual data, and each pausing audiovisual data is the audiovisual data output when the TV phone is paused. Each pausing audiovisual data may be a motion picture with audio data attached thereto or a still image. In the present embodiment, Pausing Audiovisual Data Storage Area 206B242b3 stores the following data: 'Pausing Audiovisual#5' and the corresponding 'Pausing Audiovisual Data#5'; 'Pausing Audiovisual#6' and the corresponding 'Pausing Audiovisual Data#6'; 'Pausing Audiovisual#7' and the corresponding 'Pausing Audiovisual Data#7'; and 'Pausing Audiovisual#8' and the corresponding 'Pausing Audiovisual Data#8'.

This Paragraph [0203] illustrates the software program(s) stored in TV Phone Pausing Software Storage Area 206B242c (Paragraph [0200]). In the present embodiment, TV Phone Pausing Software Storage Area 206B242c stores Pausing Audiovisual Data Producing Software 206B242c1, Pausing Audiovisual Data Selecting Software 206B242c2, TV Phone Implementing Software 206B242c3, and TV Phone Pausing Software 206B242c4. Pausing Audiovisual Data Producing Software 206B242c1 is the software program described in Paragraph(s) [0205]. Pausing Audiovisual Data Selecting Software 206B242c2 is the software program described in Paragraph(s) [0207]. TV Phone Implementing Software 206B242c3 is the software program described in Paragraph(s) [0208]. TV Phone Pausing Software 206B242c4 is the software program described in Paragraph(s) [0209] and [0210].

This Paragraph [0204] illustrate(s) Pausing Audiovisual Data Producing Software 206A242c1 (Paragraph [0197]) of Device A, which produces the pausing audiovisual data of Device A. In the present embodiment, CPU 211 (FIG. 1) of Device A retrieves the audio data from Microphone 215 (FIG. 1) of Device A (S1). CPU 211 (FIG. 1) of Device A retrieves the visual data from CCD Unit 214 (FIG. 1) of Device A (S2). CPU 211 (FIG. 1) of Device A produces the audiovisual data from the data retrieved in the previous two steps and stores the data as the pausing audiovisual data (e.g., Pausing Audiovisual Data#1) in Pausing Audiovisual Data Storage Area 206A242b3 (Paragraph [0196]) (S3).

This Paragraph [0205] illustrate(s) Pausing Audiovisual Data Producing Software 206B242c1 (Paragraph [0203]) of Device B, which produces the pausing audiovisual data of Device B. In the present embodiment, CPU 211 (FIG. 1) of Device B retrieves the audio data from Microphone 215 (FIG. 1) of Device B (S1). CPU 211 (FIG. 1) of Device B retrieves the visual data from CCD Unit 214 (FIG. 1) of Device B (S2). CPU 211 (FIG. 1) of Device B produces the audiovisual data from the data retrieved in the previous two steps and stores the data as the pausing audiovisual data (e.g., Pausing Audiovisual Data#5) in Pausing Audiovisual Data Storage Area 206B242b3 (Paragraph [0202]) (S3).

This Paragraph [0206] illustrate(s) Pausing Audiovisual Data Selecting Software 206A242c2 (Paragraph [0197]) of Device A, which selects the pausing audiovisual data to be utilized as the pausing audiovisual selected data of Device A. In the present embodiment, CPU 211 (FIG. 1) of Device A retrieves all pausing audiovisual data (e.g., Pausing Audiovisual Data#1 through #4) from Pausing Audiovisual Data Storage Area 206A242b3 (Paragraph [0196]) (S1). CPU 211 (FIG. 1) of Device A produces the pausing audiovisual thumbnail data of each pausing audiovisual data (e.g., Pausing Audiovisual Data#1 through #4) retrieved in the previous step and displays each pausing audiovisual thumbnail data on LCD 201 (FIG. 1) (S2). Here, the pausing audiovisual thumbnail data is the thumbnail of the corresponding pausing audiovisual data. Each pausing audiovisual thumbnail data may be a motion picture with audio data attached thereto or a still image. The user of Device A selects, by utilizing Input Device 210 (FIG. 1) or via voice recognition system, a pausing audiovisual thumbnail data (S3). CPU 211 (FIG. 1) of Device A stores the pausing audiovisual data (e.g., Pausing Audiovisual Data#1) corresponding to the pausing audiovisual thumbnail data selected in the previous step as the pausing audiovisual selected data in Pausing Audiovisual Selected Data Storage Area 206A242b4 (Paragraph [0195]) (S4).

This Paragraph [0207] illustrate(s) Pausing Audiovisual Data Selecting Software 206B242c2 (Paragraph [0203]) of Device B, which selects the pausing audiovisual data to be utilized as the pausing audiovisual selected data of Device B. In the present embodiment, CPU 211 (FIG. 1) of Device B retrieves all pausing audiovisual data (e.g., Pausing Audiovisual Data#1 through #4) from Pausing Audiovisual Data Storage Area 206B242b3 (Paragraph [0202]) (S1). CPU 211 (FIG. 1) of Device B produces the pausing audiovisual thumbnail data of each pausing audiovisual data (e.g., Pausing Audiovisual Data#1 through #4) retrieved in the previous step and displays each pausing audiovisual thumbnail data on LCD 201 (FIG. 1) (S2). Here, the pausing audiovisual thumbnail data is the thumbnail of the corresponding pausing audiovisual data. Each pausing audiovisual thumbnail data may be a motion picture with audio data attached thereto or a still image. The user of Device B selects, by utilizing Input Device 210 (FIG. 1) or via voice recognition system, a pausing audiovisual thumbnail data (S3). CPU 211 (FIG. 1) of Device B stores the pausing audiovisual data (e.g., Pausing Audiovisual Data#5) corresponding to the pausing audiovisual thumbnail data selected in the previous step as the pausing audiovisual selected data in Pausing Audiovisual Selected Data Storage Area 206B242b4 (Paragraph [0201]) (S4).

This Paragraph [0208] illustrate(s) TV Phone Implementing Software 206A242c3 (Paragraph [0197]) of Device A and TV Phone Implementing Software 206B242c3 (Paragraph [0203]) of Device B, which implement the TV phone function. In the present embodiment, CPU 211 (FIG. 1) of Device A retrieves the audio data from Microphone 215 (FIG. 1) of Device A (S1). CPU 211 (FIG. 1) of Device A retrieves the visual data from CCD Unit 214 (FIG. 1) of Device A (S2). CPU 211 (FIG. 1) of Device A produces the device A's TV phone data from the data retrieved in the previous two steps and stores the data in Device A's TV Phone Data Storage Area 206A242b1 (Paragraph [0195]) (S3). CPU 211 (FIG. 1) of Device A retrieves the device A's TV phone data from Device A's TV Phone Data Storage Area 206A242b1 (Paragraph [0195]) and sends the data to Device B in a wireless fashion (S4). CPU 211 (FIG. 1) of Device B receives the device A's TV phone data from Device A in a wireless fashion and stores the data in Device A's TV Phone Data Storage Area 206B242b1 (Paragraph [0201]) (S5). CPU 211 (FIG. 1) of Device B retrieves the device A's TV phone data from Device A's TV Phone Data Storage Area 206B242b1 (Paragraph [0201]) and outputs the data from Speaker 216 (FIG. 1) and LCD 201 (FIG. 1) of Device B (S6). CPU 211 (FIG. 1) of Device B retrieves the audio data from Microphone 215 (FIG. 1) of Device B (S7). CPU 211 (FIG. 1) of Device B retrieves the visual data from CCD Unit 214 (FIG. 1) of Device B (S8). CPU 211 (FIG. 1) of Device B produces the device B's TV phone data from the data retrieved in the previous two steps and stores the data in Device B's TV Phone Data Storage Area 206B242b2 (Paragraph [0201]) (S9). CPU 211 (FIG. 1) of Device B retrieves the device B's TV phone data from Device B's TV Phone Data Storage Area 206B242b2 (Paragraph [0201]) and sends the data to Device A in a wireless fashion (S10). CPU 211 (FIG. 1) of Device A receives the device B's TV phone data from Device B in a wireless fashion and stores the data in Device B's TV Phone Data Storage Area 206A242b2 (Paragraph [0195]) (S11). CPU 211 (FIG. 1) of Device A retrieves the device B's TV phone data from Device B's TV Phone Data Storage Area 206A242b2 (Paragraph [0195]) and outputs the data from Speaker 216 (FIG. 1) and LCD 201 (FIG. 1) of Device A (S12). The foregoing sequence is repeated periodically.

This Paragraph [0209] illustrate(s) TV Phone Pausing Software 206A242c4 (Paragraph [0197]) of Device A and TV Phone Pausing Software 206B242c4 (Paragraph [0203]) of Device B, which pause the TV phone function. The present sequence is repeated until the TV phone resuming command is input, wherein the TV phone resuming command is the command to resume the TV phone function. Once the TV phone resuming command is input, the sequence described in Paragraph(s) [0208] is resumed. In the present embodiment, the user of Device A inputs, by utilizing Input Device 210 (FIG. 1) or via voice recognition system, the TV phone pausing command (S1). Here, the TV phone pausing command is the command to pause the TV phone function. CPU 211 (FIG. 1) of Device A retrieves the pausing audiovisual selected data from Pausing Audiovisual Selected Data Storage Area 206A242b4 (Paragraph [0195]) and sends the data to Device B in a wireless fashion (S2). CPU 211 (FIG. 1) of Device B receives the pausing audiovisual selected data from Device A in a wireless fashion and outputs the data from Speaker 216 (FIG. 1) and LCD 201 (FIG. 1) of Device B (S3). CPU 211 (FIG. 1) of Device B retrieves the audio data from Microphone 215 (FIG. 1) of Device B (S4). CPU 211 (FIG. 1) of Device B retrieves the visual data from CCD Unit 214 (FIG. 1) of Device B (S5). CPU 211 (FIG. 1) of Device B produces the device B's TV phone data from the data retrieved in the previous two steps and stores the data in Device B's TV Phone Data Storage Area 206B242b2 (Paragraph [0201]) (S6). CPU 211 (FIG. 1) of Device B retrieves the device B's TV phone data from Device B's TV Phone Data Storage Area 206B242b2 (Paragraph [0201]) and sends the data to Device A in a wireless fashion (S7). CPU 211 (FIG. 1) of Device A receives the device B's TV phone data from Device B in a wireless fashion and stores the data in Device B's TV Phone Data Storage Area 206A242b2 (Paragraph [0195]) (S8). CPU 211 (FIG. 1) of Device A retrieves the device B's TV phone data from Device B's TV Phone Data Storage Area 206A242b2 (Paragraph [0195]) and outputs the data from Speaker 216 (FIG. 1) and LCD 201 (FIG. 1) of Device A (S9). The sequence of S2 through S9 is repeated (S10). The sequence described in Paragraph(s) [0208] is resumed when the user of Device A inputs, by utilizing Input Device 210 (FIG. 1) or via voice recognition system, the TV phone resuming command.

This Paragraph [0210] illustrate(s) TV Phone Pausing Software 206A242c4 (Paragraph [0197]) of Device A and TV Phone Pausing Software 206B242c4 (Paragraph [0203]) of Device B, which pause the TV phone function. The present sequence is repeated until the TV phone resuming command is input, wherein the TV phone resuming command is the command to resume the TV phone function. Once the TV phone resuming command is input, the sequence described in Paragraph(s) [0208] is resumed. In the present embodiment, the user of Device A inputs, by utilizing Input Device 210 (FIG. 1) or via voice recognition system, the TV phone pausing command (S1). Here, the TV phone pausing command is the command to pause the TV phone function. CPU 211 (FIG. 1) of Device A retrieves the pausing audiovisual selected data from Pausing Audiovisual Selected Data Storage Area 206A242b4 (Paragraph [0195]) and sends the data to Device B in a wireless fashion (S2). CPU 211 (FIG. 1) of Device B receives the pausing audiovisual selected data from Device A in a wireless fashion and outputs the data from Speaker 216 (FIG. 1) and LCD 201 (FIG. 1) of Device B (S3). CPU 211 (FIG. 1) of Device A outputs the pausing audiovisual selected data retrieved in S2 from Speaker 216 (FIG. 1) and LCD 201 (FIG. 1) of Device A (S4). The sequence of S2 through S4 is repeated (S5). The sequence described in Paragraph(s) [0208] is resumed when the user of Device A inputs, by utilizing Input Device 210 (FIG. 1) or via voice recognition system, the TV phone resuming command.

<<Video-in-Video Displaying Function>>

Paragraph(s) [0213] through [0241] illustrate the video-in-video displaying function, wherein a main video display area is displayed on the display, a sub video display area is displayed in the main video display area, a first visual data is displayed in the main video display area, and a second visual data is displayed in the sub video display area, when implementing the present function.

This Paragraph [0213] illustrates the display areas displayed on LCD 201 (FIG. 1). In the present embodiment, Main Video Display Area MVDA248 and Sub Video Display Area SVDA248 are displayed on LCD 201 (FIG. 1) when implementing the present function. Main Video Display Area MVDA248 is the display area in which a visual data is displayed. Sub Video Display Area SVDA248 is also the display area in which a visual data is displayed. Sub Video Display Area SVDA248 is displayed in Main Video Display Area MVDA248.

This Paragraph [0214] illustrates the storage area included in Host H (FIG. 2). In the present embodiment, Host H (FIG. 2) includes Video-In-Video Displaying Information Storage Area H248a of which the data and the software program(s) stored therein are described in Paragraph(s) [0215].

This Paragraph [0215] illustrates the storage area(s) included in Video-In-Video Displaying Information Storage Area H248a (Paragraph [0214]). In the present embodiment, Video-In-Video Displaying Information Storage Area H248a includes Video-In-Video Displaying Data Storage Area H248b and Video-In-Video Displaying Software Storage Area H248c. Video-In-Video Displaying Data Storage Area H248b stores the data necessary to implement the present function on the side of Host H (FIG. 2), such as the one(s) described in Paragraph(s) [0216]. Video-In-Video Displaying Software Storage Area H248c stores the software program(s) necessary to implement the present function on the side of Host H (FIG. 2), such as the one(s) described in Paragraph(s) [0218].

This Paragraph [0216] illustrates the storage area(s) included in Video-In-Video Displaying Data Storage Area H248b (Paragraph [0215]). In the present embodiment, Video-In-Video Displaying Data Storage Area H248b includes Main Video Display Area Location Data Storage Area H248b1, Sub Video Display Area Location Data Storage Area H248b2, Visual Data Storage Area H248b3, and Work Area H248b4. Main Video Display Area Location Data Storage Area H248b1 stores the main video display area location data which indicates the location on LCD 201 (FIG. 1) at which Main Video Display Area MVDA248 (Paragraph [0213]) is displayed. Sub Video Display Area Location Data Storage Area H248b2 stores the sub video display area location data which indicates the location on LCD 201 (FIG. 1) at which Sub Video Display Area SVDA248 (Paragraph [0213]) is displayed. Visual Data Storage Area H248b3 stores the data described in Paragraph(s) [0217]. Work Area H248b4 is utilized as a work area to perform calculation and temporarily store data.

This Paragraph [0217] illustrates the data stored in Visual Data Storage Area H248b3 (Paragraph [0216]). In the present embodiment, Visual Data Storage Area H248b3 comprises two columns, i.e., 'Visual ID' and 'Visual Data'. Column 'Visual ID' stores the visual IDs, and each visual ID is an identification of the corresponding visual data stored in column 'Visual Data'. Each visual ID may indicate the name or title of the corresponding visual data. Column 'Visual Data' stores the visual data, and each visual data is the visual data which is capable to be replayed by Communication Device 200 (e.g., TV program, movie clip, etc.). In the present embodiment, Visual Data Storage Area H248b3 stores the following data: 'Visual#1' and the corresponding 'Visual Data#1'; 'Visual#2' and the corresponding 'Visual Data#2'; 'Visual#3' and the corresponding 'Visual Data#3'; and 'Visual#4' and the corresponding 'Visual Data#4'.

This Paragraph [0218] illustrates the software program(s) stored in Video-In-Video Displaying Software Storage Area H248c (Paragraph [0215]). In the present embodiment, Video-In-Video Displaying Software Storage Area H248c stores Main Video Display Area Displaying Software H248c1, Sub Video Display Area Displaying Software H248c2, Main Visual Data Displaying Software H248c3, Sub Visual Data Displaying Software H248c4, Main Video Display Area Location Data Changing Software H248c5, Sub Video Display Area Location Data Changing Software H248c6, Main Visual Data Changing Software H248c7, and Sub Visual Data Changing Software H248c8. Main Video Display Area Displaying Software H248c1 is the software program described in Paragraph(s) [0225]. Sub Video Display Area Displaying Software H248c2 is the software program described in Paragraph(s) [0226]. Main Visual Data Displaying Software H248c3 is the software program described in Paragraph(s) [0227]. Sub Visual Data Displaying Software H248c4 is the software program described in Paragraph(s) [0228]. Main Video Display Area Location Data Changing Software H248c5 is the software program described in Paragraph(s) [0229]. Sub Video Display Area Location Data Changing Software H248c6 is the software program described in Paragraph(s) [0230]. Main Visual Data Changing Software H248c7 is the software program described in Paragraph(s) [0231] Sub Visual Data Changing Software H248c8 is the software program described in Paragraph(s) [0232].

This Paragraph [0219] illustrates the storage area included in RAM 206 (FIG. 1) of Communication Device 200. In the present embodiment, RAM 206 includes Video-In-Video Displaying Information Storage Area 206248a of which the data and the software program(s) stored therein are described in Paragraph(s) [0221].

The data and/or the software program(s) necessary to implement the present function may be downloaded from Host H (FIG. 2) to Communication Device 200.

This Paragraph [0221] illustrates the storage area(s) included in Video-In-Video Displaying Information Storage Area 206248a (Paragraph [0219]). In the present embodiment, Video-In-Video Displaying Information Storage Area 206248a includes Video-In-Video Displaying Data Storage Area 206248b and Video-In-Video Displaying Software Storage Area 206248c. Video-In-Video Displaying Data Storage Area 206248b stores the data necessary to implement the present function on the side of Communication Device 200, such as the one(s) described in Paragraph(s) [0222]. Video- In-Video Displaying Software Storage Area 206248*c* stores the software program(s) necessary to implement the present function on the side of Communication Device 200, such as the one(s) described in Paragraph(s) [0224].

This Paragraph [0222] illustrates the storage area(s) included in Video-In-Video Displaying Data Storage Area 206248*b* (Paragraph [0221]). In the present embodiment, Video-In-Video Displaying Data Storage Area 206248*b* includes Main Video Display Area Location Data Storage Area 206248*b*1, Sub Video Display Area Location Data Storage Area 206248*b*2, Visual Data Storage Area 206248*b*3, and Work Area 206248*b*4. Main Video Display Area Location Data Storage Area 206248*b*1 stores the main video display area location data which indicates the location on LCD 201 (FIG. 1) at which Main Video Display Area MVDA248 (Paragraph [0213]) is displayed. Sub Video Display Area Location Data Storage Area 206248*b*2 stores the sub video display area location data which indicates the location on LCD 201 (FIG. 1) at which Sub Video Display Area SVDA248 (Paragraph [0213]) is displayed. Visual Data Storage Area 206248*b*3 stores the data described in Paragraph(s) [0223]. Work Area 206248*b*4 is utilized as a work area to perform calculation and temporarily store data.

This Paragraph [0223] illustrates the data stored in Visual Data Storage Area 206248*b*3 (Paragraph [0222]). In the present embodiment, Visual Data Storage Area 206248*b*3 comprises two columns, i.e., 'Visual ID' and 'Visual Data'. Column 'Visual ID' stores the visual IDs, and each visual ID is an identification of the corresponding visual data stored in column 'Visual Data'. Each visual ID may indicate the name or title of the corresponding visual data. Column 'Visual Data' stores the visual data, and each visual data is the visual data which is capable to be replayed by Communication Device 200 (e.g., TV program, movie clip, etc.). In the present embodiment, Visual Data Storage Area 206248*b*3 stores the following data: 'Visual#1' and the corresponding 'Visual Data#1'; 'Visual#2' and the corresponding 'Visual Data#2'; 'Visual#3' and the corresponding 'Visual Data#3'; and 'Visual#4' and the corresponding 'Visual Data#4'.

This Paragraph [0224] illustrates the software program(s) stored in Video-In-Video Displaying Software Storage Area 206248*c* (Paragraph [0221]). In the present embodiment, Video-In-Video Displaying Software Storage Area 206248*c* stores Main Video Display Area Displaying Software 206248*c*1, Sub Video Display Area Displaying Software 206248*c*2, Main Visual Data Displaying Software 206248*c*3, Sub Visual Data Displaying Software 206248*c*4, Main Video Display Area Location Data Changing Software 206248*c*5, Sub Video Display Area Location Data Changing Software 206248*c*6, Main Visual Data Changing Software 206248*c*7, and Sub Visual Data Changing Software 206248*c*8. Main Video Display Area Displaying Software 206248*c*1 is the software program described in Paragraph(s) [0225] and [0234]. Sub Video Display Area Displaying Software 206248*c*2 is the software program described in Paragraph(s) [0226] and [0235]. Main Visual Data Displaying Software 206248*c*3 is the software program described in Paragraph(s) [0227] and [0236]. Sub Visual Data Displaying Software 206248*c*4 is the software program described in Paragraph(s) [0228] and [0237]. Main Video Display Area Location Data Changing Software 206248*c*5 is the software program described in Paragraph(s) [0229] and [0238]. Sub Video Display Area Location Data Changing Software 206248*c*6 is the software program described in Paragraph(s) [0230] and [0239]. Main Visual Data Changing Software 206248*c*7 is the software program described in Paragraph(s) [0231] and [0240]. Sub Visual Data Changing Software 206248*c*8 is the software program described in Paragraph(s) [0232] and [0241].

This Paragraph [0225] illustrate(s) Main Video Display Area Displaying Software H248*c*1 (Paragraph [0218]) of Host H (FIG. 2) and Main Video Display Area Displaying Software 206248*c*1 (Paragraph [0224]) of Communication Device 200, which display Main Video Display Area MVDA248 (Paragraph [0213]) on LCD 201 (FIG. 1). In the present embodiment, the user of Communication Device 200 inputs, by utilizing Input Device 210 (FIG. 1) or via voice recognition system, the main video display area displaying command (S1). Here, the main video display area displaying command is the command to display Main Video Display Area MVDA248 (Paragraph [0213]) on LCD 201 (FIG. 1). CPU 211 (FIG. 1) sends the main video display area displaying command to Host H (FIG. 2) in a wireless fashion (S2). Host H (FIG. 2) receives the main video display area displaying command from Communication Device 200 (S3). Host H (FIG. 2) retrieves the main video display area location data from Main Video Display Area Location Data Storage Area H248*b*1 (Paragraph [0216]) and sends the data to Communication Device 200 (S4). CPU 211 (FIG. 1) receives the main video display area location data from Host H (FIG. 2) in a wireless fashion and displays Main Video Display Area MVDA248 (Paragraph [0213]) on LCD 201 (FIG. 1) at the location identified by the main video display area location data (S5).

This Paragraph [0226] illustrate(s) Sub Video Display Area Displaying Software H248*c*2 (Paragraph [0218]) of Host H (FIG. 2) and Sub Video Display Area Displaying Software 206248*c*2 (Paragraph [0224]) of Communication Device 200, which display Sub Video Display Area SVDA248 (Paragraph [0213]) on LCD 201 (FIG. 1). In the present embodiment, the user of Communication Device 200 inputs, by utilizing Input Device 210 (FIG. 1) or via voice recognition system, the sub video display area displaying command (S1). Here, the sub video display area displaying command is the command to display Sub Video Display Area SVDA248 (Paragraph [0213]) in Main Video Display Area MVDA248 (Paragraph [0213]). CPU 211 (FIG. 1) sends the sub video display area displaying command to Host H (FIG. 2) in a wireless fashion (S2). Host H (FIG. 2) receives the sub video display area displaying command from Communication Device 200 (S3). Host H (FIG. 2) retrieves the sub video display area location data from Sub Video Display Area Location Data Storage Area H248*b*2 (Paragraph [0216]) and sends the data to Communication Device 200 (S4). CPU 211 (FIG. 1) receives the sub video display area location data from Host H (FIG. 2) in a wireless fashion and displays Sub Video Display Area SVDA248 (Paragraph [0213]) on LCD 201 (FIG. 1) at the location identified by the sub video display area location data (S5).

This Paragraph [0227] illustrate(s) Main Visual Data Displaying Software H248*c*3 (Paragraph [0218]) of Host H (FIG. 2) and Main Visual Data Displaying Software 206248*c*3 (Paragraph [0224]) of Communication Device 200, which display visual data in Main Video Display Area MVDA248 (Paragraph [0213]). In the present embodiment, Host H (FIG. 2) retrieves all visual IDs (e.g., Visual#1 through #4) from Visual Data Storage Area H248*b*3 (Paragraph [0217]) and sends the data to Communication Device 200 (S1). CPU 211 (FIG. 1) receives the visual IDs (e.g., Visual#1 through #4) from Host H (FIG. 2) in a wireless fashion and displays the data on LCD 201 (FIG. 1) (S2). The user selects, by utilizing Input Device 210 (FIG. 1) or via voice recognition system, a visual ID (e.g., Visual#1) (S3). CPU 211 (FIG. 1) sends the visual ID (e.g., Visual#1) selected in the previous step to Host H (FIG. 2) in a wireless fashion (S4). Host H (FIG. 2) receives the visual ID (e.g., Visual#1) from Communication Device 200 (S5). Host H (FIG. 2) retrieves the corresponding visual data (e.g., Visual Data#1) from Visual Data Storage Area H248b3 (Paragraph [0217]) and sends the data to Communication Device 200 (S6). CPU 211 (FIG. 1) receives the visual data (e.g., Visual Data#1) from Host H (FIG. 2) in a wireless fashion and displays the data in Main Video Display Area MVDA248 (Paragraph [0213]) (S7). The sequence of the previous two steps is repeated (S8).

This Paragraph [0228] illustrate(s) Sub Visual Data Displaying Software H248c4 (Paragraph [0218]) of Host H (FIG. 2) and Sub Visual Data Displaying Software 206248c4 (Paragraph [0224]) of Communication Device 200, which display visual data in Sub Video Display Area SVDA248 (Paragraph [0213]). In the present embodiment, Host H (FIG. 2) retrieves all visual IDs (e.g., Visual#1 through #4) from Visual Data Storage Area H248b3 (Paragraph [0217]) and sends the data to Communication Device 200 (S1). CPU 211 (FIG. 1) receives the visual IDs (e.g., Visual#1 through #4) from Host H (FIG. 2) in a wireless fashion and displays the data on LCD 201 (FIG. 1) (S2). The user selects, by utilizing Input Device 210 (FIG. 1) or via voice recognition system, a visual ID (e.g., Visual#2) (S3). CPU 211 (FIG. 1) sends the visual ID (e.g., Visual#2) selected in the previous step to Host H (FIG. 2) in a wireless fashion (S4). Host H (FIG. 2) receives the visual ID (e.g., Visual#2) from Communication Device 200 (S5). Host H (FIG. 2) retrieves the corresponding visual data (e.g., Visual Data#2) from Visual Data Storage Area H248b3 (Paragraph [0217]) and sends the data to Communication Device 200 (S6). CPU 211 (FIG. 1) receives the visual data (e.g., Visual Data#2) from Host H (FIG. 2) in a wireless fashion and displays the data in Sub Video Display Area SVDA248 (Paragraph [0213]) (S7). The sequence of the previous two steps is repeated (S8).

This Paragraph [0229] illustrate(s) Main Video Display Area Location Data Changing Software H248c5 (Paragraph [0218]) of Host H (FIG. 2) and Main Video Display Area Location Data Changing Software 206248c5 (Paragraph [0224]) of Communication Device 200, which change the location of Main Video Display Area MVDA248 (Paragraph [0213]). In the present embodiment, the user selects, by utilizing Input Device 210 (FIG. 1) or via voice recognition system, Main Video Display Area MVDA248 (Paragraph [0213]) (S1). The user of Communication Device 200 inputs, by utilizing Input Device 210 (FIG. 1) or via voice recognition system, the main video display area location data changing command (S2). Here, the main video display area location data changing command is the command to change the main video display area location data. The main video display area location data changing command may be input by way of selecting Main Video Display Area MVDA248 (Paragraph [0213]) and dragging it to a new location. CPU 211 (FIG. 1) identifies the new location of Main Video Display Area MVDA248 (Paragraph [0213]) (S3). CPU 211 (FIG. 1) produces the main video display area location data by referring to the new location identified in the previous step and sends the data to Host H (FIG. 2) in a wireless fashion (S4). Host H (FIG. 2) receives the main video display area location data from Communication Device 200 and stores the data in Main Video Display Area Location Data Storage Area H248b1 (Paragraph [0216]) (S5).

This Paragraph [0230] illustrate(s) Sub Video Display Area Location Data Changing Software H248c6 (Paragraph [0218]) of Host H (FIG. 2) and Sub Video Display Area Location Data Changing Software 206248c6 (Paragraph [0224]) of Communication Device 200, which change the location of Sub Video Display Area SVDA248 (Paragraph [0213]). In the present embodiment, the user selects, by utilizing Input Device 210 (FIG. 1) or via voice recognition system, Sub Video Display Area SVDA248 (Paragraph [0213]) (S1). The user of Communication Device 200 inputs, by utilizing Input Device 210 (FIG. 1) or via voice recognition system, the sub video display area location data changing command (S2). Here, the sub video display area location data changing command is the command to change the sub video display area location data. The sub video display area location data changing command may be input by way of selecting Sub Video Display Area SVDA248 (Paragraph [0213]) and dragging it to a new location. CPU 211 (FIG. 1) identifies the new location of Sub Video Display Area SVDA248 (Paragraph [0213]) (S3). CPU 211 (FIG. 1) produces the sub video display area location data by referring to the new location identified in the previous step and sends the data to Host H (FIG. 2) in a wireless fashion (S4). Host H (FIG. 2) receives the sub video display area location data from Communication Device 200 and stores the data in Sub Video Display Area Location Data Storage Area H248b2 (Paragraph [0216]) (S5).

This Paragraph [0231] illustrate(s) Main Visual Data Changing Software H248c7 (Paragraph [0218]) of Host H (FIG. 2) and Main Visual Data Changing Software 206248c7 (Paragraph [0224]) of Communication Device 200, which change the visual data displayed in Main Video Display Area MVDA248 (Paragraph [0213]) to another one. In the present embodiment, Host H (FIG. 2) retrieves all visual IDs (e.g., Visual#1 through #4) from Visual Data Storage Area H248b3 (Paragraph [0217]) and sends the data to Communication Device 200 (S1). CPU 211 (FIG. 1) receives the visual IDs (e.g., Visual#1 through #4) from Host H (FIG. 2) in a wireless fashion and displays the data on LCD 201 (FIG. 1) (S2). The user selects, by utilizing Input Device 210 (FIG. 1) or via voice recognition system, a visual ID (e.g., Visual#3) (S3). CPU 211 (FIG. 1) sends the visual ID (e.g., Visual#3) selected in the previous step to Host H (FIG. 2) in a wireless fashion (S4). Host H (FIG. 2) receives the visual ID (e.g., Visual#3) from Communication Device 200 (S5). Host H (FIG. 2) retrieves the corresponding visual data (e.g., Visual Data#3) from Visual Data Storage Area H248b3 (Paragraph [0217]) and sends the data to Communication Device 200 (S6). CPU 211 (FIG. 1) receives the visual data (e.g., Visual Data#3) from Host H (FIG. 2) in a wireless fashion and displays the data in Main Video Display Area MVDA248 (Paragraph [0213]) instead of the visual data (e.g., Visual Data#1) previously displayed (S7). CPU 211 (FIG. 1) repeats S6 and the S7 (S8).

This Paragraph [0232] illustrate(s) Sub Visual Data Changing Software H248c8 (Paragraph [0218]) of Host H (FIG. 2) and Sub Visual Data Changing Software 206248c8 (Paragraph [0224]) of Communication Device 200, which change the visual data displayed in Sub Video Display Area SVDA248 (Paragraph [0213]) to another one. In the present embodiment, Host H (FIG. 2) retrieves all visual IDs (e.g., Visual#1 through #4) from Visual Data Storage Area H248b3 (Paragraph [0217]) and sends the data to Communication Device 200 (S1). CPU 211 (FIG. 1) receives the visual IDs (e.g., Visual#1 through #4) from Host H (FIG. 2) in a wireless fashion and displays the data on LCD 201 (FIG. 1) (S2). The user selects, by utilizing Input Device 210 (FIG. 1) or via voice recognition system, a visual ID (e.g., Visual#4) (S3). CPU 211 (FIG. 1) sends the visual ID (e.g., Visual#4) selected in the previous step to Host H (FIG. 2) in a wireless fashion (S4). Host H (FIG. 2) receives the visual ID (e.g., Visual#4) from Communication Device 200 (S5). Host H (FIG. 2)

retrieves the corresponding visual data (e.g., Visual Data#4) from Visual Data Storage Area H248*b*3 (Paragraph [0217]) and sends the data to Communication Device 200 (S6). CPU 211 (FIG. 1) receives the visual data (e.g., Visual Data#4) from Host H (FIG. 2) in a wireless fashion and displays the data in Sub Video Display Area SVDA248 (Paragraph [0213]) instead of the visual data (e.g., Visual Data#2) previously displayed (S7). CPU 211 (FIG. 1) repeats S6 and the S7 (S8).

This Paragraph [0234] through [0241] illustrate another embodiment wherein Communication Device 200 plays the major role in implementing the present function.

This Paragraph [0234] illustrate(s) Main Video Display Area Displaying Software 206248*c*1 (Paragraph [0224]) of Communication Device 200, which displays Main Video Display Area MVDA248 (Paragraph [0213]) on LCD 201 (FIG. 1). In the present embodiment, the user of Communication Device 200 inputs, by utilizing Input Device 210 (FIG. 1) or via voice recognition system, the main video display area displaying command (S1). Here, the main video display area displaying command is the command to display Main Video Display Area MVDA248 (Paragraph [0213]) on LCD 201 (FIG. 1). CPU 211 (FIG. 1) retrieves the main video display area location data from Main Video Display Area Location Data Storage Area 206248*b*1 (Paragraph [0222]) (S2). CPU 211 (FIG. 1) displays Main Video Display Area MVDA248 (Paragraph [0213]) on LCD 201 (FIG. 1) at the location identified by the main video display area location data retrieved in S2 (S3).

This Paragraph [0235] illustrate(s) Sub Video Display Area Displaying Software 206248*c*2 (Paragraph [0224]) of Communication Device 200, which displays Sub Video Display Area SVDA248 (Paragraph [0213]) on LCD 201 (FIG. 1). In the present embodiment, the user of Communication Device 200 inputs, by utilizing Input Device 210 (FIG. 1) or via voice recognition system, the sub video display area displaying command (S1). Here, the sub video display area displaying command is the command to display Sub Video Display Area SVDA248 (Paragraph [0213]) in Main Video Display Area MVDA248 (Paragraph [0213]). CPU 211 (FIG. 1) retrieves the sub video display area location data from Sub Video Display Area Location Data Storage Area 206248*b*2 (Paragraph [0222]) (S2). CPU 211 (FIG. 1) displays Sub Video Display Area SVDA248 (Paragraph [0213]) on LCD 201 (FIG. 1) at the location identified by the sub video display area location data retrieved in S2 (S3).

This Paragraph [0236] illustrate(s) Main Visual Data Displaying Software 206248*c*3 (Paragraph [0224]) of Communication Device 200, which displays visual data in Main Video Display Area MVDA248 (Paragraph [0213]). In the present embodiment, CPU 211 (FIG. 1) retrieves all visual IDs (e.g., Visual#1 through #4) from Visual Data Storage Area 206248*b*3 (Paragraph [0223]) (S1). CPU 211 (FIG. 1) displays the visual IDs (e.g., Visual#1 through #4) retrieved in the previous step on LCD 201 (FIG. 1) (S2). The user selects, by utilizing Input Device 210 (FIG. 1) or via voice recognition system, a visual ID (e.g., Visual#1) (S3). CPU 211 (FIG. 1) retrieves the corresponding visual data (e.g., Visual Data#1) from Visual Data Storage Area 206248*b*3 (Paragraph [0223]) (S4). CPU 211 (FIG. 1) displays the visual data (e.g., Visual Data#1) retrieved in the previous step in Main Video Display Area MVDA248 (Paragraph [0213]) (S5). The sequence of S4 and S5 is repeated (S6).

This Paragraph [0237] illustrate(s) Sub Visual Data Displaying Software 206248*c*4 (Paragraph [0224]) of Communication Device 200, which displays visual data in Sub Video Display Area SVDA248 (Paragraph [0213]). In the present embodiment, CPU 211 (FIG. 1) retrieves all visual IDs (e.g., Visual#1 through #4) from Visual Data Storage Area 206248*b*3 (Paragraph [0223]) (S1). CPU 211 (FIG. 1) displays the visual IDs (e.g., Visual#1 through #4) retrieved in the previous step on LCD 201 (FIG. 1) (S2). The user selects, by utilizing Input Device 210 (FIG. 1) or via voice recognition system, a visual ID (e.g., Visual#2) (S3). CPU 211 (FIG. 1) retrieves the corresponding visual data (e.g., Visual Data#2) from Visual Data Storage Area 206248*b*3 (Paragraph [0223]) (S4). CPU 211 (FIG. 1) displays the visual data (e.g., Visual Data#2) retrieved in the previous step in Sub Video Display Area SVDA248 (Paragraph [0213]) (S5). The sequence of S4 and S5 is repeated (S6).

This Paragraph [0238] illustrate(s) Main Video Display Area Location Data Changing Software 206248*c*5 (Paragraph [0224]) of Communication Device 200, which changes the location of Main Video Display Area MVDA248 (Paragraph [0213]). In the present embodiment, the user selects, by utilizing Input Device 210 (FIG. 1) or via voice recognition system, Main Video Display Area MVDA248 (Paragraph [0213]) (S1). The user of Communication Device 200 inputs, by utilizing Input Device 210 (FIG. 1) or via voice recognition system, the main video display area location data changing command (S2). Here, the main video display area location data changing command is the command to change the main video display area location data. The main video display area location data changing command may be input by way of selecting Main Video Display Area MVDA248 (Paragraph [0213]) and dragging it to a new location. CPU 211 (FIG. 1) identifies the new location of Main Video Display Area MVDA248 (Paragraph [0213]) (S3). CPU 211 (FIG. 1) produces the main video display area location data by referring to the new location identified in the previous step and stores the data in Main Video Display Area Location Data Storage Area 206248*b*1 (Paragraph [0222]) (S4).

This Paragraph [0239] illustrate(s) Sub Video Display Area Location Data Changing Software 206248*c*6 (Paragraph [0224]) of Communication Device 200, which changes the location of Sub Video Display Area SVDA248 (Paragraph [0213]). In the present embodiment, the user selects, by utilizing Input Device 210 (FIG. 1) or via voice recognition system, Sub Video Display Area SVDA248 (Paragraph [0213]) (S1). The user of Communication Device 200 inputs, by utilizing Input Device 210 (FIG. 1) or via voice recognition system, the sub video display area location data changing command (S2). Here, the sub video display area location data changing command is the command to change the sub video display area location data. The sub video display area location data changing command may be input by way of selecting Sub Video Display Area SVDA248 (Paragraph [0213]) and dragging it to a new location. CPU 211 (FIG. 1) identifies the new location of Sub Video Display Area SVDA248 (Paragraph [0213]) (S3). CPU 211 (FIG. 1) produces the sub video display area location data by referring to the new location identified in the previous step and stores the data in Sub Video Display Area Location Data Storage Area 206248*b*2 (Paragraph [0222]) (S4).

This Paragraph [0240] illustrate(s) Main Visual Data Changing Software 206248*c*7 (Paragraph [0224]) of Communication Device 200, which changes the visual data displayed in Main Video Display Area MVDA248 (Paragraph [0213]) to another one. In the present embodiment, CPU 211 (FIG. 1) retrieves all visual IDs (e.g., Visual#1 through #4) from Visual Data Storage Area 206248*b*3 (Paragraph [0223]) (S1). CPU 211 (FIG. 1) displays the visual IDs (e.g., Visual#1 through #4) retrieved in the previous step on LCD 201 (FIG. 1) (S2). The user selects, by utilizing Input Device 210 (FIG.

1) or via voice recognition system, a visual ID (e.g., Visual#3) (S3). CPU 211 (FIG. 1) retrieves the corresponding visual data (e.g., Visual Data#3) from Visual Data Storage Area 206248*b*3 (Paragraph [0223]) (S4). CPU 211 (FIG. 1) displays the visual data (e.g., Visual Data#3) retrieved in the previous step in Main Video Display Area MVDA248 (Paragraph [0213]) instead of the visual data (e.g., Visual Data#1) previously displayed (S5). The sequence of S4 and S5 is repeated (S6).

This Paragraph [0241] illustrate(s) Sub Visual Data Changing Software 206248*c*8 (Paragraph [0224]) of Communication Device 200, which changes the visual data displayed in Sub Video Display Area SVDA248 (Paragraph [0213]) to another one. In the present embodiment, CPU 211 (FIG. 1) retrieves all visual IDs (e.g., Visual#1 through #4) from Visual Data Storage Area 206248*b*3 (Paragraph [0223]) (S1). CPU 211 (FIG. 1) displays the visual IDs (e.g., Visual#1 through #4) retrieved in the previous step on LCD 201 (FIG. 1) (S2). The user selects, by utilizing Input Device 210 (FIG. 1) or via voice recognition system, a visual ID (e.g., Visual#4) (S3). CPU 211 (FIG. 1) retrieves the corresponding visual data (e.g., Visual Data#4) from Visual Data Storage Area 206248*b*3 (Paragraph [0223]) (S4). CPU 211 (FIG. 1) displays the visual data (e.g., Visual Data#4) retrieved in the previous step in Sub Video Display Area SVDA248 (Paragraph [0213]) instead of the visual data (e.g., Visual Data#2) previously displayed (S5). The sequence of S4 and S5 is repeated (S6).

<<File Auto Saving Function>>

Paragraph(s) [0244] through [0275] illustrate the file auto saving function which automatically produces a backup file data of the object file data when the user inputs the save command. The object file data is the data which is capable to be duplicated (e.g., text data (i.e., document data), audio data, visual data, audiovisual data, and software program). The backup file data is the duplicate (i.e., the backup data) of the object file data. The object file data may be stored in Device A (a Communication Device 200), Host H (FIG. 2), or Device B (another Communication Device 200 or a personal computer, such as desk top computer or a lap top computer). The backup file data may be stored in Device A, Host H (FIG. 2), or Device B.

This Paragraph [0244] illustrates the storage area included in Host H (FIG. 2). In the present embodiment, Host H (FIG. 2) includes File Auto Saving Information Storage Area H252*a* of which the data and the software program(s) stored therein are described in Paragraph(s) [0245].

This Paragraph [0245] illustrates the storage area(s) included in File Auto Saving Information Storage Area H252*a* (Paragraph [0244]). In the present embodiment, File Auto Saving Information Storage Area H252*a* includes File Auto Saving Data Storage Area H252*b* and File Auto Saving Software Storage Area H252*c*. File Auto Saving Data Storage Area H252*b* stores the data necessary to implement the present function on the side of Host H (FIG. 2), such as the one(s) described in Paragraph(s) [0246]. File Auto Saving Software Storage Area H252*c* stores the software program(s) necessary to implement the present function on the side of Host H (FIG. 2), such as the one(s) described in Paragraph(s) [0250].

This Paragraph [0246] illustrates the storage area(s) included in File Auto Saving Data Storage Area H252*b* (Paragraph [0245]). In the present embodiment, File Auto Saving Data Storage Area H252*b* includes Object File Data Storage Area H252*b*1, Backup File Data Storage Area H252*b*2, Backup Log Data Storage Area H252*b*3, and Work Area H252*b*4. Object File Data Storage Area H252*b*1 stores the data described in Paragraph(s) [0247]. Backup File Data Storage Area H252*b*2 stores the data described in Paragraph(s) [0248]. Backup Log Data Storage Area H252*b*3 stores the data described in Paragraph(s) [0249]. Work Area H252*b*4 is utilized as a work area to perform calculation and temporarily store data.

This Paragraph [0247] illustrates the data stored in Object File Data Storage Area H252*b*1 (Paragraph [0246]). In the present embodiment, Object File Data Storage Area H252*b*1 comprises two columns, i.e., 'Object File ID' and 'Object File Data'. Column 'Object File ID' stores the object file IDs, and each object file ID is an identification of the corresponding object file data stored in column 'Object File Data'. Column 'Object File Data' stores the object file data, and each object file data is the data which is capable to be duplicated (e.g., text data (i.e., document data), audio data, visual data, audiovisual data, and software program). In the present embodiment, Object File Data Storage Area H252*b*1 stores the following data: 'Object File#1' and the corresponding 'Object File Data#1'; 'Object File#2' and the corresponding 'Object File Data#2'; 'Object File#3' and the corresponding 'Object File Data#3'; and 'Object File#4' and the corresponding 'Object File Data#4'.

This Paragraph [0248] illustrates the data stored in Backup File Data Storage Area H252*b*2 (Paragraph [0246]). In the present embodiment, Backup File Data Storage Area H252*b*2 comprises two columns, i.e., 'Object File ID' and 'Backup File Data'. Column 'Object File ID' stores the object file IDs, and each object file ID is an identification of the corresponding backup file data stored in column 'Backup File Data'. The object file IDs stored in the present storage area are identical to the ones described in the previous paragraph. Column 'Backup File Data' stores the backup file data, and each backup file data is the duplicate (i.e., the backup data) of the corresponding object file data. In the present embodiment, Backup File Data Storage Area H252*b*2 stores the following data: 'Object File#1' and the corresponding 'Backup File Data#1'; 'Object File#2' and the corresponding 'Backup File Data#2'; 'Object File#3' and the corresponding 'Backup File Data#3'; and 'Object File#4' and the corresponding 'Backup File Data#4'. Backup File Data#1 is the duplicate of Object File Data#1. Backup File Data#2 is the duplicate of Object File Data#2. Backup File Data#3 is the duplicate of Object File Data#3. Backup File Data#4 is the duplicate of Object File Data#4.

This Paragraph [0249] illustrates the data stored in Backup Log Data Storage Area H252*b*3 (Paragraph [0246]). In the present embodiment, Backup Log Data Storage Area H252*b*3 comprises two columns, i.e., 'Object File ID' and 'Backup Log Data'. Column 'Object File ID' stores the object file IDs, and each object file ID is an identification of the corresponding backup log data stored in column 'Backup Log Data'. The object file IDs stored in the present storage area are identical to the ones described in the previous paragraph. Column 'Backup Log Data' stores the backup log data, and each backup log data indicates the date and time (i.e., the history log) at which the corresponding object file data is duplicated (i.e., backed up). In the present embodiment, Backup Log Data Storage Area H252*b*3 stores the following data: 'Object File#1' and the corresponding 'Backup Log Data#1'; 'Object File#2' and the corresponding 'Backup Log Data#2'; 'Object File#3' and the corresponding 'Backup Log Data#3'; and 'Object File#4' and the corresponding 'Backup Log Data#4'.

This Paragraph [0250] illustrates the software program(s) stored in File Auto Saving Software Storage Area H252*c* (Paragraph [0245]). In the present embodiment, File Auto Saving Software Storage Area H252*c* stores Auto Backing Up Software H252*c*1. Auto Backing Up Software H252*c*1 is the software program described in Paragraph(s) [0268], [0270], [0271], [0272], and [0274].

This Paragraph [0251] illustrates the storage area included in RAM 206 (FIG. 1) of Device A. In the present embodiment, RAM 206 includes File Auto Saving Information Storage Area 206A252*a* of which the data and the software program(s) stored therein are described in Paragraph(s) [0253].

The data and/or the software program(s) necessary to implement the present function may be downloaded from Host H (FIG. 2) to Device A.

This Paragraph [0253] illustrates the storage area(s) included in File Auto Saving Information Storage Area 206A252*a* (Paragraph [0251]). In the present embodiment, File Auto Saving Information Storage Area 206A252*a* includes File Auto Saving Data Storage Area 206A252*b* and File Auto Saving Software Storage Area 206A252*c*. File Auto Saving Data Storage Area 206A252*b* stores the data necessary to implement the present function on the side of Device A, such as the one(s) described in Paragraph(s) [0254]. File Auto Saving Software Storage Area 206A252*c* stores the software program(s) necessary to implement the present function on the side of Device A, such as the one(s) described in Paragraph(s) [0258].

This Paragraph [0254] illustrates the storage area(s) included in File Auto Saving Data Storage Area 206A252*b* (Paragraph [0253]). In the present embodiment, File Auto Saving Data Storage Area 206A252*b* includes Object File Data Storage Area 206A252*b*1, Backup File Data Storage Area 206A252*b*2, Backup Log Data Storage Area 206A252*b*3, and Work Area 206A252*b*4. Object File Data Storage Area 206A252*b*1 stores the data described in Paragraph(s) [0255] Backup File Data Storage Area 206A252*b*2 stores the data described in Paragraph(s) [0256] Backup Log Data Storage Area 206A252*b*3 stores the data described in Paragraph(s) [0257] Work Area 206A252*b*4 is utilized as a work area to perform calculation and temporarily store data.

This Paragraph [0255] illustrates the data stored in Object File Data Storage Area 206A252*b*1 (Paragraph [0254]). In the present embodiment, Object File Data Storage Area 206A252*b*1 comprises two columns, i.e., 'Object File ID' and 'Object File Data'. Column 'Object File ID' stores the object file IDs, and each object file ID is an identification of the corresponding object file data stored in column 'Object File Data'. Column 'Object File Data' stores the object file data, and each object file data is the data which is capable to be duplicated (e.g., text data (i.e., document data), audio data, visual data, audiovisual data, and software program). In the present embodiment, Object File Data Storage Area 206A252*b*1 stores the following data: 'Object File#1' and the corresponding 'Object File Data#1'; 'Object File#2' and the corresponding 'Object File Data#2'; 'Object File#3' and the corresponding 'Object File Data#3'; and 'Object File#4' and the corresponding 'Object File Data#4'.

This Paragraph [0256] illustrates the data stored in Backup File Data Storage Area 206A252*b*2 (Paragraph [0254]). In the present embodiment, Backup File Data Storage Area 206A252*b*2 comprises two columns, i.e., 'Object File ID' and 'Backup File Data'. Column 'Object File ID' stores the object file IDs, and each object file ID is an identification of the corresponding backup file data stored in column 'Backup File Data'. The object file IDs stored in the present storage area are identical to the ones described in the previous paragraph. Column 'Backup File Data' stores the backup file data, and each backup file data is the duplicate (i.e., the backup data) of the corresponding object file data. In the present embodiment, Backup File Data Storage Area 206A252*b*2 stores the following data: 'Object File#1' and the corresponding 'Backup File Data#1'; 'Object File#2' and the corresponding 'Backup File Data#2'; 'Object File#3' and the corresponding 'Backup File Data#3'; and 'Object File#4' and the corresponding 'Backup File Data#4'. Backup File Data#1 is the duplicate of Object File Data#1. Backup File Data#2 is the duplicate of Object File Data#2. Backup File Data#3 is the duplicate of Object File Data#3. Backup File Data#4 is the duplicate of Object File Data#4.

This Paragraph [0257] illustrates the data stored in Backup Log Data Storage Area 206A252*b*3 (Paragraph [0254]). In the present embodiment, Backup Log Data Storage Area 206A252*b*3 comprises two columns, i.e., 'Object File ID' and 'Backup Log Data'. Column 'Object File ID' stores the object file IDs, and each object file ID is an identification of the corresponding backup log data stored in column 'Backup Log Data'. The object file IDs stored in the present storage area are identical to the ones described in the previous paragraph. Column 'Backup Log Data' stores the backup log data, and each backup log data indicates the date and time (i.e., the history log) at which the corresponding object file data is duplicated (i.e., backed up). In the present embodiment, Backup Log Data Storage Area 206A252*b*3 stores the following data: 'Object File#1' and the corresponding 'Backup Log Data#1'; 'Object File#2' and the corresponding 'Backup Log Data#2'; 'Object File#3' and the corresponding 'Backup Log Data#3'; and 'Object File#4' and the corresponding 'Backup Log Data#4'.

This Paragraph [0258] illustrates the software program(s) stored in File Auto Saving Software Storage Area 206A252*c* (Paragraph [0253]). In the present embodiment, File Auto Saving Software Storage Area 206A252*c* stores Auto Backing Up Software 206A252*c*1. Auto Backing Up Software 206A252*c*1 is the software program described in Paragraph(s) [0267], [0268], [0269], [0270], [0271], [0272], [0273], [0274], and [0275].

This Paragraph [0259] illustrates the storage area included in RAM 206 (FIG. 1) of Device B. In the present embodiment, RAM 206 includes File Auto Saving Information Storage Area 206B252*a* of which the data and the software program(s) stored therein are described in Paragraph(s) [0261].

The data and/or the software program(s) necessary to implement the present function may be downloaded from Host H (FIG. 2) to Device B.

This Paragraph [0261] illustrates the storage area(s) included in File Auto Saving Information Storage Area 206B252*a* (Paragraph [0259]). In the present embodiment, File Auto Saving Information Storage Area 206B252*a* includes File Auto Saving Data Storage Area 206B252*b* and File Auto Saving Software Storage Area 206B252*c*. File Auto Saving Data Storage Area 206B252*b* stores the data necessary to implement the present function on the side of Device B, such as the one(s) described in Paragraph(s) [0262]. File Auto Saving Software Storage Area 206B252*c* stores the software program(s) necessary to implement the present function on the side of Device B, such as the one(s) described in Paragraph(s) [0266].

This Paragraph [0262] illustrates the storage area(s) included in File Auto Saving Data Storage Area 206B252*b* (Paragraph [0261]). In the present embodiment, File Auto Saving Data Storage Area 206B252*b* includes Object File Data Storage Area 206B252*b*1, Backup File Data Storage Area 206B252*b*2, Backup Log Data Storage Area 206B252*b*3, and Work Area 206B252*b*4. Object File Data Storage Area 206B252*b*1 stores the data described in Paragraph(s) [0263] Backup File Data Storage Area 206B252*b*2 stores the data described in Paragraph(s) [0264] Backup Log Data Storage Area 206B252b3 stores the data described in Paragraph(s) [0265] Work Area 206B252b4 is utilized as a work area to perform calculation and temporarily store data.

This Paragraph [0263] illustrates the data stored in Object File Data Storage Area 206B252b1 (Paragraph [0262]). In the present embodiment, Object File Data Storage Area 206B252b1 comprises two columns, i.e., 'Object File ID' and 'Object File Data'. Column 'Object File ID' stores the object file IDs, and each object file ID is an identification of the corresponding object file data stored in column 'Object File Data'. Column 'Object File Data' stores the object file data, and each object file data is the data which is capable to be duplicated (e.g., text data (i.e., document data), audio data, visual data, audiovisual data, and software program). In the present embodiment, Object File Data Storage Area 206B252b1 stores the following data: 'Object File#1' and the corresponding 'Object File Data#1'; 'Object File#2' and the corresponding 'Object File Data#2'; 'Object File#3' and the corresponding 'Object File Data#3'; and 'Object File#4' and the corresponding 'Object File Data#4'.

This Paragraph [0264] illustrates the data stored in Backup File Data Storage Area 206B252b2 (Paragraph [0262]). In the present embodiment, Backup File Data Storage Area 206B252b2 comprises two columns, i.e., 'Object File ID' and 'Backup File Data'. Column 'Object File ID' stores the object file IDs, and each object file ID is an identification of the corresponding backup file data stored in column 'Backup File Data'. The object file IDs stored in the present storage area are identical to the ones described in the previous paragraph. Column 'Backup File Data' stores the backup file data, and each backup file data is the duplicate (i.e., the backup data) of the corresponding object file data. In the present embodiment, Backup File Data Storage Area 206B252b2 stores the following data: 'Object File#1' and the corresponding 'Backup File Data#1'; 'Object File#2' and the corresponding 'Backup File Data#2'; 'Object File#3' and the corresponding 'Backup File Data#3'; and 'Object File#4' and the corresponding 'Backup File Data#4'. Backup File Data#1 is the duplicate of Object File Data#1. Backup File Data#2 is the duplicate of Object File Data#2. Backup File Data#3 is the duplicate of Object File Data#3. Backup File Data#4 is the duplicate of Object File Data#4.

This Paragraph [0265] illustrates the data stored in Backup Log Data Storage Area 206B252b3 (Paragraph [0262]). In the present embodiment, Backup Log Data Storage Area 206B252b3 comprises two columns, i.e., 'Object File ID' and 'Backup Log Data'. Column 'Object File ID' stores the object file IDs, and each object file ID is an identification of the corresponding backup log data stored in column 'Backup Log Data'. The object file IDs stored in the present storage area are identical to the ones described in the previous paragraph. Column 'Backup Log Data' stores the backup log data, and each backup log data indicates the date and time (i.e., the history log) at which the corresponding object file data is duplicated (i.e., backed up). In the present embodiment, Backup Log Data Storage Area 206B252b3 stores the following data: 'Object File#1' and the corresponding 'Backup Log Data#1'; 'Object File#2' and the corresponding 'Backup Log Data#2'; 'Object File#3' and the corresponding 'Backup Log Data#3'; and 'Object File#4' and the corresponding 'Backup Log Data#4'.

This Paragraph [0266] illustrates the software program(s) stored in File Auto Saving Software Storage Area 206B252c (Paragraph [0261]). In the present embodiment, File Auto Saving Software Storage Area 206B252c stores Auto Backing Up Software 206B252c1. Auto Backing Up Software 206B252c1 is the software program described in Paragraph(s) [0269], [0272], [0273], [0274], and [0275].

This Paragraph [0267] illustrate(s) Auto Backing Up Software 206A252c1 (Paragraph [0258]) of Device A, which automatically produces the backup file data (i.e., a duplicate). The present embodiment illustrates the sequence to backup the object file data stored in Device A to Device A. In the present embodiment, CPU 211 (FIG. 1) of Device A checks the input signal input by utilizing Input Device 210 (FIG. 1) or via voice recognition system (S1). If the input signal includes the save command, CPU 211 (FIG. 1) of Device A proceeds to the next step (S2). Here, the save command is the command to save the object file data which is currently active and/or edited by the user of Device A. CPU 211 (FIG. 1) of Device A identifies the object file data (e.g., Object File Data#1) stored in Object File Data Storage Area 206A252b1 (Paragraph [0255]) for which the save command is input (S3). CPU 211 (FIG. 1) of Device A saves the object file data (e.g., Object File Data#1) identified in the previous step (S4). CPU 211 (FIG. 1) of Device A produces a duplicate of the object file data (e.g., Object File Data#1) saved in the previous step (S5). CPU 211 (FIG. 1) of Device A stores the duplicate produced in the previous step as the backup file data (e.g., Backup File Data#1) in Backup File Data Storage Area 206A252b2 (Paragraph [0256]) (S6). CPU 211 (FIG. 1) of Device A updates the corresponding backup log data (e.g., Backup Log Data#1) stored in Backup Log Data Storage Area 206A252b3 (Paragraph [0257]) (S7). The foregoing sequence is repeated periodically.

This Paragraph [0268] illustrate(s) Auto Backing Up Software H252c1 (Paragraph [0250]) of Host H (FIG. 2) and Auto Backing Up Software 206A252c1 (Paragraph [0258]) of Device A, which automatically produce the backup file data (i.e., a duplicate). The present embodiment illustrates the sequence to backup the object file data stored in Device A to Host H (FIG. 2). In the present embodiment, CPU 211 (FIG. 1) of Device A checks the input signal input by utilizing Input Device 210 (FIG. 1) or via voice recognition system (S1). If the input signal includes the save command, CPU 211 (FIG. 1) of Device A proceeds to the next step (S2). Here, the save command is the command to save the object file data which is currently active and/or edited by the user of Device A. CPU 211 (FIG. 1) of Device A identifies the object file data (e.g., Object File Data#1) stored in Object File Data Storage Area 206A252b1 (Paragraph [0255]) for which the save command is input (S3). CPU 211 (FIG. 1) of Device A saves the object file data (e.g., Object File Data#1) identified in the previous step (S4). CPU 211 (FIG. 1) of Device A produces a duplicate of the object file data (e.g., Object File Data#1) saved in the previous step and sends the data to Host H (FIG. 2) in a wireless fashion (S5). Host H (FIG. 2) receives the duplicate of the object file data (e.g., Object File Data#1) from Device A and stores the data as the backup file data (e.g., Backup File Data#1) in Backup File Data Storage Area H252b2 (Paragraph [0248]) (S6). Host H (FIG. 2) updates the corresponding backup log data (e.g., Backup Log Data#1) stored in Backup Log Data Storage Area H252b3 (Paragraph [0249]) (S7). The foregoing sequence is repeated periodically.

This Paragraph [0269] illustrate(s) Auto Backing Up Software 206A252c1 (Paragraph [0258]) of Device A and Auto Backing Up Software 206B252c1 (Paragraph [0266]) of Device B, which automatically produce the backup file data (i.e., a duplicate). The present embodiment illustrates the sequence to backup the object file data stored in Device A to Device B. In the present embodiment, CPU 211 (FIG. 1) of Device A checks the input signal input by utilizing Input Device 210 (FIG. 1) or via voice recognition system (S1). If the input signal includes the save command, CPU 211 (FIG. 1) of Device A proceeds to the next step (S2). Here, the save command is the command to save the object file data which is currently active and/or edited by the user of Device A. CPU 211 (FIG. 1) of Device A identifies the object file data (e.g., Object File Data#1) stored in Object File Data Storage Area 206A252$b$1 (Paragraph [0255]) for which the save command is input (S3). CPU 211 (FIG. 1) of Device A saves the object file data (e.g., Object File Data#1) identified in the previous step (S4). CPU 211 (FIG. 1) of Device A produces a duplicate of the object file data (e.g., Object File Data#1) saved in the previous step and sends the data to Device B in a wireless fashion (S5). CPU 211 (FIG. 1) of Device B receives the duplicate of the object file data (e.g., Object File Data#1) from Device A and stores the data as the backup file data (e.g., Backup File Data#1) in Backup File Data Storage Area 206B252$b$2 (Paragraph [0264]) (S6). CPU 211 (FIG. 1) of Device B updates the corresponding backup log data (e.g., Backup Log Data#1) stored in Backup Log Data Storage Area 206B252$b$3 (Paragraph [0265]) (S7). The foregoing sequence is repeated periodically.

This Paragraph [0270] illustrate(s) Auto Backing Up Software H252$c$1 (Paragraph [0250]) of Host H (FIG. 2) and Auto Backing Up Software 206A252$c$1 (Paragraph [0258]) of Device A, which automatically produce the backup file data (i.e., a duplicate). The present embodiment illustrates the sequence to backup the object file data stored in Host H (FIG. 2) to Device A. In the present embodiment, CPU 211 (FIG. 1) of Device A checks the input signal input by utilizing Input Device 210 (FIG. 1) or via voice recognition system (S1). If the input signal includes the save command, CPU 211 (FIG. 1) of Device A proceeds to the next step (S2). Here, the save command is the command to save the object file data which is currently active and/or edited by the user of Device A. CPU 211 (FIG. 1) of Device A sends the save command to Host H (FIG. 2) in a wireless fashion (S3). Host H (FIG. 2) receives the save command from Device A (S4). Host H (FIG. 2) identifies the object file data (e.g., Object File Data#1) stored in Object File Data Storage Area H252$b$1 (Paragraph [0247]) for which the save command is input (S5). Host H (FIG. 2) saves the object file data (e.g., Object File Data#1) identified in the previous step (S6). Host H (FIG. 2) produces a duplicate of the object file data (e.g., Object File Data#1) saved in the previous step and sends the data to Device A in a wireless fashion (S7). CPU 211 (FIG. 1) of Device A receives the duplicate of the object file data (e.g., Object File Data#1) from Host H (FIG. 2) in a wireless fashion and stores the data as the backup file data (e.g., Backup File Data#1) in Backup File Data Storage Area 206A252$b$2 (Paragraph [0256]) (S8). CPU 211 (FIG. 1) of Device A updates the corresponding backup log data (e.g., Backup Log Data#1) stored in Backup Log Data Storage Area 206A252$b$3 (Paragraph [0257]) (S9). The foregoing sequence is repeated periodically.

This Paragraph [0271] illustrate(s) Auto Backing Up Software H252$c$1 (Paragraph [0250]) of Host H (FIG. 2) and Auto Backing Up Software 206A252$c$1 (Paragraph [0258]) of Device A, which automatically produce the backup file data (i.e., a duplicate). The present embodiment illustrates the sequence to backup the object file data stored in Host H (FIG. 2) to Host H (FIG. 2). In the present embodiment, CPU 211 (FIG. 1) of Device A checks the input signal input by utilizing Input Device 210 (FIG. 1) or via voice recognition system (S1). If the input signal includes the save command, CPU 211 (FIG. 1) of Device A proceeds to the next step (S2). Here, the save command is the command to save the object file data which is currently active and/or edited by the user of Device A. CPU 211 (FIG. 1) of Device A sends the save command to Host H (FIG. 2) in a wireless fashion (S3). Host H (FIG. 2) receives the save command from Device A (S4). Host H (FIG. 2) identifies the object file data (e.g., Object File Data#1) stored in Object File Data Storage Area H252$b$1 (Paragraph [0247]) for which the save command is input (S5). Host H (FIG. 2) saves the object file data (e.g., Object File Data#1) identified in the previous step (S6). Host H (FIG. 2) produces a duplicate of the object file data (e.g., Object File Data#1) saved in the previous step (S7). Host H (FIG. 2) stores the duplicate produced in the previous step as the backup file data (e.g., Backup File Data#1) in Backup File Data Storage Area H252$b$2 (Paragraph [0248]) (S8). Host H (FIG. 2) updates the corresponding backup log data (e.g., Backup Log Data#1) stored in Backup Log Data Storage Area H252$b$3 (Paragraph [0249]) (S9). The foregoing sequence is repeated periodically.

This Paragraph [0272] illustrate(s) Auto Backing Up Software H252$c$1 (Paragraph [0250]) of Host H (FIG. 2), Auto Backing Up Software 206A252$c$1 (Paragraph [0258]) of Device A, and Auto Backing Up Software 206B252$c$1 (Paragraph [0266]) of Device B, which automatically produce the backup file data (i.e., a duplicate). The present embodiment illustrates the sequence to backup the object file data stored in Host H (FIG. 2) to Device B. In the present embodiment, CPU 211 (FIG. 1) of Device A checks the input signal input by utilizing Input Device 210 (FIG. 1) or via voice recognition system (S1). If the input signal includes the save command, CPU 211 (FIG. 1) of Device A proceeds to the next step (S2). Here, the save command is the command to save the object file data which is currently active and/or edited by the user of Device A. CPU 211 (FIG. 1) of Device A sends the save command to Host H (FIG. 2) in a wireless fashion (S3). Host H (FIG. 2) receives the save command from Device A (S4). Host H (FIG. 2) identifies the object file data (e.g., Object File Data#1) stored in Object File Data Storage Area H252$b$1 (Paragraph [0247]) for which the save command is input (S5). Host H (FIG. 2) saves the object file data (e.g., Object File Data#1) identified in the previous step (S6). Host H (FIG. 2) produces a duplicate of the object file data (e.g., Object File Data#1) saved in the previous step and sends the data to Device B in a wireless fashion (S7). CPU 211 (FIG. 1) of Device B receives the duplicate of the object file data (e.g., Object File Data#1) from Host H (FIG. 2) and stores the data as the backup file data (e.g., Backup File Data#1) in Backup File Data Storage Area 206B252$b$2 (Paragraph [0264]) (S8). CPU 211 (FIG. 1) of Device B updates the corresponding backup log data (e.g., Backup Log Data#1) stored in Backup Log Data Storage Area 206B252$b$3 (Paragraph [0265]) (S9). The foregoing sequence is repeated periodically.

This Paragraph [0273] illustrate(s) Auto Backing Up Software 206A252$c$1 (Paragraph [0258]) of Device A and Auto Backing Up Software 206B252$c$1 (Paragraph [0266]) of Device B, which automatically produce the backup file data (i.e., a duplicate). The present embodiment illustrates the sequence to backup the object file data stored in Device B to Device A. In the present embodiment, CPU 211 (FIG. 1) of Device A checks the input signal input by utilizing Input Device 210 (FIG. 1) or via voice recognition system (S1). If the input signal includes the save command, CPU 211 (FIG. 1) of Device A proceeds to the next step (S2). Here, the save command is the command to save the object file data which is currently active and/or edited by the user of Device A. CPU 211 (FIG. 1) of Device A sends the save command to Device B in a wireless fashion (S3). CPU 211 (FIG. 1) of Device B receives the save command from Device A (S4). CPU 211 (FIG. 1) of Device B identifies the object file data (e.g., Object File Data#1) stored in Object File Data Storage Area 206B252*b*1 (Paragraph [0263]) for which the save command is input (S5). CPU 211 (FIG. 1) of Device B saves the object file data (e.g., Object File Data#1) identified in the previous step (S6). CPU 211 (FIG. 1) of Device B produces a duplicate of the object file data (e.g., Object File Data#1) saved in the previous step and sends the data to Device A in a wireless fashion (S7). CPU 211 (FIG. 1) of Device A receives the duplicate of the object file data (e.g., Object File Data#1) from Device B in a wireless fashion and stores the data as the backup file data (e.g., Backup File Data#1) in Backup File Data Storage Area 206A252*b*2 (Paragraph [0256]) (S8). CPU 211 (FIG. 1) of Device A updates the corresponding backup log data (e.g., Backup Log Data#1) stored in Backup Log Data Storage Area 206A252*b*3 (Paragraph [0257]) (S9). The foregoing sequence is repeated periodically.

This Paragraph [0274] illustrate(s) Auto Backing Up Software H252*c*1 (Paragraph [0250]) of Host H (FIG. 2), Auto Backing Up Software 206A252*c*1 (Paragraph [0258]) of Device A, and Auto Backing Up Software 206B252*c*1 (Paragraph [0266]) of Device B, which automatically produce the backup file data (i.e., a duplicate). The present embodiment illustrates the sequence to backup the object file data stored in Device B to Host H (FIG. 2). In the present embodiment, CPU 211 (FIG. 1) of Device A checks the input signal input by utilizing Input Device 210 (FIG. 1) or via voice recognition system (S1). If the input signal includes the save command, CPU 211 (FIG. 1) of Device A proceeds to the next step (S2). Here, the save command is the command to save the object file data which is currently active or opened by the user of Host H (FIG. 2). CPU 211 (FIG. 1) of Device A sends the save command to Device B in a wireless fashion (S3). CPU 211 (FIG. 1) of Device B receives the save command from Device A (S4). CPU 211 (FIG. 1) of Device B identifies the object file data (e.g., Object File Data#1) stored in Object File Data Storage Area 206B252*b*1 (Paragraph [0263]) for which the save command is input (S5). CPU 211 (FIG. 1) of Device B saves the object file data (e.g., Object File Data#1) identified in the previous step (S6). CPU 211 (FIG. 1) of Device B produces a duplicate of the object file data (e.g., Object File Data#1) saved in the previous step and sends the data to Host H (FIG. 2) in a wireless fashion (S7). Host H (FIG. 2) receives the duplicate of the object file data (e.g., Object File Data#1) from Device B in a wireless fashion and stores the data as the backup file data (e.g., Backup File Data#1) in Backup File Data Storage Area H252*b*2 (Paragraph [0248]) (S8). Host H (FIG. 2) updates the corresponding backup log data (e.g., Backup Log Data#1) stored in Backup Log Data Storage Area H252*b*3 (Paragraph [0249]) (S9). The foregoing sequence is repeated periodically.

This Paragraph [0275] illustrate(s) Auto Backing Up Software 206A252*c*1 (Paragraph [0258]) of Device A and Auto Backing Up Software 206B252*c*1 (Paragraph [0266]) of Device B, which automatically produce the backup file data (i.e., a duplicate). The present embodiment illustrates the sequence to backup the object file data stored in Device B to Device B. In the present embodiment, CPU 211 (FIG. 1) of Device A checks the input signal input by utilizing Input Device 210 (FIG. 1) or via voice recognition system (S1). If the input signal includes the save command, CPU 211 (FIG. 1) of Device A proceeds to the next step (S2). Here, the save command is the command to save the object file data which is currently active and/or edited by the user of Device A. CPU 211 (FIG. 1) of Device A sends the save command to Device B in a wireless fashion (S3). CPU 211 (FIG. 1) of Device B receives the save command from Device A (S4). CPU 211 (FIG. 1) of Device B identifies the object file data (e.g., Object File Data#1) stored in Object File Data Storage Area 206B252*b*1 (Paragraph [0263]) for which the save command is input (S5). CPU 211 (FIG. 1) of Device B saves the object file data (e.g., Object File Data#1) identified in the previous step (S6). CPU 211 (FIG. 1) of Device B produces a duplicate of the object file data (e.g., Object File Data#1) saved in the previous step (S7). CPU 211 (FIG. 1) of Device B stores the duplicate produced in the previous step as the backup file data (e.g., Backup File Data#1) in Backup File Data Storage Area 206B252*b*2 (Paragraph [0264]) (S8). CPU 211 (FIG. 1) of Device B updates the corresponding backup log data (e.g., Backup Log Data#1) stored in Backup Log Data Storage Area 206B252*b*3 (Paragraph [0265]) (S9). The foregoing sequence is repeated periodically.

<<Unknown File Icon Displaying Function>>

Paragraph(s) [0278] through [0297] illustrates the unknown file icon displaying function, wherein an identification of a file data and a linked icon are displayed on LCD 201 (FIG. 1), if the file data is not linked to any software program, a predetermined icon is displayed in lieu of the linked icon.

This Paragraph [0278] illustrates the storage area included in Host H (FIG. 2). In the present embodiment, Host H (FIG. 2) includes Unknown File Icon Displaying Information Storage Area H283*a* of which the data and the software program(s) stored therein are described in Paragraph(s) [0279].

This Paragraph [0279] illustrates the storage area(s) included in Unknown File Icon Displaying Information Storage Area H283*a* (Paragraph [0278]). In the present embodiment, Unknown File Icon Displaying Information Storage Area H283*a* includes Unknown File Icon Displaying Data Storage Area H283*b* and Unknown File Icon Displaying Software Storage Area H283*c*. Unknown File Icon Displaying Data Storage Area H283*b* stores the data necessary to implement the present function on the side of Host H (FIG. 2), such as the one(s) described in Paragraph(s) [0280]. Unknown File Icon Displaying Software Storage Area H283*c* stores the software program(s) necessary to implement the present function on the side of Host H (FIG. 2), such as the one(s) described in Paragraph(s) [0285].

This Paragraph [0280] illustrates the storage area(s) included in Unknown File Icon Displaying Data Storage Area H283*b* (Paragraph [0279]). In the present embodiment, Unknown File Icon Displaying Data Storage Area H283*b* includes Program Data Storage Area H283*b*1, File Data Storage Area H283*b*2, Linked Icon Data Storage Area H283*b*3, Program/File Linking Data Storage Area H283*b*4, Unknown File Icon Data Storage Area H283*b*5, and Work Area H283*b*6. Program Data Storage Area H283*b*1 stores the data described in Paragraph(s) [0281]. File Data Storage Area H283*b*2 stores the data described in Paragraph(s) [0282]. Linked Icon Data Storage Area H283*b*3 stores the data described in Paragraph(s) [0283]. Program/File Linking Data Storage Area H283*b*4 stores the data described in Paragraph(s) [0284]. Unknown File Icon Data Storage Area H283*b*5 stores the unknown file icon data which is the image data indicating an icon designed to be displayed on LCD 201 (FIG. 1) indicating that the corresponding program data is not found. Work Area H283*b*6 is utilized as a work area to perform calculation and temporarily store data.

This Paragraph [0281] illustrates the data stored in Program Data Storage Area H283*b*1 (Paragraph [0280]). In the present embodiment, Program Data Storage Area H283*b*1 comprises two columns, i.e., 'Program ID' and 'Program Data'. Column 'Program ID' stores the program IDs, and each program ID is an identification of the corresponding program data stored in column 'Program Data'. Column 'Program Data' stores the program data, and each program data is a software program. In the present embodiment, Program Data Storage Area H283*b*1 stores the following data: 'Program#1' and the corresponding 'Program Data#1'; 'Program#2' and the corresponding 'Program Data#2'; 'Program#3' and the corresponding 'Program Data#3'; and 'Program#4' and the corresponding 'Program Data#4'.

This Paragraph [0282] illustrates the data stored in File Data Storage Area H283*b*2 (Paragraph [0280]). In the present embodiment, File Data Storage Area H283*b*2 comprises two columns, i.e., 'File ID' and 'File Data'. Column 'File ID' stores the file IDs, and each file ID is an identification of the corresponding file data stored in column 'File Data'. Each file ID may be the name or title of the corresponding file data. Column 'File Data' stores the file data, and each file data is the data which is capable to be opened, closed, and/or activated by a software program. Each file data may be a text data, document data, data base data, audio data, visual data, or audio visual data. In the present embodiment, File Data Storage Area H283*b*2 stores the following data: 'File#1' and the corresponding 'File Data#1'; 'File#2' and the corresponding 'File Data#2'; 'File#3' and the corresponding 'File Data#3'; and 'File#4' and the corresponding 'File Data#4'.

This Paragraph [0283] illustrates the data stored in Linked Icon Data Storage Area H283*b*3 (Paragraph [0280]). In the present embodiment, Linked Icon Data Storage Area H283*b*3 comprises two columns, i.e., 'Program ID' and 'Linked Icon Data'. Column 'Program ID' stores the program IDs, and each program ID is an identification of the corresponding linked icon data stored in column 'Linked Icon Data'. Column 'Linked Icon Data' stores the linked icon data, and each linked icon data is an image data of an icon designed to be displayed on LCD 201 (FIG. 1) indicating the corresponding program data. In the present embodiment, Linked Icon Data Storage Area H283*b*3 stores the following data: 'Program#1' and the corresponding 'Linked Icon Data#1'; 'Program#2' and the corresponding 'Linked Icon Data#2'; 'Program#3' and the corresponding 'Linked Icon Data#3'; and 'Program#4' and the corresponding 'Linked Icon Data#4'. In the present embodiment, Linked Icon Data#1 is the linked icon data indicating Program Data#1 stored in Program Data Storage Area H283*b*1 (Paragraph [0281]). Linked Icon Data#2 is the linked icon data indicating Program Data#2 stored in Program Data Storage Area H283*b*1 (Paragraph [0281]). Linked Icon Data#3 is the linked icon data indicating Program Data#3 stored in Program Data Storage Area H283*b*1 (Paragraph [0281]). Linked Icon Data#4 is the linked icon data indicating Program Data#4 stored in Program Data Storage Area H283*b*1 (Paragraph [0281]).

This Paragraph [0284] illustrates the data stored in Program/File Linking Data Storage Area H283*b*4 (Paragraph [0280]). In the present embodiment, Program/File Linking Data Storage Area H283*b*4 comprises two columns, i.e., 'File ID' and 'Program/File Linking Data'. Column 'File ID' stores the file IDs, and each file ID is an identification of the corresponding program/file linking data stored in column 'Program/File Linking Data'. Column 'Program/File Linking Data' stores the program/file linking data, and each program/file linking data indicates the link between the program data stored in Program Data Storage Area H283*b*1 (Paragraph [0281]) and the file data stored in File Data Storage Area H283*b*2 (Paragraph [0282]). If a file data is linked with a program data, the file data is capable to be opened, closed, and/or activated by the program data. In the present embodiment, Program/File Linking Data Storage Area H283*b*4 stores the following data: 'File#1' and the corresponding 'Program/File Linking Data#1'; 'File#2' and the corresponding 'Program/File Linking Data#2'; and 'File#3' and the corresponding 'Program/File Linking Data#3. In the present embodiment, Program/File Linking Data#1 indicates that File Data#1 indicated by the file ID 'File#1' is capable to be opened, closed, and/or activated by Program Data#1. Program/File Linking Data#2 indicates that File Data#2 indicated by the file ID 'File#2' is capable to be opened, closed, and/or activated by Program Data#2. Program/File Linking Data#3 indicates that File Data#3 indicated by the file ID 'File#3' is capable to be opened, closed, and/or activated by Program Data#3. No program/file linking data is found corresponding to File Data#4 indicated by the file ID 'File#4'.

This Paragraph [0285] illustrates the software program(s) stored in Unknown File Icon Displaying Software Storage Area H283*c* (Paragraph [0279]). In the present embodiment, Unknown File Icon Displaying Software Storage Area H283*c* stores File Data List Displaying Software H283*c*1. File Data List Displaying Software H283*c*1 is the software program described in Paragraph(s) [0295].

This Paragraph [0286] illustrates the storage area included in RAM 206 (FIG. 1) of Communication Device 200. In the present embodiment, RAM 206 includes Unknown File Icon Displaying Information Storage Area 206283*a* of which the data and the software program(s) stored therein are described in Paragraph(s) [0288].

The data and/or the software program(s) necessary to implement the present function may be downloaded from Host H (FIG. 2) to Communication Device 200.

This Paragraph [0288] illustrates the storage area(s) included in Unknown File Icon Displaying Information Storage Area 206283*a* (Paragraph [0286]). In the present embodiment, Unknown File Icon Displaying Information Storage Area 206283*a* includes Unknown File Icon Displaying Data Storage Area 206283*b* and Unknown File Icon Displaying Software Storage Area 206283*c*. Unknown File Icon Displaying Data Storage Area 206283*b* stores the data necessary to implement the present function on the side of Communication Device 200, such as the one(s) described in Paragraph(s) [0289]. Unknown File Icon Displaying Software Storage Area 206283*c* stores the software program(s) necessary to implement the present function on the side of Communication Device 200, such as the one(s) described in Paragraph(s) [0294].

This Paragraph [0289] illustrates the storage area(s) included in Unknown File Icon Displaying Data Storage Area 206283*b* (Paragraph [0288]). In the present embodiment, Unknown File Icon Displaying Data Storage Area 206283*b* includes Program Data Storage Area 206283*b*1, File Data Storage Area 206283*b*2, Linked Icon Data Storage Area 206283*b*3, Program/File Linking Data Storage Area 206283*b*4, Unknown File Icon Data Storage Area 206283*b*5, and Work Area 206283*b*6. Program Data Storage Area 206283*b*1 stores the data described in Paragraph(s) [0290]. File Data Storage Area 206283*b*2 stores the data described in Paragraph(s) [0291]. Linked Icon Data Storage Area 206283*b*3 stores the data described in Paragraph(s) [0292]. Program/File Linking Data Storage Area 206283*b*4 stores the data described in Paragraph(s) [0293]. Unknown File Icon Data Storage Area 206283*b*5 stores the unknown file icon data which is the image data indicating an icon designed to be displayed on LCD 201 (FIG. 1) indicating that the corresponding program data is not found. Work Area 206283*b*6 is utilized as a work area to perform calculation and temporarily store data.

This Paragraph [0290] illustrates the data stored in Program Data Storage Area 206283*b*1 (Paragraph [0289]). In the present embodiment, Program Data Storage Area 206283*b*1 comprises two columns, i.e., 'Program ID' and 'Program Data'. Column 'Program ID' stores the program IDs, and each program ID is an identification of the corresponding program data stored in column 'Program Data'. Column 'Program Data' stores the program data, and each program data is a software program. In the present embodiment, Program Data Storage Area 206283b1 stores the following data: 'Program#1' and the corresponding 'Program Data#1'; 'Program#2' and the corresponding 'Program Data#2'; 'Program#3' and the corresponding 'Program Data#3'; and 'Program#4' and the corresponding 'Program Data#4'.

This Paragraph [0291] illustrates the data stored in File Data Storage Area 206283b2 (Paragraph [0289]). In the present embodiment, File Data Storage Area 206283b2 comprises two columns, i.e., 'File ID' and 'File Data'. Column 'File ID' stores the file IDs, and each file ID is an identification of the corresponding file data stored in column 'File Data'. Each file ID may be the name or title of the corresponding file data. Column 'File Data' stores the file data, and each file data is the data which is capable to be opened, closed, and/or activated by a software program. Each file data may be a text data, document data, data base data, audio data, visual data, or audio visual data. In the present embodiment, File Data Storage Area 206283b2 stores the following data: 'File#1' and the corresponding 'File Data#1'; 'File#2' and the corresponding 'File Data#2'; 'File#3' and the corresponding 'File Data#3'; and 'File#4' and the corresponding 'File Data#4'.

This Paragraph [0292] illustrates the data stored in Linked Icon Data Storage Area 206283b3 (Paragraph [0289]). In the present embodiment, Linked Icon Data Storage Area 206283b3 comprises two columns, i.e., 'Program ID' and 'Linked Icon Data'. Column 'Program ID' stores the program IDs, and each program ID is an identification of the corresponding linked icon data stored in column 'Linked Icon Data'. Column 'Linked Icon Data' stores the linked icon data, and each linked icon data is an image data of an icon designed to be displayed on LCD 201 (FIG. 1) indicating the corresponding program data. In the present embodiment, Linked Icon Data Storage Area 206283b3 stores the following data: 'Program#1' and the corresponding 'Linked Icon Data#1'; 'Program#2' and the corresponding 'Linked Icon Data#2'; 'Program#3' and the corresponding 'Linked Icon Data#3'; and 'Pro gram#4' and the corresponding 'Linked Icon Data#4'. In the present embodiment, Linked Icon Data#1 is the linked icon data indicating Program Data#1 stored in Program Data Storage Area 206283b1 (Paragraph [0290]). Linked Icon Data#2 is the linked icon data indicating Program Data#2 stored in Program Data Storage Area 206283b1 (Paragraph [0290]). Linked Icon Data#3 is the linked icon data indicating Program Data#3 stored in Program Data Storage Area 206283b1 (Paragraph [0290]). Linked Icon Data#4 is the linked icon data indicating Program Data#4 stored in Program Data Storage Area 206283b1 (Paragraph [0290]).

This Paragraph [0293] illustrates the data stored in Program/File Linking Data Storage Area 206283b4 (Paragraph [0289]). In the present embodiment, Program/File Linking Data Storage Area 206283b4 comprises two columns, i.e., 'File ID' and 'Program/File Linking Data'. Column 'File ID' stores the file IDs, and each file ID is an identification of the corresponding program/file linking data stored in column 'Program/File Linking Data'. Column 'Program/File Linking Data' stores the program/file linking data, and each program/file linking data indicates the link between the program data stored in Program Data Storage Area 206283b1 (Paragraph [0290]) and the file data stored in File Data Storage Area 206283b2 (Paragraph [0291]). If a file data is linked with a program data, the file data is capable to be opened, closed, and/or activated by the program data. In the present embodiment, Program/File Linking Data Storage Area 206283b4 stores the following data: 'File#1' and the corresponding 'Program/File Linking Data#1'; 'File#2' and the corresponding 'Program/File Linking Data#2'; and 'File#3' and the corresponding 'Program/File Linking Data#3. In the present embodiment, Program/File Linking Data#1 indicates that File Data#1 indicated by the file ID 'File#1' is capable to be opened, closed, and/or activated by Program Data#1. Program/File Linking Data#2 indicates that File Data#2 indicated by the file ID 'File#2' is capable to be opened, closed, and/or activated by Program Data#2. Program/File Linking Data#3 indicates that File Data#3 indicated by the file ID 'File#3' is capable to be opened, closed, and/or activated by Program Data#3. No program/file linking data is found corresponding to File Data#4 indicated by the file ID 'File#4'.

This Paragraph [0294] illustrates the software program(s) stored in Unknown File Icon Displaying Software Storage Area 206283c (Paragraph [0288]). In the present embodiment, Unknown File Icon Displaying Software Storage Area 206283c stores File Data List Displaying Software 206283c1. File Data List Displaying Software 206283c1 is the software program described in Paragraph(s) [0295] and [0297].

This Paragraph [0295] illustrate(s) File Data List Displaying Software H283c1 (Paragraph [0285]) of Host H (FIG. 2) and File Data List Displaying Software 206283c1 (Paragraph [0294]) of Communication Device 200, which display a list of file data on LCD 201 (FIG. 1). In the present embodiment, the user of Communication Device 200 inputs, by utilizing Input Device 210 (FIG. 1) or via voice recognition system, the file data list displaying command (S1). Here, the file data list displaying command is the command to display a list of file data on LCD 201 (FIG. 1). CPU 211 (FIG. 1) sends the file data list displaying command to Host H (FIG. 2) in a wireless fashion (S2). Host H (FIG. 2) receives the file data list displaying command from Communication Device 200 (S3). Host H (FIG. 2) retrieves the file ID (e.g., File#1) from File Data Storage Area H283b2 (Paragraph [0282]) (S4). Host H (FIG. 2) identifies the program/file linking data (e.g., Program/File Linking Data#1) corresponding to the file ID (e.g., File#1) retrieved in the previous step stored in Program/File Linking Data Storage Area H283b4 (Paragraph [0284]) (S5). If the corresponding program/file linking data (e.g., Program/File Linking Data#1) is found in Program/File Linking Data Storage Area H283b4 (Paragraph [0284]), Host H (FIG. 2) proceeds to the next step; if the corresponding program/file linking data is not found in Program/File Linking Data Storage Area H283b4 (Paragraph [0284]), Host H (FIG. 2) proceeds to S13 (S6). Host H (FIG. 2) identifies the program data (e.g., Program Data#1) indicated by the program/file linking data (e.g., Program/File Linking Data#1) identified in S5 stored in Program Data Storage Area H283b1 (Paragraph [0281]) (S7). Host H (FIG. 2) retrieves the linked icon data (e.g., Linked Icon Data#1) corresponding to the program data (e.g., Program Data#1) identified in the previous step from Linked Icon Data Storage Area H283b3 (Paragraph [0283]) (S8). Host H (FIG. 2) sends the file ID (e.g., File#1) retrieved in S4 and the linked icon data (e.g., Linked Icon Data#1) retrieved in S8 to Communication Device 200 (S9). CPU 211 (FIG. 1) receives the file ID (e.g., File#1) and the linked icon data (e.g., Linked Icon Data#1) from Host H (FIG. 2) in a wireless fashion (S10). CPU 211 (FIG. 1) displays the file ID (e.g., File#1) received in the previous step on LCD 201 (FIG. 1) (S11). CPU 211 (FIG. 1) displays the linked icon data (e.g., Linked Icon Data#1) received in S10 adjacent to the file ID (e.g., File#1) displayed in the previous step (S12). Host H (FIG. 2) retrieves the unknown file icon data from Unknown File Icon Data Storage Area H283b5 (Paragraph [0280]) (S13). Host H (FIG. 2) sends the file ID (e.g., File#1) retrieved in S4 and the unknown file icon data retrieved in the previous step to Communication Device 200 (S14). CPU 211 (FIG. 1) receives the file ID (e.g., File#1) and the unknown file icon data from Host H (FIG. 2) in a wireless fashion (S15). CPU 211 (FIG. 1) displays the file ID (e.g., File#4) received in the previous step on LCD 201 (FIG. 1) (S16). CPU 211 (FIG. 1) displays the unknown file icon data retrieved in S15 adjacent to the file ID (e.g., File#4) displayed in the previous step (S17). The sequence of S2 through S17 is repeated for all file IDs (e.g., File#1 through #4) stored in File Data Storage Area H283b2 (Paragraph [0282]).

Paragraph [0297] illustrate another embodiment wherein Communication Device 200 plays the major role in implementing the present function.

This Paragraph [0297] illustrate(s) File Data List Displaying Software 206283c1 (Paragraph [0294]) of Communication Device 200, which displays a list of file data on LCD 201 (FIG. 1). In the present embodiment, the user of Communication Device 200 inputs, by utilizing Input Device 210 (FIG. 1) or via voice recognition system, the file data list displaying command (S1). Here, the file data list displaying command is the command to display a list of file data on LCD 201 (FIG. 1). CPU 211 (FIG. 1) retrieves the file ID (e.g., File#1) from File Data Storage Area 206283b2 (Paragraph [0291]) (S2). CPU 211 (FIG. 1) identifies the program/file linking data (e.g., Program/File Linking Data#1) corresponding to the file ID (e.g., File#1) retrieved in the previous step stored in Program/File Linking Data Storage Area 206283b4 (Paragraph [0293]) (S3). If the corresponding program/file linking data (e.g., Program/File Linking Data#1) is found in Program/File Linking Data Storage Area 206283b4 (Paragraph [0293]), CPU 211 (FIG. 1) proceeds to the next step; if the corresponding program/file linking data is not found in Program/File Linking Data Storage Area 206283b4 (Paragraph [0293]), CPU 211 (FIG. 1) proceeds to S9 (S4). CPU 211 (FIG. 1) identifies the program data (e.g., Program Data#1) indicated by the program/file linking data (e.g., Program/File Linking Data#1) identified in S3 stored in Program Data Storage Area 206283b1 (Paragraph [0290]) (S5). CPU 211 (FIG. 1) retrieves the linked icon data (e.g., Linked Icon Data#1) corresponding to the program data (e.g., Program Data#1) identified in the previous step from Linked Icon Data Storage Area 206283b3 (Paragraph [0292]) (S6). CPU 211 (FIG. 1) displays the file ID (e.g., File#1) retrieved in S2 on LCD 201 (FIG. 1) (S7). CPU 211 (FIG. 1) displays the linked icon data (e.g., Linked Icon Data#1) retrieved in S6 adjacent to the file ID (e.g., File#1) displayed in the previous step (S8). CPU 211 (FIG. 1) retrieves the unknown file icon data from Unknown File Icon Data Storage Area 206283b5 (Paragraph [0289]) (S9). CPU 211 (FIG. 1) displays the file ID (e.g., File#4) retrieved in S2 on LCD 201 (FIG. 1) (S10). CPU 211 (FIG. 1) displays the unknown file icon data retrieved in S9 adjacent to the file ID (e.g., File#4) displayed in the previous step (S11). The sequence of S2 through S11 is repeated for all file IDs (e.g., File#1 through #4) stored in File Data Storage Area 206283b2 (Paragraph [0291]).

INCORPORATION BY REFERENCE

Without limiting the generality of the first paragraph of this specification, the following paragraphs and drawings described in the original file of the Prior Filed Application are incorporated to this application by reference: The preamble described in paragraph [2149] (no drawings); Communication Device 200 (Voice Communication Mode) described in paragraphs [2150] through [2155] (FIGS. 1 through 2c); Voice Recognition System described in paragraphs [2156] through [2188] (FIGS. 3 through 19); Positioning System described in paragraphs [2189] through [2220] (FIGS. 20a through 32e); Auto Backup System described in paragraphs [2221] through [2230] (FIGS. 33 through 37); Signal Amplifier described in paragraphs [2231] through [2236] (FIG. 38); Audio/Video Data Capturing System described in paragraphs [2237] through [2249] (FIGS. 39 through 44b); Digital Mirror (1) described in paragraphs [2250] through [2258] (FIGS. 44c through 44e); Caller ID System described in paragraphs [2259] through [2266] (FIGS. 45 through 47); Stock Purchasing Function described in paragraphs [2267] through [2276] (FIGS. 48 through 52); Timer Email Function described in paragraphs [2277] through [2283] (FIGS. 53a and 53b); Call Blocking Function described in paragraphs [2284] through [2297] (FIGS. 54 through 59); Online Payment Function described in paragraphs [2298] through [2307] (FIGS. 60 through 64); Navigation System described in paragraphs [2308] through [2330] (FIGS. 65 through 74a); Remote Controlling System described in paragraphs [2331] through [2349] (FIGS. 75 through 85); Auto Emergency Calling System described in paragraphs [2350] through [2358] (FIGS. 86 and 87); Cellular TV Function described in paragraphs [2359] through [2443] (FIGS. 88 through 135); 3D Video Game Function described in paragraphs [2444] through [2456] (FIGS. 136 through 144); Digital Mirror Function (2) described in paragraphs [2457] through [2466] (FIGS. 145 through 155); Voice Recognition System—E-mail (2) described in paragraphs [2467] through [2475] (FIGS. 156 through 160); Positioning System—GPS Search Engine described in paragraphs [2476] through [2518] (FIGS. 161 through 182); Mobile Ignition Key Function described in paragraphs [2519] through [2541] (FIGS. 183 through 201); Voice Print Authentication System described in paragraphs [2542] through [2552] (FIGS. 202 through 211); Fingerprint Authentication System described in paragraphs [2553] through [2565] (FIGS. 212 through 221); Auto Time Adjust Function described in paragraphs [2566] through [2570] (FIGS. 222 through 224); Video/Photo Mode described in paragraphs [2571] through [2599] (FIGS. 225 through 242); Call Taxi Function described in paragraphs [2600] through [2640] (FIGS. 243 through 269); Shooting Video Game Function described in paragraphs [2641] through [2657] (FIGS. 270 through 283); Driving Video Game Function described in paragraphs [2658] through [2671] (FIGS. 284 through 294); Address Book Updating Function described in paragraphs [2672] through [2692] (FIGS. 295 through 312); Batch Address Book Updating Function—With Host described in paragraphs [2693] through [2714] (FIGS. 313 through 329); Batch Address Book Updating Function—Peer-To-Peer Connection described in paragraphs [2715] through [2719](FIGS. 329a through 329c); Batch Scheduler Updating Function—With Host described in paragraphs [2720] through [2743] (FIGS. 330 through 350); Batch Scheduler Updating Function—Peer-To-Peer Connection described in paragraphs [2744] through [2748] (FIGS. 351 and 352); Calculator Function described in paragraphs [2749] through [2754] (FIGS. 353 through 356); Spreadsheet Function described in paragraphs [2755] through [2762] (FIGS. 357 through 360); Word Processing Function described in paragraphs [2763] through [2778] (FIGS. 361 through 373); TV Remote Controller Function described in paragraphs [2779] through [2801] (FIGS. 374 through 394); CD/PC Inter-communicating Function described in paragraphs [2802] through [2826] (FIGS. 413 through 427); PDWR Sound Selecting Function described in paragraphs [2827] through [2863] (FIGS. 428 through 456); Start Up Software Function described in paragraphs [2864] through [2880] (FIGS. 457 through 466); Another Embodiment Of Communication Device-Wireless described in paragraphs [2881] through [2885] (FIGS. 467a through 467d); Stereo Audio Data Output Function described in paragraphs [2886] through [2905] (FIGS. 468 through 479); Stereo Visual Data Output Function described in paragraphs [2906] through [2925] (FIGS. 480 through 491); Multiple Signal Processing Function described in paragraphs [2926] through [2998] (FIGS. 492 through 529); Positioning System—Pin-pointing Function described in paragraphs [2999] through [3032] (FIGS. 530 through 553); Artificial Satellite Host described in paragraphs [3033] through [3051] (FIGS. 554 through 567); CCD Bar Code Reader Function described in paragraphs [3052] through [3073] (FIGS. 568 through 579); Online Renting Function described in paragraphs [3074] through [3151] (FIGS. 580 through 633); SOS Calling Function described in paragraphs [3152] through [3172] (FIGS. 634 through 645); Input Device described in paragraphs [3173] through [3178] (FIGS. 646 through 650); PC Remote Controlling Function described in paragraphs [3179] through [3214] (FIGS. 651 through 670); PC Remote Downloading Function described in paragraphs [3215] through [3264] (FIGS. 671 through 701); Audiovisual Playback Function described in paragraphs [3265] through [3290] (FIGS. 702 through 716); Audio Playback Function described in paragraphs [3291] through [3315] (FIGS. 717 through 731); Ticket Purchasing Function described in paragraphs [3316] through [3345] (FIGS. 732 through 753); Remote Data Erasing Function described in paragraphs [3346] through [3375] (FIGS. 754 through 774); Business Card Function described in paragraphs [3376] through [3392] (FIGS. 775 through 783); Game Vibrating Function described in paragraphs [3393] through [3403] (FIGS. 784 through 786); Part-time Job Finding Function described in paragraphs [3404] through [3424] (FIGS. 787 through 801); Parking Lot Finding Function described in paragraphs [3425] through [3464] (FIGS. 802 through 832); Parts Upgradable Communication Device described in paragraphs [3465] through [3490] (FIGS. 833a through 833x); On Demand TV Function described in paragraphs [3491] through [3521] (FIGS. 834 through 855); Intercommunicating TV Function described in paragraphs [3522] through [3556](FIGS. 856 through 882); Display Controlling Function described in paragraphs [3557] through [3574] (FIGS. 883 through 894); Multiple Party Communicating Function described in paragraphs [3575] through [3608] (FIGS. 894a through 917); Display Brightness Controlling Function described in paragraphs [3609] through [3618] (FIGS. 918 through 923); Multiple Party Pin-pointing Function described in paragraphs [3619] through [3666] (FIGS. 924 through 950f); Digital Camera Function described in paragraphs [3667] through [3694] (FIGS. 951 through 968); Phone Number Linking Function described in paragraphs [3695] through [3718] (FIGS. 968a through 983); Multiple Window Displaying Function described in paragraphs [3719] through [3737] (FIGS. 984 through 995); Mouse Pointer Displaying Function described in paragraphs [3738] through [3775] (FIGS. 996 through 1021); House Item Pin-pointing Function described in paragraphs [3776] through [3935] (FIGS. 1022 through 1152); Membership Administrating Function described in paragraphs [3936] through [3978] (FIGS. 1153 through 1188); Keyword Search Timer Recording Function described in paragraphs [3979] through [4070] (FIGS. 1189 through 1254); Weather Forecast Displaying Function described in paragraphs [4071] through [4112] (FIGS. 1255 through 1288); Multiple Language Displaying Function described in paragraphs [4113] through [4170] (FIGS. 1289 through 1331); Caller's Information Displaying Function described in paragraphs [4171] through [4224] (FIGS. 1332 through 1375); Communication Device Remote Controlling Function (By Phone) described in paragraphs [4225] through [4265] (FIGS. 1394 through 1415); Communication Device Remote Controlling Function (By Web) described in paragraphs [4266] through [4306] (FIGS. 1416 through 1437); Shortcut Icon Displaying Function described in paragraphs [4307] through [4334] (FIGS. 1438 through 1455); Task Tray Icon Displaying Function described in paragraphs [4335] through [4357](FIGS. 1456 through 1470); Multiple Channel Processing Function described in paragraphs [4358] through [4405] (FIGS. 1471 through 1498); Solar Battery Charging Function described in paragraphs [4406] through [4419] (FIGS. 1499 through 1509); OS Updating Function described in paragraphs [4420] through [4487] (FIGS. 1510 through 1575); Device Managing Function described in paragraphs [4488] through [4505] (FIGS. 1576 through 1587); Automobile Controlling Function described in paragraphs [4506] through [4554] (FIGS. 1588 through 1627); OCR Function described in paragraphs [4555] through [4590] (FIGS. 1628 through 1652); Real-time GPS Function described in paragraphs [4591] through [4660] (FIGS. 1653 through 1712); CCD Video Stabilizing Function described in paragraphs [4661] through [4692] (FIGS. 1713 through 1736); DVD Remote Controlling Function described in paragraphs [4693] through [4731] (FIGS. 1737 through 1757); Dual Frame Buffer Implementing Function described in paragraphs [4732] through [4748] (FIGS. 1758 through 1767); Mouse Pointer Image Auto Changing Function described in paragraphs [4749] through [4762] (FIGS. 1768 through 1774); Dual CCD Camera Function described in paragraphs [4763] through [4783] (FIGS. 1775a through 1786); Radio Tuner Function described in paragraphs [4784] through [4814] (FIGS. 1787 through 1812); Registered Voice Recognizing Function described in paragraphs [4815] through [4854] (FIGS. 1813 through 1842); Host's TV Resolution Converting Function described in paragraphs [4855] through [4884] (FIGS. 1843 through 1864); Voice Shortcut Recognizing Function described in paragraphs [4885] through [4919] (FIGS. 1865 through 1889); and Vital Sign Monitoring Function described in paragraphs [4920] through [5009] (FIGS. 1890a through 1954).

Without limiting the generality of the first paragraph of this specification, the following paragraphs and drawings described in Preliminary Amendment B of the Prior Filed Application are incorporated to this application by reference: Attached File Emailing Function described in paragraphs [5009.1] through [5009.13] (FIGS. 1955 through 1961); Movie eTicket Function described in paragraphs [5009.14] through [5009.66] (FIGS. 1962 through 2002); Carrier Prepaid eCard Function described in paragraphs [5009.67] through [5009.104] (FIGS. 2003 through 2032); Carrier ePass Function described in paragraphs [5009.105] through [5009.144] (FIGS. 2033 through 2061b); Communication Device 200 Installed In Carrier described in paragraphs [5009.145] and [5009.146] (FIG. 2062); Wireless Communication Facilitating System described in paragraphs [5009.147] through [5009.176] (FIGS. 2063 through 2076b); In-Carrier Notifying Function described in paragraphs [5009.177] through [5009.207] (FIGS. 2077 through 2093); Station Name Notifying Function described in paragraphs [5009.208] through [5009.237] (FIGS. 2094 through 2110); Restaurant eMenu Function described in paragraphs [5009.238] through [5009.280] (FIGS. 2111 through 2144);

Geographic Location Recording Function described in paragraphs [5009.281] through [5009.322] (FIGS. 2145 through 2176b); CCD Dictionary Function described in paragraphs [5009.323] through [5009.347] (FIGS. 2177 through 2195b); Schedule Notifying Function described in paragraphs [5009.348] through [5009.374] (FIGS. 2196 through 2215); Customized Device Purchasing System described in paragraphs [5009.375] through [5009.415] (FIGS. 2216 through 2250); Multiple Type TV Program Distributing System described in paragraphs [5009.416] through [5009.446] (FIGS. 2251 through 2274); Multiple TV Screen Displaying Function described in paragraphs [5009.447] through [5009.478] (FIGS. 2275 through 2297); Touch Panel Function described in paragraphs [5009.479] through [5009.504] (FIGS. 2298 through 2315); Communication Device Finding Function described in paragraphs [5009.505] through [5009.516] (FIGS. 2316 through 2322); Carrier Safety Measure Controlling Function described in paragraphs [5009.517] through [5009.551] (FIGS. 2323 through 2342); Product Information Retrieving Function (CCD) described in paragraphs [5009.552] through [5009.580] (FIGS. 2343 through 2360); Product Information Stored Chip Function described in paragraphs [5009.581] through [5009.618] (FIGS. 2361 through 2385); Karaoke Playing Function described in paragraphs [5009.619] through [5009.647] (FIGS. 2386 through 2406); Performing Pattern Identifying Anti-Virus Function described in paragraphs [5009.648] through [5009.670] (FIGS. 2407 through 2421); Continue Enabled Video Game Function described in paragraphs [5009.671] through [5009.693] (FIGS. 2422 through 2436); Resume Enabled Video Game Function described in paragraphs [5009.694] through [5009.716] (FIGS. 2437 through 2451); Signal Forwarding Function described in paragraphs [5009.717] through [5009.745] (FIGS. 2452 through 2472); In-Carrier Auto Implementing Mode Function described in paragraphs [5009.746] through [5009.775] (FIGS. 2473 through 2492); Voice Message Displaying Function described in paragraphs [5009.776] through [5009.796] (FIGS. 2493 through 2503c); Human Toes Displaying Function described in paragraphs [5009.797] through [5009.814] (FIGS. 2504 through 2521); Wrinkles/Muscles Displaying Function described in paragraphs [5009.815] through [5009.856] (FIGS. 2522a through 2552e); Protruded Body Part Displaying Function described in paragraphs [5009.857] through [5009.876] (FIGS. 2553 through 2566b); Satellite TV Program Displaying Function described in paragraphs [5009.877] through [5009.921] (FIGS. 2567 through 2601); Definition of Communication Device 200 described in paragraphs [5009.922] and [5009.923] (no drawings); Remote Parameter Setting Function described in paragraphs [5009.924] through [5009.1017] (FIGS. 2602 through 2682); Multiple Sender's Email Address Function described in paragraphs [5009.1018] through [5009.1035] (FIGS. 2683 through 2695); Multiple Phone Number Function described in paragraphs [5009.1036] through [5009.1055] (FIGS. 2696 through 2709); TV Commercial Customizing Function described in paragraphs [5009.1056] through [5009.1085] (FIGS. 2710 through 2732c); Common Video Game Platform Function described in paragraphs [5009.1086] through [5009.1102] (FIGS. 2733 through 2741); Directory Displaying Function described in paragraphs [5009.1103] through [5009.1130] (FIGS. 2742 through 2761); Directory Customizing Function described in paragraphs [5009.1131] through [5009.1186] (FIGS. 2762 through 2807); Host's Directory Customizing Function described in paragraphs [5009.1187] through [5009.1246] (FIGS. 2808 through 2853); Trash Can Function described in paragraphs [5009.1247] through [5009.1295] (FIGS. 2854 through 2895f); Motion Character Displaying Function described in paragraphs [5009.1296] through [5009.1318] (FIGS. 2896 through 2909); Bookmark Displaying Function described in paragraphs [5009.1319] through [5009.1374] (FIGS. 2910 through 2955); CCD/LCD Function described in paragraphs [5009.1375] through [5009.1387] (FIGS. 2956 through 2959b); Pop Up Window Blocking Function described in paragraphs [5009.1388] through [5009.1401] (FIGS. 2960 through 2965); Map Heading Up Function described in paragraphs [5009.1402] through [5009.1421] (FIGS. 2966 through 2976); Copy Once Function described in paragraphs [5009.1422] through [5009.1443] (FIGS. 2977 through 2991); Copy Restricted Software Integrated Data described in paragraphs [5009.1444] through [5009.1457] (FIGS. 2992 through 2998); Folder Sharing Function described in paragraphs [5009.1458] through [5009.1508] (FIGS. 2999 through 3038c); Email Folder Managing Function described in paragraphs [5009.1509] through [5009.1577] (FIGS. 3039 through 3092e); Power On Auto Software Executing Function described in paragraphs [5009.1578] through [5009.1594] (FIGS. 3093 through 3103); Enhanced TV Remote Controlling Function described in paragraphs [5009.1595] through [5009.1639] (FIGS. 3104 through 3137c); 3 CCD Unit Function described in paragraphs [5009.1640] through [5009.1660] (FIGS. 3138 through 3150c); and Multiple Direction Scrolling Function described in paragraphs [5009.1661] through [5009.1762] (FIGS. 3151 through 3238).

Without limiting the generality of the first paragraph of this specification, the following paragraphs and drawings described in Preliminary Amendment C of the Prior Filed Application are incorporated to this application by reference: Radio Frequency Soft Handover Function described in paragraphs [5009.1763] through [5009.1793] (FIGS. 3239 through 3262); Inter Com Function described in paragraphs [5009.1794] through [5009.1816] (FIGS. 3263 through 3277c); Website History Recording Function described in paragraphs [5009.1817] through [5009.1870] (FIGS. 3278 through 3324); Motion Picture Thumbnail Displaying Function described in paragraphs [5009.1871] through [5009.1908] (FIGS. 3325 through 3353b); 2D/3D Map Displaying Function described in paragraphs [5009.1909] through [5009.1952] (FIGS. 3354 through 3380b); Remote Schedule Notifying Function described in paragraphs [5009.1953] through [5009.1975] (FIGS. 3381 through 3393); Remote Email Notifying Function described in paragraphs [5009.1976] through [5009.2000] (FIGS. 3394 through 3406); Remote Document Printing Function described in paragraphs [5009.2001] through [5009.2022] (FIGS. 3407 through 3419b); Anti-virus Protection Identifying Function described in paragraphs [5009.2023] through [5009.2043] (FIGS. 3420 through 3431c); Alphanumeric Phone Number Dialing Function described in paragraphs [5009.2044] through [5009.2076] (FIGS. 3432 through 3453b); Automobile License Number Dialing Function described in paragraphs [5009.2077] through [5009.2109] (FIGS. 3454 through 3475b); Point Card Function described in paragraphs [5009.2110] through [5009.2147] (FIGS. 3476 through 3504c); Display Sharing Function described in paragraphs [5009.2148] through [5009.2169] (FIGS. 3505 through 3516); Email Filtering Function described in paragraphs [5009.2170] through [5009.2212] (FIGS. 3517 through 3549); Received Email Auto Sorting Function described in paragraphs [5009.2213] through [5009.2238] (FIGS. 3550 through 3565b); Sent Email Auto Sorting Function described in paragraphs [5009.2239] through

[5009.2264] (FIGS. 3566 through 3581b); Country Name Displaying Function described in paragraphs [5009.2265] through [5009.2286] (FIGS. 3582 through 3595); Email Attached File Splitting Function described in paragraphs [5009.2287] through [5009.2300] (FIGS. 3596 through 3603c); Auto TV Starting Function described in paragraphs [5009.2301] through [5009.2329] (FIGS. 3604 through 3623); Enhanced TV Program Replaying Function (Communication Device 200) described in paragraphs [5009.2330] through [5009.2361] (FIGS. 3624 through 3648b); Enhanced TV Program Replaying Function (Host H) described in paragraphs [5009.2362] through [5009.2400] (FIGS. 3649 through 3680b); Enhanced TV Program Replaying Function (Devices A and B) described in paragraphs [5009.2401] through [5009.2440] (FIGS. 3681 through 3712b); Enhanced TV Program Replaying Function (Host H, and Devices A and B) described in paragraphs [5009.2441] through [5009.2491] (FIGS. 3713 through 3754b); TV Commercial Skipping Function described in paragraphs [5009.2492] through [5009.2516] (FIGS. 3755 through 3772); Timer Schedule Auto Changing Function described in paragraphs [5009.2517] through [5009.2542] (FIGS. 3773 through 3789); Remote Alarm Setting Function described in paragraphs [5009.2543] through [5009.2585] (FIGS. 3789a through 3817b); Current Location Non-notifying Function described in paragraphs [5009.2586] through [5009.2612] (FIGS. 3818 through 3833); Device Remotely Locking Function described in paragraphs [5009.2613] through [5009.2644] (FIGS. 3834 through 3857); EZ Macro Function described in paragraphs [5009.2645] through [5009.2668] (FIGS. 3858 through 3873b); Alcohol Level Identifying Function described in paragraphs [5009.2669] through [5009.2694] (FIGS. 3874 through 3889b); Displayed Visual Data Size Modifying Function described in paragraphs [5009.2695] through [5009.2729] (FIGS. 3890 through 3915); Button Size Changing Function described in paragraphs [5009.2730] through [5009.2758] (FIGS. 3916 through 3937); Epayment Sound Selecting Function described in paragraphs [5009.2759] through [5009.2778] (FIGS. 3938 through 3950c); Multiple TV Program Recording Function described in paragraphs [5009.2779] through [5009.2823] (FIGS. 3951 through 3988); TV Program Data Trashcan Function described in paragraphs [5009.2824] through [5009.2856] (FIGS. 3989 through 4010b); Ereceipt Producing Function described in paragraphs [5009.2857] through [5009.2888] (FIGS. 4011 through 4033); Memo Sharing Function described in paragraphs [5009.2889] through [5009.2930] (FIGS. 4034 through 4064); Selected Function Remotely Freezing Function described in paragraphs [5009.2931] through [5009.2964] (FIGS. 4065 through 4085); Selected Software Remotely Activating Function described in paragraphs [5009.2965] through [5009.2998] (FIGS. 4086 through 4106); Selected Function Remotely Activating Function described in paragraphs [5009.2999] through [5009.3032] (FIGS. 4107 through 4127); Selected Software Remotely Freezing Function described in paragraphs [5009.3033] through [5009.3066] (FIGS. 4128 through 4148); Selected Data Remotely Deleting Function described in paragraphs [5009.3067] through [5009.3100] (FIGS. 4149 through 4169); Web Cash Memory Function described in paragraphs [5009.3101] through [5009.3122] (FIGS. 4170 through 4183b); Keypad Auto Unlocking Function described in paragraphs [5009.3123] through [5009.3145] (FIGS. 4184 through 4199); Voice Recog Sys Auto Unlocking Function described in paragraphs [5009.3146] through [5009.3168] (FIGS. 4200 through 4215); Upgraded Voice Recog Sys Auto Unlocking Function described in paragraphs [5009.3169] through [5009.3192] (FIGS. 4216 through 4231); TV Program Information Displaying Function described in paragraphs [5009.3193] through [5009.3215] (FIGS. 4232 through 4247b); Best Signal Auto Selecting Function described in paragraphs [5009.3216] through [5009.3269] (FIGS. 4248 through 4291); Software Timer Activating Function described in paragraphs [5009.3270] through [5009.3295] (FIGS. 4292 through 4305b); Software Timer Terminating Function described in paragraphs [5009.3296] through [5009.3321] (FIGS. 4306 through 4319b); Software Timer Deleting Function described in paragraphs [5009.3322] through [5009.3347] (FIGS. 4320 through 4333b); TV Phone Recording Function described in paragraphs [5009.3348] through [5009.3381] (FIGS. 4334 through 4358b); and Hybrid GPS Function described in paragraphs [5009.3382] through [5009.3421] (FIGS. 4359 through 4381).

Without limiting the generality of the first paragraph of this specification, the following paragraphs and drawings described in Preliminary Amendment D of the Prior Filed Application are incorporated to this application by reference: Elevator Controlling Function described in paragraphs [5009.3422] through [5009.3447] (FIGS. 4382 through 4397); Device Migrating Function described in paragraphs [5009.3448] through [5009.3509] (FIGS. 4398 through 4445b); Cordless Phone Connecting Function described in paragraphs [5009.3510] through [5009.3547] (FIGS. 4446 through 4474b); Cash Deposit Function described in paragraphs [5009.3548] through [5009.3585] (FIGS. 4475 through 4497d); Highway Fee Auto Paying Function described in paragraphs [5009.3586] through [5009.3616] (FIGS. 4498 through 45180; By Distance Auto Action Function described in paragraphs [5009.3617] through [5009.3639] (FIGS. 4519 through 4532); Emoney Transferring Function described in paragraphs [5009.3640] through [5009.3666] (FIGS. 4533 through 4548c); Coupon Disposing Function described in paragraphs [5009.3667] through [5009.3698] (FIGS. 4549 through 4569); Multiple Device Searching Function described in paragraphs [5009.3699] through [5009.3717] (FIGS. 4570 through 4581b); Battery Meter Notifying Function described in paragraphs [5009.3718] through [5009.3737] (FIGS. 4582 through 4593b); Software Infrared Transmitting Function described in paragraphs [5009.3738] through [5009.3759] (FIGS. 4594 through 4606); Electronic Key Function described in paragraphs [5009.3760] through [5009.3824] (FIGS. 4607 through 4647b); Automobile Status Monitoring Function described in paragraphs [5009.3825] through [5009.3885] (FIGS. 4648 through 4691); Enhanced Business Card Transferring Function described in paragraphs [5009.3886] through [5009.3928] (FIGS. 4692 through 4720c); Removal Media Data Transferring Function described in paragraphs [5009.3929] through [5009.3954] (FIGS. 4721 through 4737c); Audiovisual Data Sharing Function described in paragraphs [5009.3955] through [5009.3992] (FIGS. 4738 through 4763b); Email Attachment Supplementing Function described in paragraphs [5009.3993] through [5009.4012] (FIGS. 4764 through 4775c); Other Device File Emailing Function described in paragraphs [5009.4013] through [5009.4043] (FIGS. 4776 through 4799b); Slide Authoring Function described in paragraphs [5009.4044] through [5009.4082] (FIGS. 4800 through 4828); Remote/Local Credit Card Transaction Function described in paragraphs [5009.4083] through [5009.4119] (FIGS. 4829 through 4855d); Unread Email Sorting Function described in paragraphs [5009.4120] through [5009.4166] (FIGS. 4856 through 4890); TV Program Replying Function described in paragraphs [5009.4167] through [5009.4200] (FIGS. 4891 through 4914); PC Keyboard Function described in paragraphs [5009.4201] through [5009.4212] (FIGS. 4915 through 4920b); Antenna Mark Displaying Function described in paragraphs [5009.4213] through [5009.4228] (FIGS. 4921 through 4928b); Enhanced Caller ID Displaying Function described in paragraphs [5009.4229] through [5009.4264] (FIGS. 4929 through 4951c); Enhanced Call Waiting Function described in paragraphs [5009.4265] through [5009.4300] (FIGS. 4952 through 4974c); Phonebook Auto Icon Displaying Function described in paragraphs [5009.4301] through [5009.4332] (FIGS. 4975 through 4996); One Click Call Back Function described in paragraphs [5009.4333] through [5009.4357] (FIGS. 4997 through 5014); Phone Conversation Storing Function described in paragraphs [5009.4358] through [5009.4386] (FIGS. 5015 through 5031c); Caller ID Requesting Function described in paragraphs [5009.4387] through [5009.4410] (FIGS. 5032 through 5045c); Phone Call Audio Notifying Function described in paragraphs [5009.4411] through [5009.4433] (FIGS. 5046 through 5059c); Entry Phone Function described in paragraphs [5009.4434] through [5009.4459] (FIGS. 5060 through 5074b); FAX Sending/Receiving Function described in paragraphs [5009.4460] through [5009.4505] (FIGS. 5075 through 5108b); Other Device's Phone Book Utilizing Function described in paragraphs [5009.4506] through [5009.4536] (FIGS. 5109 through 5128); Multiple Program Executing Function described in paragraphs [5009.4537] through [5009.4564] (FIGS. 5129 through 5148); Removal Medium Operating Function described in paragraphs [5009.4565] through [5009.4601] (FIGS. 5149 through 5178); Removal Medium Audiovisual Data Recording Function described in paragraphs [5009.4602] through [5009.4629] (FIGS. 5178a through 5199); Nearest Printer Selecting Function described in paragraphs [5009.4630] through [5009.4656] (FIGS. 5200 through 5216d); In-Cabin Com Function described in paragraphs [5009.4657] through [5009.4680] (FIGS. 5217 through 5233c); Carrier Current Condition Notifying Function described in paragraphs [5009.4681] through [5009.4710] (FIGS. 5234 through 5251b); Virtual Space Creating Function described in paragraphs [5009.4711] through [5009.4743] (FIGS. 5252 through 5274); Security Camera Function described in paragraphs [5009.4744] through [5009.4778] (FIGS. 5275 through 5295); Remote Camera Controlling Function described in paragraphs [5009.4779] through [5009.4820] (FIGS. 5296 through 5326); Day/Night Camera Function described in paragraphs [5009.4821] through [5009.4851] (FIGS. 5327 through 5346); Multiple Wireless Signal Handover Function described in paragraphs [5009.4852] through [5009.4897] (FIGS. 5347 through 5365); Multiple Tab Web Browsing Function described in paragraphs [5009.4898] through [5009.4926] (FIGS. 5366 through 5388); Multiple Tab Visual Data Viewing Function described in paragraphs [5009.4927] through [5009.4955] (FIGS. 5389 through 5411); Multiple Tab Document Data Viewing Function described in paragraphs [5009.4956] through [5009.4984] (FIGS. 5412 through 5434); Multiple Tab Email Data Viewing Function described in paragraphs [5009.4985] through [5009.5013] (FIGS. 5435 through 5457); Convenient TV Remote Controlling Function described in paragraphs [5009.5014] through [5009.5034] (FIGS. 5458 through 5471); and Form Auto Filling Function described in paragraphs [5009.5035] through [5009.5072] (FIGS. 5472 through 5495e).

Without limiting the generality of the first paragraph of this specification, the following paragraphs and drawings described in Preliminary Amendment E of the Prior Filed Application are incorporated to this application by reference: Hybrid Carrier Function described in paragraphs [5009.5073] through [5009.5105] (FIGS. 5496 through 5522b); Carrier Current Condition Monitoring Function described in paragraphs [5009. 5106] through [5009. 5141] (FIGS. 5523 through 5546c); Memory Defragmenting Function described in paragraphs [5009. 5142] through [5009. 5175] (FIGS. 5547 through 5568); Memory Formatting Function described in paragraphs [5009. 5176] through [5009. 5209] (FIGS. 5569 through 5590); Memory Partitioning Function described in paragraphs [5009. 5210] through [5009. 5243] (FIGS. 5591 through 5612); TV Phone Pausing Function described in paragraphs [5009. 5244] through [5009. 5268] (FIGS. 5613 through 5629); Reflecting Object Displaying Function described in paragraphs [5009. 5269] through [5009. 5294] (FIGS. 5630 through 5648c); Alternative TV Program Receiving Function described in paragraphs [5009. 5295] through [5009. 5325] (FIGS. 5649 through 5670c); Alternative Radio Program Receiving Function described in paragraphs [5009. 5326] through [5009. 5356] (FIGS. 5671 through 5692c); Audiovisual Auto Fading Function described in paragraphs [5009. 5357] through [5009. 5377] (FIGS. 5693 through 5706); Audio Auto Fading Function described in paragraphs [5009. 5378] through [5009. 5398] (FIGS. 5707 through 5720); Video-In-Video Displaying Function described in paragraphs [5009. 5399] through [5009. 5431] (FIGS. 5721 through 5747b); Pre-Installed Item Purchasing Function described in paragraphs [5009. 5432] through [5009. 5470] (FIGS. 5748 through 5775b); Multiple CPU Function described in paragraphs [5009. 5471] through [5009. 5476] (FIGS. 5776 and 5777); Radio Music Downloading Function described in paragraphs [5009. 5477] through [5009. 5516] (FIGS. 5778 through 5807); File Auto Saving Function described in paragraphs [5009. 5517] through [5009. 5559] (FIGS. 5808 through 5837b); TV Tuner Function described in paragraphs [5009. 5560] through [5009. 5600] (FIGS. 5838 through 5866); GPS Receiver's Log Function described in paragraphs [5009. 5601] through [5009. 5629] (FIGS. 5867 through 5884b); Remote Room Light Controlling Function described in paragraphs [5009. 5630] through [5009. 5662] (FIGS. 5885 through 5906b); Remote Kitchen Stove Controlling Function described in paragraphs [5009. 5663] through [5009. 5695] (FIGS. 5907 through 5928b); Remote Refrigerator Controlling Function described in paragraphs [5009. 5696] through [5009. 5728] (FIGS. 5929 through 5950b); Remote Washing Machine Controlling Function described in paragraphs [5009. 5729] through [5009. 5761] (FIGS. 5951 through 5972b); Remote Faucet Controlling Function described in paragraphs [5009. 5762] through [5009. 5794] (FIGS. 5973 through 5994b); Remote Door Lock Controlling Function described in paragraphs [5009. 5795] through [5009. 5827] (FIGS. 5995 through 6016b); Remote Air Conditioner Controlling Function described in paragraphs [5009. 5828] through [5009. 5860] (FIGS. 6017 through 6038b); Remote Vending Machine Controlling Function described in paragraphs [5009. 5861] through [5009. 5893] (FIGS. 6039 through 6060b); Remote Video Recorder Controlling Function described in paragraphs [5009. 5894] through [5009. 5926] (FIGS. 6061 through 6082b); Remote Printer Controlling Function described in paragraphs [5009. 5927] through [5009. 5959] (FIGS. 6083 through 6104b); Remote Camera Controlling Function described in paragraphs [5009. 5960] through [5009. 5992] (FIGS. 6105 through 6126b); Remote TV Tuner Controlling Function described in paragraphs [5009. 5993] through [5009. 6025] (FIGS. 6127 through 6148b); Remote Radio Tuner Controlling Function described in paragraphs [5009. 6026] through [5009. 6058] (FIGS. 6149 through 6170b); Remote Computer Controlling Function described in paragraphs [5009. 6059] through [5009. 6091] (FIGS. 6171 through 6192b); Remote Carrier Controlling Function described in paragraphs [5009. 6092] through [5009. 6124] (FIGS. 6193 through 6214b); Remote Food Processor Controlling Function described in paragraphs [5009. 6125] through [5009. 6157] (FIGS. 6215 and 6236b); Remote Dryer Controlling Function described in paragraphs [5009. 6158] through [5009. 6190] (FIGS. 6237 and 6258b); Remote Rice Cooker Controlling Function described in paragraphs [5009. 6191] through [5009. 6223] (FIGS. 6259 and 6280b); Remote Sound Outputting Device Controlling Function described in paragraphs [5009. 6224] through [5009. 6256] (FIGS. 6281 and 6302b); Remote Vacuum Cleaner Controlling Function described in paragraphs [5009. 6257] through [5009. 6289] (FIGS. 6303 and 6324b); Remote FAX Machine Controlling Function described in paragraphs [5009. 6290] through [5009. 6322] (FIGS. 6325 and 6346b); Remote Copying Machine Controlling Function described in paragraphs [5009. 6323] through [5009. 6355] (FIGS. 6347 and 6368b); Remote Coffee Maker Controlling Function described in paragraphs [5009. 6356] through [5009. 6388] (FIGS. 6369 and 6390b); Remote Scanner Controlling Function described in paragraphs [5009. 6389] through [5009. 6421] (FIGS. 6391 and 6412b); Remote Clothes Iron Controlling Function described in paragraphs [5009. 6422] through [5009. 6454] (FIGS. 6413 and 6434b); Remote Escalator Controlling Function described in paragraphs [5009. 6455] through [5009. 6487] (FIGS. 6435 and 6456b); Vending Machine Accessing Function described in paragraphs [5009. 6488] through [5009. 6527] (FIGS. 6457 through 6485d); Audiovisual Data Shuffling Function described in paragraphs [5009. 6528] through [5009. 6551] (FIGS. 6486 through 6503b); Unknown File Icon Displaying Function described in paragraphs [5009. 6552] through [5009. 6575] (FIGS. 6504 through 6521c); Audiovisual Document Producing Function described in paragraphs [5009. 6576] through [5009. 6601] (FIGS. 6522 through 6539b); Audiovisual Data Searching Function described in paragraphs [5009. 6602] through [5009. 6626] (FIGS. 6540 through 6558b); Finger Print Log-on Function described in paragraphs [5009. 6627] through [5009. 6645] (FIGS. 6559 through 6571c); Voice Print Log-on Function described in paragraphs [5009. 6646] through [5009. 6663] (FIGS. 6572 through 6583c); Finger Print Screen Saver Deactivating Function described in paragraphs [5009. 6664] through [5009. 6682] (FIGS. 6584 through 6596c); Voice Print Screen Saver Deactivating Function described in paragraphs [5009. 6683] through [5009. 6700] (FIGS. 6597 through 6608c); Finger Print Folder Accessing Function described in paragraphs [5009. 6701] through [5009. 6719] (FIGS. 6609 through 6621c); Voice Print Folder Accessing Function described in paragraphs [5009. 6720] through [5009. 6737] (FIGS. 6622 through 6633c); Finger Print File Accessing Function described in paragraphs [5009. 6738] through [5009. 6756] (FIGS. 6634 through 6646c); Voice Print File Accessing Function described in paragraphs [5009. 6757] through [5009. 6774] (FIGS. 6647 through 6658c); Finger Print Internet Accessing Function described in paragraphs [5009. 6775] through [5009. 6793] (FIGS. 6659 through 6671c); Voice Print Internet Accessing Function described in paragraphs [5009. 6794] through [5009. 6811] (FIGS. 6672 through 6683c); Finger Print PC Log-on Function described in paragraphs [5009. 6812] through [5009. 6838] (FIGS. 6684 through 6703b); Voice Print PC Log-on Function described in paragraphs [5009. 6839] through [5009. 6864] (FIGS. 6704 through 6722b); and Finger Print PC Screen Saver Deactivating Function described in paragraphs [5009. 6865] through [5009. 6891] (FIGS. 6723 through 6742b).

Without limiting the generality of the first paragraph of this specification, the following paragraphs and drawings described in the original file of the Prior Filed Application are incorporated to this application by reference: Multiple Mode Implementing Function described in paragraphs [5011] through [5018] (FIGS. 395 through 400); Multiple Software Download Function described in paragraphs [5019] through [5028] (FIGS. 401 through 407); Selected Software Distributing Function described in paragraphs [5029] through [5048] (FIGS. 1376 through 1393d); Multiple Software Download And Mode Implementation Function described in paragraphs [5049] through [5056] (FIGS. 408 through 412); and the last sentence described in paragraph [5058] (no drawings).

Having thus described a presently preferred embodiment of the present invention, it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. For the avoidance of doubt, the applicant has no intent to surrender any equivalent of any element included in the claims by any amendment of the claims unless expressly and unambiguously stated otherwise in the amendment. Further, for the avoidance of doubt, the number of the prior arts introduced herein (and/or in IDS) may be of a large one, however, the applicant has no intent to hide the more relevant prior art(s) in the less relevant ones. For the avoidance of doubt, words using the singular or plural number also include the plural or singular number, respectively. The words 'herein', 'above', 'below', and words of similar import, when used in this application, refer to this application as a whole, and not to any particular portions of this application. The description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. For the avoidance of doubt, all of the U.S. patents, U.S. patent application publications, U.S. patent applications, foreign patents, foreign patent applications and non-patent publications referred to in the specification of this application and/or the parent application of this application are incorporated herein by reference, in their entirety. Further, all of the U.S. patents, U.S. patent application publications, U.S. patent applications, foreign patents, foreign patent applications and non-patent publications listed in the Application Data Sheet of this application and/or the parent application of this application are incorporated herein by reference in their entirety. Various types of signals are input in this specification by utilizing Input Device 210 (FIG. 1) or voice recognition system. As another embodiment, a touch panel may be utilized to input signals. In other words, the touch panel is installed in LCD 201 (FIG. 1), and the user is enabled to operate Communication Device 200 by touching LCD 201 instead of utilizing Input Device 210 (FIG. 1) or voice recognition system. The mechanism and/or the structure of the touch panel is primarily described in the following patents and the references cited thereof: U.S. Pat. No. 6,690,363; U.S. Pat. No. 6,690,361; U.S. Pat. No. 6,689,458; U.S. Pat. No. 6,686,909; U.S. Pat. No. 6,685,805; U.S. Pat. No. 6,680,448; U.S. Pat. No. 6,677,934; U.S. Pat. No. 6,677,542; U.S. Pat. No. 6,664,952; U.S. Pat. No. 6,664,951; U.S. Pat. No. 6,664,950; U.S. Pat. No. 6,661,406; U.S. Pat. No. 6,654,006; U.S. Pat. No. 6,646,634; U.S. Pat. No. 6,639,587; U.S. Pat. No. 6,639,163; U.S. Pat. No. 6,633,280; U.S. Pat. No. 6,633,279; U.S. Pat. No. 6,630,058; U.S. Pat. No. 6,629,833; U.S. Pat. No. 6,628,271; U.S. Pat. No. 6,628,269; U.S. Pat. No. 6,628,268; U.S. Pat. No. 6,621,486; U.S. Pat. No. 6,611,299; U.S. Pat. No. 6,597,508; U.S. Pat. No. 6,593,917; U.S. Pat. No. 6,590,622; U.S. Pat. No. 6,583,935; U.S. Pat. No. 6,573,155; U.S. Pat. No. 6,572,941; U.S. Pat. No. 6,570,707; U.S. Pat. No. 6,567,077; U.S. Pat. No. 6,559,902; U.S. Pat. No. 6,559,834; U.S. Pat. No. 6,556,189; U.S. Pat. No. 6,552,718; U.S. Pat. No. 6,549,195; U.S. Pat. No. 6,549,193; U.S. Pat. No. 6,538,706; U.S. Pat. No. 6,538,644; U.S. Pat. No. 6,529,188; U.S. Pat. No. 6,522,322; U.S. Pat. No. 6,512,512; U.S. Pat. No. 6,507,337; U.S. Pat. No. 6,504,583; U.S. Pat. No. 6,502,668; U.S. Pat. No. 6,492,633; U.S. Pat. No. 6,480,187; and U.S. Pat. No. 6,473,235. For the avoidance of doubt, when Communication Device 200 performs wireless communication with Host H (FIG. 429) and/or other devices, Antenna 218 (FIG. 1) and/or LED 219 (FIG. 380) are utilized for purposes of implementing the wireless communication. For the avoidance of doubt, the roles played by Host H (FIG. 429) to implement various types of functions described in this specification may be performed by a personal computer (e.g., desktop computer and lap top computer), PDA, and another Communication Device 200 in lieu of Host H (FIG. 429). For the avoidance of doubt, the tasks of CPU 211 (FIG. 1) described in this specification may be performed by a plurality of central processing units installed in Communication Device 200. For the avoidance of doubt, the data and software programs stored in RAM 206 (FIG. 1) described in this specification may be stored in a plurality of memories installed in Communication Device 200.

The invention claimed is:

1. A communication device, which is operable to implement audiovisual communication with another device, comprising:
   a microphone;
   a speaker;
   an input device;
   a display;
   an antenna;
   a TV phone pausing visual data selecting implementer, wherein a list of visual data is processed to be displayed from which a visual data is selected in accordance with user input;
   a TV phone implementer, wherein audiovisual communication is implemented with said another device;
   a TV phone pausing visual data transferring implementer, wherein, upon detecting the user instruction to pause the audiovisual communication, a TV phone pausing visual data which is the visual data selected by implementing said TV phone pausing visual data selecting implementer is transferred to said another device; and
   a moving picture data replaying implementer, wherein a moving picture data is retrieved and replayed;
   wherein said TV phone pausing visual data is transferred to said another device so as to be shown on the display of said another device in lieu of a certain visual data which is the visual data transferred from said communication device to said another device for the audiovisual communication.

2. A system comprising:
   a communication device, which is operable to implement audiovisual communication with another device, comprising a microphone, a speaker, an input device, a display, and an antenna;
   a TV phone pausing visual data selecting implementer, wherein a list of visual data is processed to be displayed on said communication device from which a visual data is selected in accordance with user input;
   a TV phone implementer, wherein said communication device implements audiovisual communication with said another device;
   a TV phone pausing visual data transferring implementer, wherein, upon detecting the user instruction of said communication device to pause the audiovisual communication, a TV phone pausing visual data which is the visual data selected by implementing said TV phone pausing visual data selecting implementer is transferred from said communication device to said another device; and
   a moving picture data replaying implementer, wherein a moving picture data is retrieved and replayed;
   wherein said TV phone pausing visual data is transferred to said another device so as to be shown on the display of said another device in lieu of a certain visual data which is the visual data transferred from said communication device to said another device for the audiovisual communication.

3. A method for a communication device, which is operable to implement audiovisual communication with another device, comprising a microphone, a speaker, an input device, a display, and an antenna, said method comprising:
   a TV phone pausing visual data selecting implementing step, wherein a list of visual data is processed to be displayed from which a visual data is selected in accordance with user input;
   a TV phone implementing step, wherein audiovisual communication is implemented with said another device;
   a TV phone pausing visual data transferring implementing step, wherein, upon detecting the user instruction to pause the audiovisual communication, a TV phone pausing visual data which is the visual data selected by implementing said TV phone pausing visual data selecting implementing step is transferred to said another device; and
   a moving picture data replaying implementer, wherein a moving picture data is retrieved and replayed;
   wherein said TV phone pausing visual data is transferred to said another device so as to be shown on the display of said another device in lieu of a certain visual data which is the visual data transferred from said communication device to said another device for the audiovisual communication.

4. The communication device of claim 1, wherein said TV phone pausing visual data includes a motion picture data.

5. The communication device of claim 1, wherein said list of visual data includes the picture data retrieved from a camera of said communication device.

6. The communication device of claim 1, wherein said list of visual data includes the picture data produced by said communication device.

7. The communication device of claim 1, wherein said TV phone pausing visual data is displayed on said communication device and said another device simultaneously.

8. The communication device of claim 1, wherein said certain visual data indicates the visual data retrieved from a camera of said communication device.

9. The system of claim 2, wherein said TV phone pausing visual data includes a motion picture data.

10. The system of claim 2, wherein said list of visual data includes the picture data retrieved from a camera of said communication device.

11. The system of claim 2, wherein said list of visual data includes the picture data produced by said communication device.

12. The system of claim 2, wherein said TV phone pausing visual data is displayed on said communication device and said another device simultaneously.

13. The system of claim 2, wherein said certain visual data indicates the visual data retrieved from a camera of said communication device.

14. The method of claim 3, wherein said TV phone pausing visual data includes a motion picture data.

15. The method of claim 3, wherein said list of visual data includes the picture data retrieved from a camera of said communication device.

16. The method of claim 3, wherein said list of visual data includes the picture data produced by said communication device.

17. The method of claim 3, wherein said TV phone pausing visual data is displayed on said communication device and said another device simultaneously.

18. The method of claim 3, wherein said certain visual data indicates the visual data retrieved from a camera of said communication device.

* * * * *